(12) United States Patent
Mizrahi

(10) Patent No.: US 12,325,485 B2
(45) Date of Patent: Jun. 10, 2025

(54) HUMAN POWERED RECIPROCAL (LINEAR) MOTION DRIVE SYSTEM, AND APPLICATIONS THEREOF

(71) Applicant: Morris Mizrahi, Eilat (IL)

(72) Inventor: Morris Mizrahi, Eilat (IL)

( * ) Notice: Subject to any disclaimer, the term of this patent is extended or adjusted under 35 U.S.C. 154(b) by 803 days.

(21) Appl. No.: 17/611,973

(22) PCT Filed: Jan. 15, 2020

(86) PCT No.: PCT/IL2020/050069
§ 371 (c)(1),
(2) Date: Nov. 17, 2021

(87) PCT Pub. No.: WO2020/234862
PCT Pub. Date: Nov. 26, 2020

(65) Prior Publication Data
US 2022/0227452 A1 Jul. 21, 2022

(30) Foreign Application Priority Data
May 21, 2019 (IL) .......................................... 266776

(51) Int. Cl.
*B62M 1/28* (2013.01)
*B62M 1/16* (2006.01)
(52) U.S. Cl.
CPC .................. *B62M 1/28* (2013.01); *B62M 1/16* (2013.01)
(58) Field of Classification Search
CPC ................................. B62M 1/28; B62M 1/16
See application file for complete search history.

(56) References Cited

U.S. PATENT DOCUMENTS

| 597,621 A | 1/1898 | Russell |
| 618,356 A | 1/1899 | Johnson |
| 719,595 A | 2/1903 | Huss |

(Continued)

FOREIGN PATENT DOCUMENTS

| CN | 102658853 A | 9/2012 |
| WO | 2016198057 A1 | 12/2016 |

OTHER PUBLICATIONS

International Search Report for PCT/IL2020/050069; mailed May 3, 2020; (3 pages).

(Continued)

*Primary Examiner* — Jacob D Knutson
(74) *Attorney, Agent, or Firm* — Roach Brown McCarthy & Gruber, P.C.; Kevin D. McCarthy

(57) ABSTRACT

A human powered reciprocal motion drive comprising: two independently driven drive assemblies for interchangeably operating in driving and return strokes, each drive assembly comprising: (a) a spiral cone; (b) a driving cable, a first end of the cable is connected to a first winding group on the spiral cone, and a second end of the same driving cable is connected to a second winding group on the same spiral cone; (c) a pedal which is attached to said driving cable; and (d) a gear assembly for defining a ratio between the number of revolutions in said first winding group and the number of revolutions in said second winding group, thereby to define an operative position along the thread of the spiral cone; the system further comprising a reciprocal motion mechanism which, during each driving motion by one of said pedals, causes a return motion of the other pedal.

21 Claims, 49 Drawing Sheets

(56) References Cited

U.S. PATENT DOCUMENTS

| | | | |
|---|---|---|---|
| 3,891,235 A | 6/1975 | Shelly | |
| 3,954,282 A | 5/1976 | Hege | |
| 4,005,611 A | 2/1977 | Jeffries | |
| 4,169,609 A | 10/1979 | Zampedro | |
| 4,530,678 A | 7/1985 | Wechsler | |
| 4,608,034 A | 8/1986 | Reswick | |
| 4,630,839 A | 12/1986 | Seol | |
| 4,645,475 A | 2/1987 | Husted | |
| 4,744,577 A * | 5/1988 | Brent | B60T 1/10 280/215 |
| 4,843,077 A | 6/1989 | Hinkle et al. | |
| 4,913,684 A | 4/1990 | Mantovaara et al. | |
| 5,199,929 A | 4/1993 | Stites | |
| 5,688,199 A | 11/1997 | Spirig | |
| 6,199,884 B1 | 3/2001 | Doroftei | |
| 6,394,477 B1 | 5/2002 | Cellini | |
| 6,540,244 B1 | 4/2003 | Ode | |
| 6,723,029 B2 | 4/2004 | Salgado | |
| 8,162,340 B2 | 4/2012 | Patterson | |
| 8,215,654 B1 | 7/2012 | Leser | |
| 8,840,127 B2 | 9/2014 | Musgrove | |
| 2008/0146390 A1* | 6/2008 | Lacreu | B62K 3/005 474/80 |
| 2010/0295264 A1 | 11/2010 | Denais | |
| 2013/0168942 A1* | 7/2013 | Musgrove | B62M 9/04 74/37 |
| 2016/0318576 A1 | 11/2016 | Johannessen | |

OTHER PUBLICATIONS

Written Opinion of the International Searching Authority for PCT/IL2020/050069; mailed May 3, 2020; (6 pages).

International Preliminary Report on Patentability for PCT/IL2020/050069; mailed Aug. 31, 2021; (4 pages).

Communication and Supplementary European Search Report for Application No. EP 20 80 8287; mailed May 25, 2023 (9 pages).

* cited by examiner

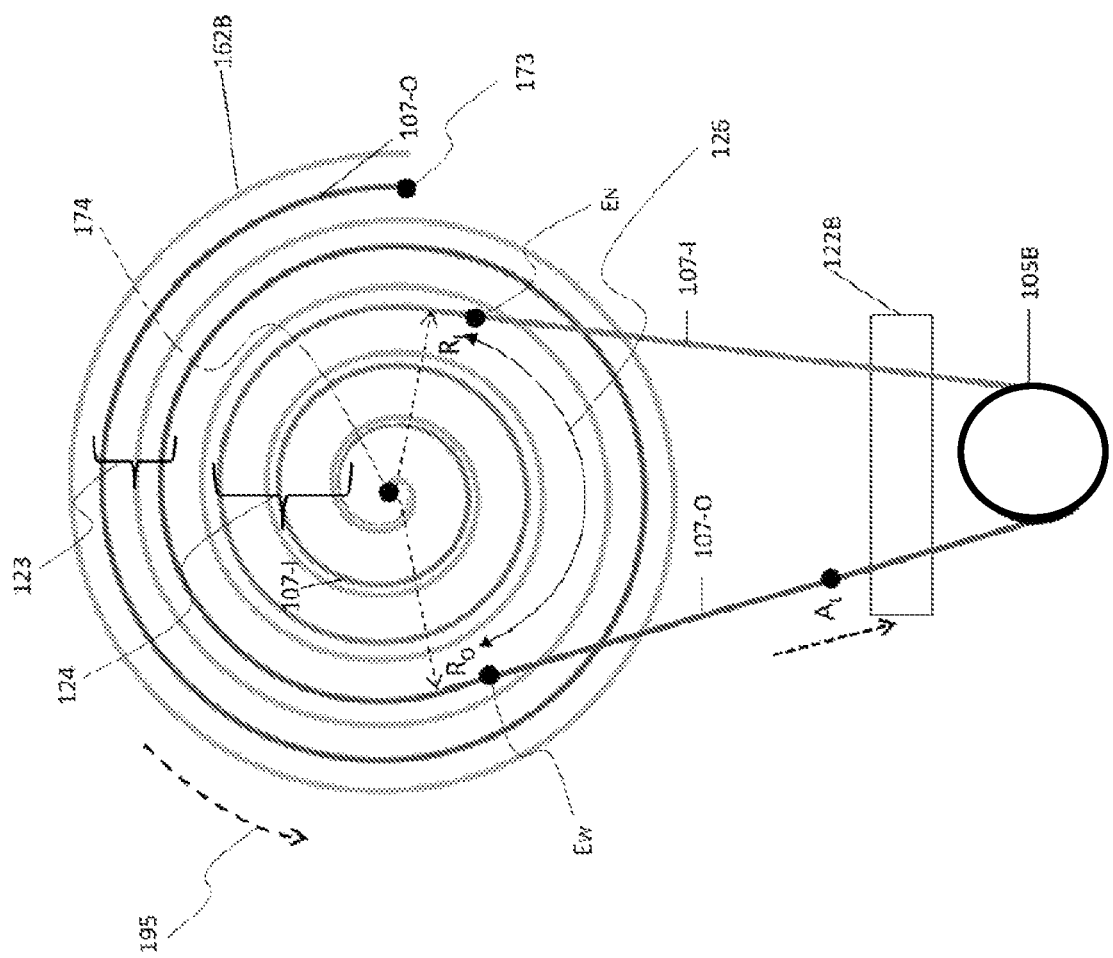

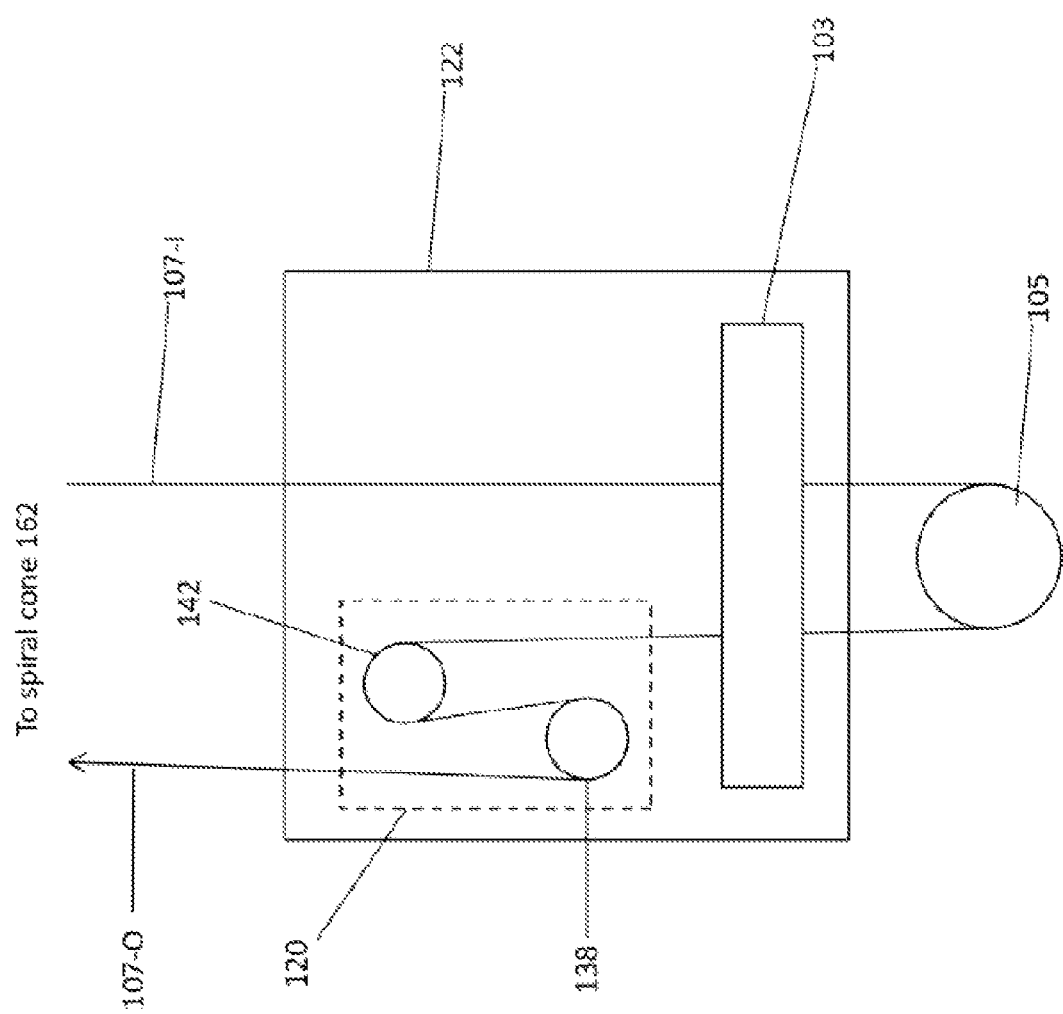

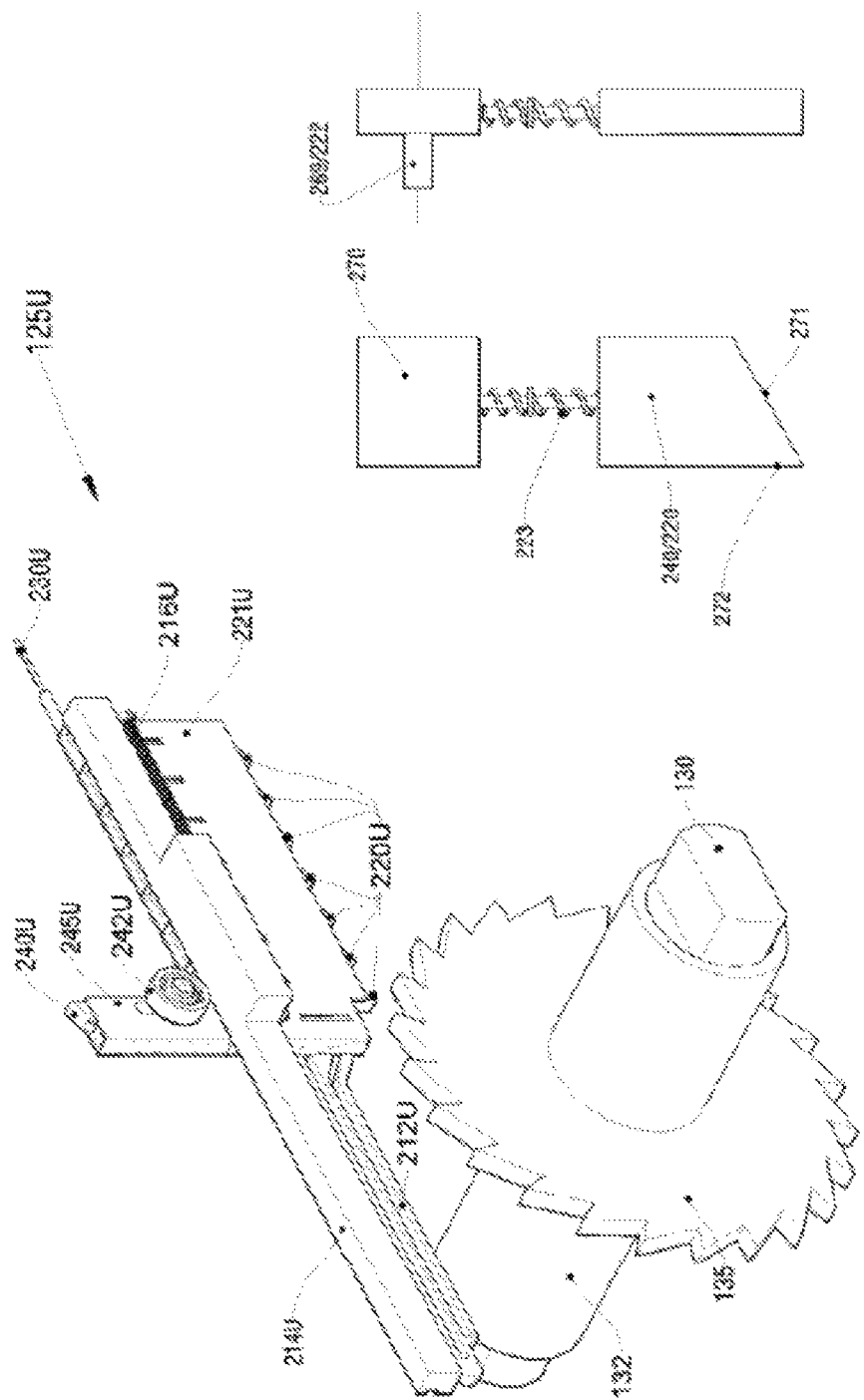

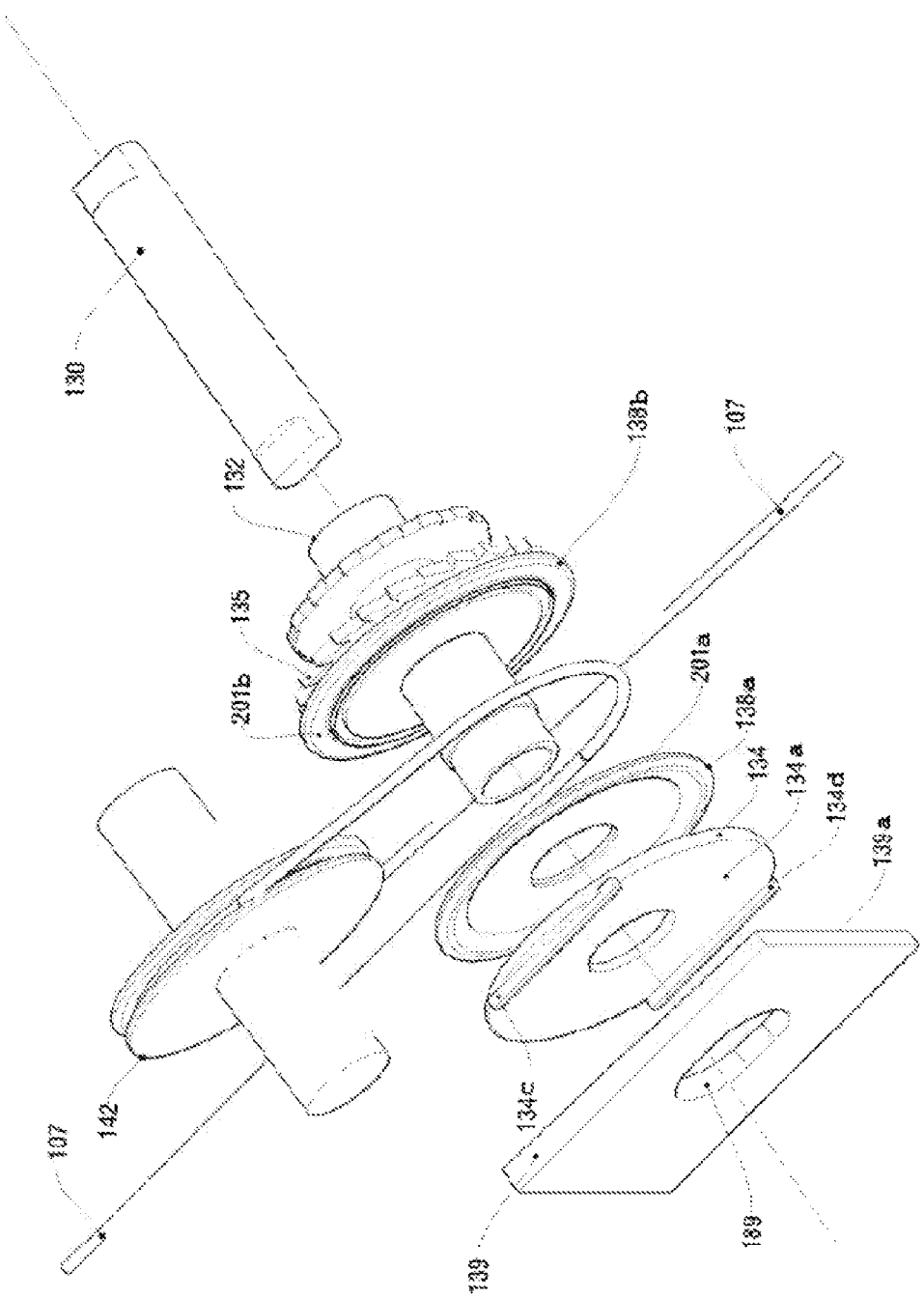

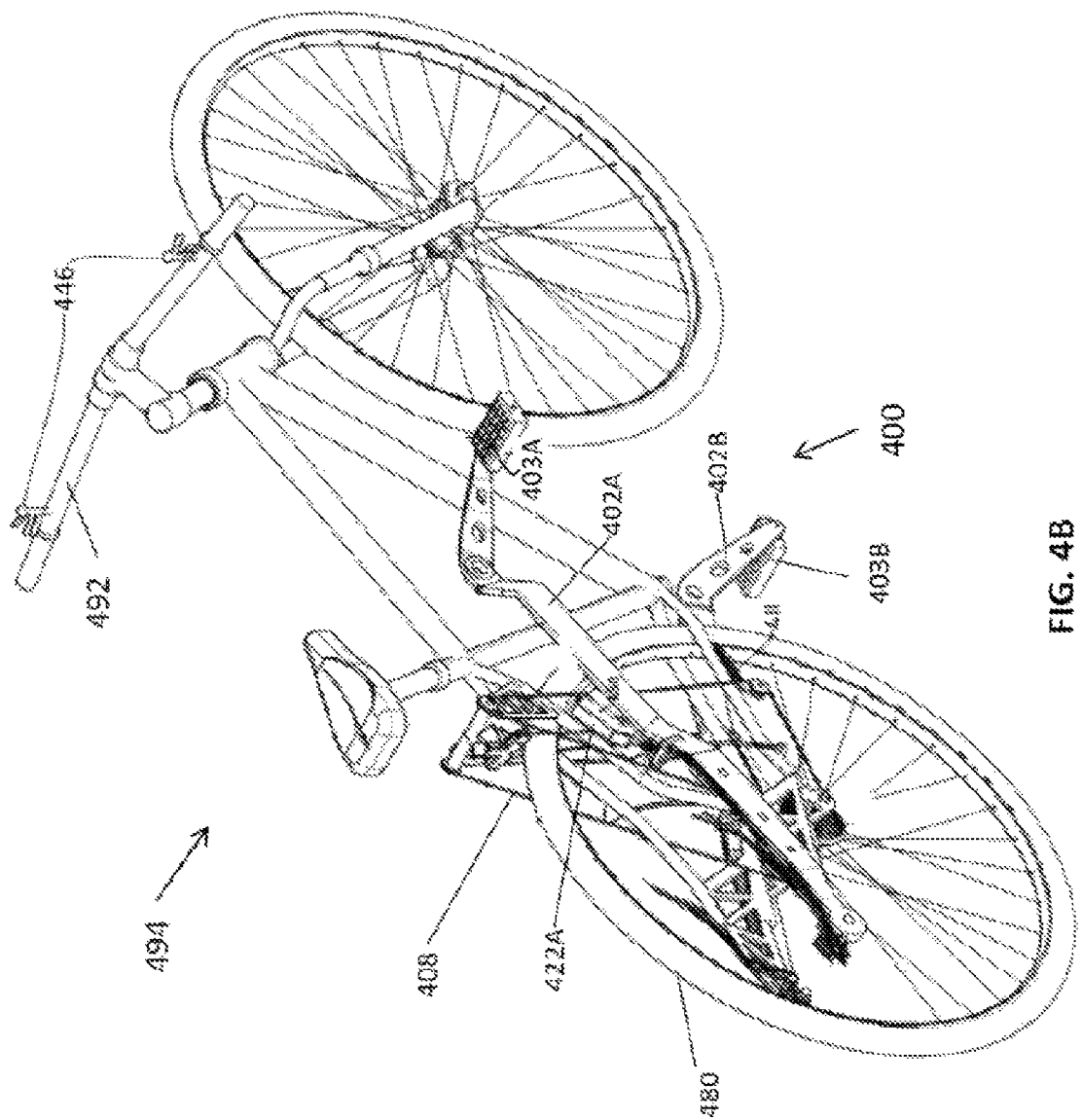

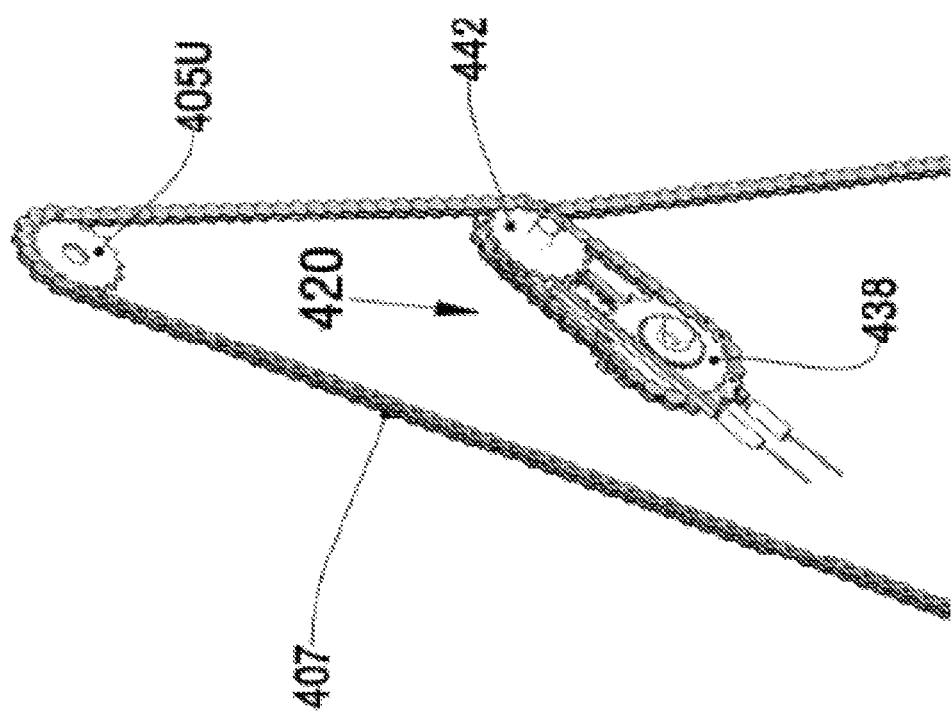

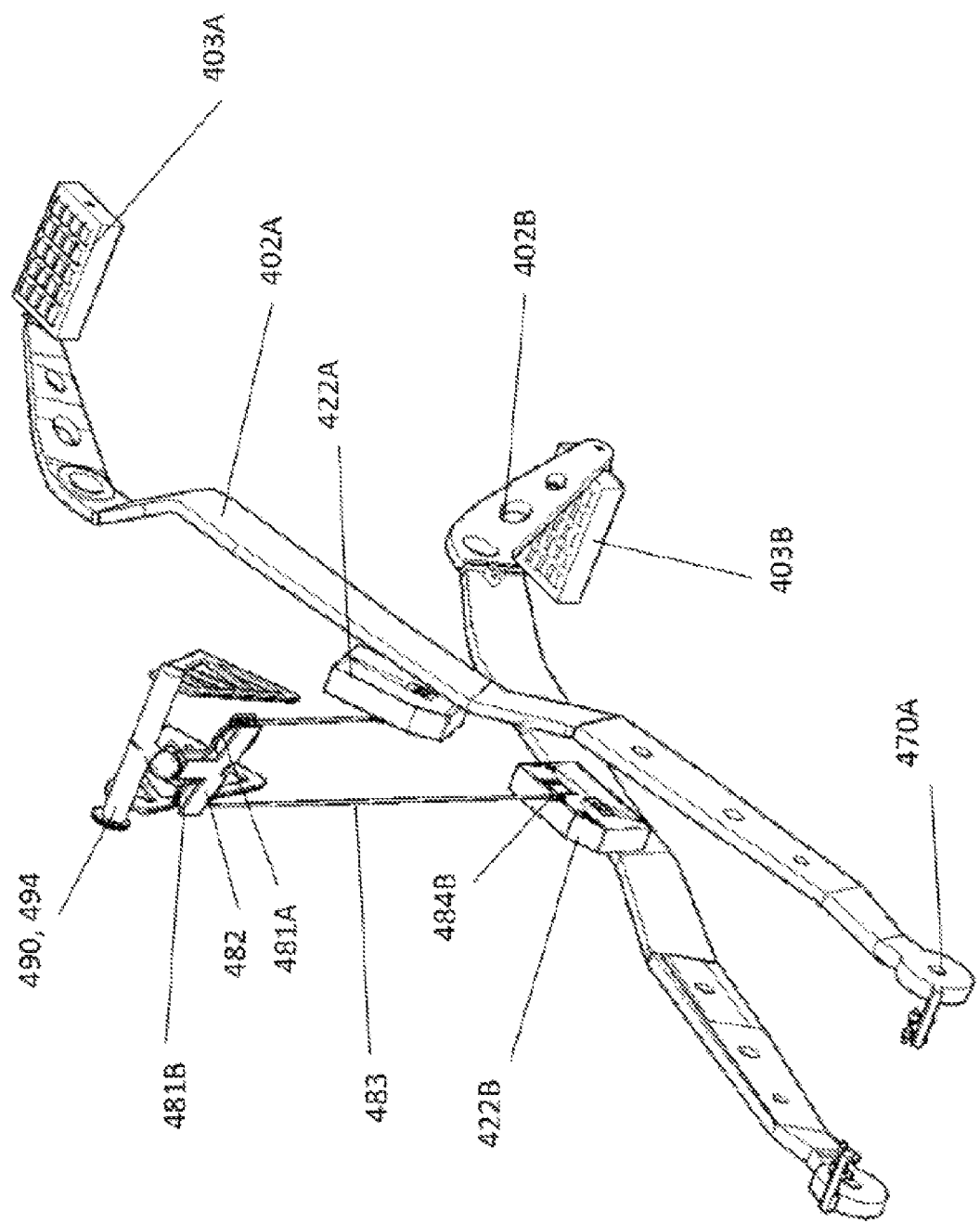

HUMAN POWERED RECIPROCAL (LINEAR) MOTION DRIVE SYSTEM, AND APPLICATIONS THEREOF

FIELD OF THE INVENTION

The field of the invention generally relates to human powered drive systems and transmissions thereof, more particularly, to human powered reciprocal-linear motion drive systems, and applications thereof.

BACKGROUND OF THE INVENTION

The majority of human powered devices, for example, winches (i.e., hand powered load hoisting or/and hauling machines), bicycles and tricycles, as well as human powered cranes, human powered vehicles, and human powered devices on water-based (marine type) vehicles or vessels (such as boats, yachts, and ships), among other possible human powered devices, use rotary (circular) motion to provide power to, and effect motion of, the work-producing parts of the human powered device. Reference is made to FIG. 1 that shows a comparison of effective power [in terms of work per unit time, or Output Force (F)×Angular Displacement (pedal position) per unit time] generated by rotary (circular) motion vs. reciprocal (linear) motion of a bicycle (as an exemplary human powered device). As shown therein, rotary (circular) motion power, represented by line 10 is inherently inefficient, as a result of producing uneven levels of force throughout the angular displacement (pedal rotation). When a rider pushes on a bicycle pedal, there is more force in mid cycle 16 when the leg of the rider is essentially pushing downwards. At the beginning 12 and ending 14 of the cycle, the output force (F), and therefore, the power, generated is substantially reduced.

By contrast, reciprocal-linear motion drive systems produce a uniform force throughout the motion cycle (or cycle), while requiring the same equivalent input power from the user as for rotary drive systems. As shown in FIG. 1, the reciprocal (linear) motion drive cycle (cycle) is represented by line 20. The output force (F) is more closely related to the input power such that reciprocal (linear) motion is far more efficient. The output force (F) is constant throughout the reciprocal (linear) motion aside from a very small gap 22 in the power delivery where the timing of the gap 22 is dependent on the speed that the rider or user switches the side (pedal) of driving the reciprocal-linear motion.

FIG. 1 demonstrates that at least with respect to the effective power generated, reciprocal-linear drive motion systems (hereinafter, briefly referred to as "linear drive system") are significantly advantageous compared to rotary-circular drive systems (hereinafter briefly referred to as "rotary drive system"). However, the adoption of linear drive systems has been limited primarily due to complexities associated with the transmission (gear) mechanisms, that transfers the generated power to the load, such as the wheels in the case of a bicycle.

The transmission or gear mechanisms that are used in rotary drive systems are not suitable for use in linear drive systems, as they make use of rotational (circular) force as part of their operation. Additionally, transmission or gear mechanisms known in the art rely on multiple gear wheels, and a chain that "jumps" between wheels, resulting in a jarring gear change and wear on the chain and gear mechanism during each gear change. Still further, users of prior art transmission or gear mechanisms must become familiar with specific gear numbers and cannot simply shift up or down, or skip multiple gears, when selecting a more acute (rapid or sharp) change in power supplied to a load.

In view of the above discussion, there is need for developing and practicing new and improved human powered linear drive systems, and applications thereof. There is also need for providing such drive systems that can be manufactured in a cost-effective manner, such that human powered devices made with such systems will have reasonable costs for consumers.

SUMMARY OF THE INVENTION

The system relates to a human powered reciprocal motion drive system, which comprises two independently driven first and second drive assemblies for interchangeably operating in driving and return strokes, each drive assembly comprising: (a) a spiral cone; (b) a driving cable, a first end of the driving cable being connected to a first winding group on the spiral cone, and a second end of the same driving cable being connected to a second winding group on the same spiral cone; (c) a pedal which is attached to said driving cable; and (d) a gear assembly for defining a ratio between the number of revolutions in said first winding group and the number of revolutions in said second winding group on the same cone, thereby to define an operative position along the thread of the spiral cone, and a respective torque that the cone applies; wherein the system further comprising a reciprocal motion mechanism which is separate from any of said two cones, a first end of the reciprocal motion mechanism being in communication with said pedal of the first drive assembly and a second end of said reciprocal motion mechanism being in communication with the pedal of the second drive assembly, said reciprocal motion mechanism, during each driving motion by one of said pedals, causes a return motion of the other of said pedals to bring it to an initial state, thereby to be ready for a next driving motion during a driving stroke of this specific drive assembly.

In an embodiment of the invention, the driving motions in the first drive assembly is simultaneous with a return motion in said second drive assembly, and vice versa.

In an embodiment of the invention, the any ratio definition by the gear assembly takes place during a return motion.

In an embodiment of the invention, the definition change of said ratio by the gear assembly involves an inner or outer shift of the operative position along the respective spiral cone.

In an embodiment of the invention, the spiral cone of the first drive assembly and the spiral cone of the second drive assembly are configured to alternately drive a load.

In an embodiment of the invention, the spiral cone of the first drive assembly and the spiral cone of the second drive assembly each comprises a one-way ratchet such that only rotation in one direction during the respective driving stroke of each spiral cone imparts movement to the load.

In an embodiment of the invention, the definitions by the two gear assemblies of the operative positions along each of the two spiral cones, respectively, are independent from one another.

In an embodiment of the invention, the gear assembly of the first drive assembly and the gear assembly of the second drive assembly, each comprising: (a) a forward/backward cable shift mechanism, for selectively moving the gear assembly either forward or backward along the driving cable; (b) a set-up mechanism for selectively defining either a forward motion or a backward motion along said driving cable; and (c) a brakes mechanism for locking the gear mechanism to the driving cable at a desired location.

In an embodiment of the invention, each gear assembly is attached to a pedal of one drive assembly.

In an embodiment of the invention, each gear assembly is attached to the respective pedal either directly or indirectly.

In an embodiment of the invention, each set-up mechanism is divided into an upper set-up unit and a lower set-up unit, to selectively define forward or backward displacement of the gear mechanism along the driving cable, respectively.

In an embodiment of the invention, each set-up mechanism includes a mechanism for defining an extent of displacement.

In an embodiment of the invention, the gear assembly of the first drive assembly and the gear assembly of the second drive assembly, each comprising: (a) a cable flip wheel; (b) a cable pulley wheel mounted on a gear axle cylinder wherein the driving cable passes around the cable pulley wheel and cable flip wheel in the gear assembly; and (c) a lower shift gear wheel and an upper shift gear wheel mounted on the gear axle cylinder such that rotation of either one of the lower shift gear wheel or the upper shift gear wheel causes rotation of the gear axle cylinder and of the cable pulley wheel to thereby shift gears by shifting the operative position of the driving cable on the respective spiral cone.

In an embodiment of the invention, each of the gear assemblies further comprising: (a) an upper gear changing mechanism comprising a plurality of push teeth for engaging with and rotating the upper shift gear wheel, wherein the number of the push teeth deployed from the upper gear changing mechanism is selected using a gear selector; and (b) a lower gear changing mechanism comprising a plurality of push teeth for engaging with and rotating the lower shift gear wheel, wherein the number of the push teeth deployed from the lower gear changing mechanism is selected using the gear selector.

In an embodiment of the invention, the number of the plurality of push teeth deployed for a gear change is between one push tooth and all of the plurality of push teeth.

In an embodiment of the invention, a gear change by the gear assembly is semi-automatic.

In an embodiment of the invention, each of the gear assemblies further comprising a reset mechanism for returning the upper gear changing mechanism or lower gear changing mechanism to a starting position following engagement with the upper shift gear wheel or lower shift gear wheel.

In an embodiment of the invention, the reset mechanism comprising: (a) a reset tooth configured to engage a blocking wedge mounted on an inner surface of a drive assembly enclosure to cause a gear change; (b) a reset spring; and (c) a bearing ramp mounted on an inner surface of a gear enclosure such that the reset bearing engages the ramp following a gear change to thereby retract the reset tooth such that the reset spring pulls the upper gear changing mechanism or lower gear changing mechanism to a starting position.

In an embodiment of the invention, each of the gear assemblies is mounted and travels within a respective drive assembly enclosure.

In an embodiment of the invention, each of the driving cables is looped around a respective drive roller tensioned by a respective throttle spring attached to the respective drive assembly enclosure, the tensioned drive roller being adapted for absorbing slack from the driving cable when it shifts in position around the respective spiral cone.

In an embodiment of the invention, the reciprocal motion mechanism is a reciprocal motion cable or a reciprocal motion chain.

In an embodiment of the invention, the reciprocal motion cable is looped over at least one reciprocal pulley wheel mounted onto a load frame, wherein the reciprocal motion cable is attached at each of its two ends to the respective gear assembly, which is in turn attached to a respective pedal.

In an embodiment of the invention, a gear selector is attached to a gear change cable and wherein the gear change cable is attached to a gear swivel, wherein the gear swivel is mounted on the same axle as a pedal bar such that the gear swivel swivels when the pedal bar moves as part of its reciprocal motion, wherein a gear swivel pin moves within the gear swivel such that movement of the gear swivel caused by the gear selector causes movement of the gear swivel pin, wherein the gear swivel pin is attached to a gear change cable extension which in turn is attached to the plurality of push teeth, such that movement of the gear swivel pin results in engagement of one or more of the plurality of push teeth with the upper shift gear wheel or the lower shift gear wheel for rotating the upper shift gear wheel or lower shift gear wheel for effecting a gear change.

In an embodiment of the invention, the system is configured for humanly powering a human powered device selected from the group consisting of: winches, bicycles, tricycles, cranes, vehicles, and human powered devices on water-based, marine type, vehicles or vessels.

In an embodiment of the invention, the water-based, marine type, vehicles or vessels are selected from the group consisting of: boats, yachts, and ships.

In an embodiment of the invention, the driving cable is a driving chain.

In an embodiment of the invention, the system comprising a local reset for effecting a repetition of a gear change based on a defined set-up, and a global reset for zeroing any defined set-up.

BRIEF DESCRIPTION OF THE DRAWINGS

In the drawings:

FIGS. 2A-2J schematically illustrate exemplary embodiments of operation of an exemplary human powered linear drive system (of an exemplary human powered device being a bicycle), according to some embodiments of the invention;

DETAILED DESCRIPTION OF PREFERRED EMBODIMENTS

Figure 1:
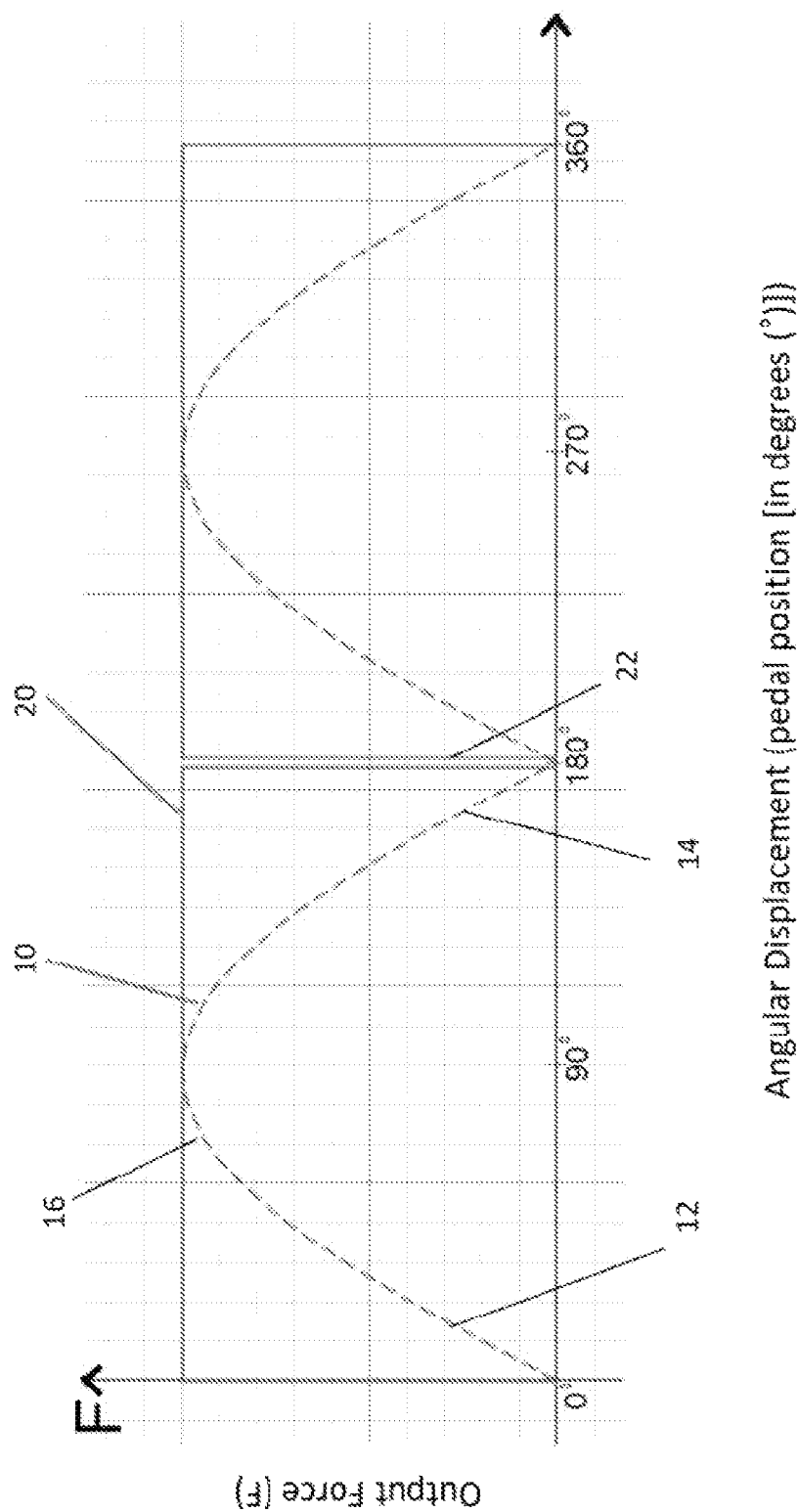
FIG. 1 graphically illustrates a comparison of effective power [in terms of work per unit time, or Output Force (F)×Angular Displacement (pedal position) per unit time] generated by rotary (circular) motion vs. reciprocal (linear) motion of a bicycle (as an exemplary human powered device)

The present invention, in some embodiments thereof, relates to a human powered linear drive system, and applications thereof. Some embodiments of the invention are in the form of human powered linear drive systems that are applicable to a wide variety of different types of human powered devices, for example, winches, bicycles, tricycles, cranes, vehicles, and human powered devices on water-based (marine type) vehicles or vessels (such as boats, yachts, and ships).

In exemplary embodiments of the invention, the transmission or gear mechanism is semi-automatic, requiring a user to only make an up-gear or down-gear selection, and a selection of the level (incremental or acute) of required gear change. Once the user has made the selection, the gear change continually takes place on every passive (return) cycle (until reset) allowing the user to feel when the correct gear ratio has been satisfactorily reached. Thus, a user does not have to select a specific gear, rather, only provide the selection of up-gear or down-gear, and level thereof, while continuing to pedal, until the pedaling effort required seems appropriate, resulting in a more user-friendly gear change process. The ability to select a level of change (incremental or acute) enables a user to make fast changes that skip several gear ratios per change.

Such a continual change of gears is enabled by use of a single spiral cone in each of the two sides of the linear drive system as a primary drive wheel, thereby enabling smooth gear shifting without the jarring typically associated with multi-gear rotary drive systems known in the art. Additionally, in exemplary embodiments of the invention, each gear change takes place during the return cycle, in which the tension on the gear assembly, on the cable (or chain) and on the spiral cone is substantially reduced. The automatic, return, and continuous gear change mechanism therefore reduces wear and tear on the parts involved in the overall linear drive system, resulting in a more reliable transmission and gear mechanism in the long term.

In exemplary embodiments of the invention, user activated levers (such as pedals, or similar types of leg or arm operated levers) are pushed or pulled by an operator to drive the spiral cones (one pedal for each cone), via matching gear assemblies, in order to drive the load of a human powered device. As disclosed herein, such a load may be of, or associated with, any form of a human powered device driven by reciprocal (linear) motion. Two cable (or chain) winding groups are provided along the thread of each of the cones, an "outer" winding group in proximity to the base of the cone, and an "inner" winding group in proximity to the tip of the cone. Hereinafter, for the sake of simplicity the term "cable" is used to encompass both of the cable and chain options. A single driving cable (or chain) connects between these two winding groups such that when a cable section is pulled from one of these groups, another section is collected by the other winding group, and vice versa. The position of the pedal along the driving cable in fact defines an active location along the cone's thread where the cable pulling and collection are made (namely whether the active location is on a more outer section of the thread or on an inner one), and this active location in fact defines the moment that the cone applies to the load. A gear selection is made using gear selectors that activate the transmission or gear mechanism to shift and define the position of the gear assembly along the drive cable. As the gear assembly is rigidly attached to the pedal, the shift of the gear assembly along the cable in fact defines the moment that the cone applies on the load. The use of a spiral cone thus enables a user to make gear changes by shifting the position of the active location along the spiral cone, resulting in effectively transferring power generated by reciprocal (linear) motion to a target load.

Implementation of exemplary embodiments of the present invention attempt to address, and overcome, at least some of the various limitations or problems associated with prior art human powered drive systems, particularly, drive systems that are based on rotary (circular) motion. In addition to the above aspects and advantages relative to prior art drive systems, exemplary embodiments of the herein disclosed human powered linear drive system can be manufactured in a cost-effective manner, such that human powered devices made with such systems will have reasonable costs for consumers.

Reference in the specification to 'one embodiment', 'an embodiment', 'some embodiments' or 'other embodiments' means that a particular feature, structure, or characteristic described in connection with the embodiments is included in at least one embodiment, but not necessarily all embodiments, of the present disclosure. It is understood that the phraseology and terminology employed herein are not to be construed as limiting and are for descriptive purpose only.

The terms 'reciprocal motion' and 'linear motion', as used herein, are interchangeable. 'Reciprocal motion', as used herein, in a non-limiting manner, refers to repetitive motion in a direction along a linear path, and which is generated on two opposing, and generally parallel, sides, alternately per each side, by at least two force appliers, such as, but not limited to, two arms or two legs of a user (i.e., one arm or one leg per side of the generated motion).

The term 'reciprocal (linear) motion', as used herein, includes two cycles, an active cycle and a return cycle. The active cycle is powered by the user acting (applying force) on a first side of a reciprocal (linear) motion mechanism. As illustratively described herein, simultaneously with the active cycle at the first side, a pulley mechanism causes the second side to undergo a return cycle-moving in the opposite direction to that of the active cycle. In such a manner, the pedal of the second side is returned to a position ready for a next active cycle. Active cycles may require (linearly) pushing or pulling by a user, depending on the application of the reciprocal (linear) motion mechanism and the position of the user relative to the reciprocal (linear) motion mechanism.

The terms 'operator', 'rider', and 'user', as used herein, are interchangeable, and refer to a human riding or using a linear drive system to power and effect motion of a load. The terms 'transmission' and 'gear', as used herein, are interchangeable. The term 'pedal', as used herein, refers to any attachment or pair of attachments (such as grips, handles, or levers) that are operatively connected to the herein disclosed exemplary embodiments of the linear drive system, and which may be pushed or pulled by force appliers (arms, legs) of an operator, rider, or user. Physical-orientational terms, such as, location, direction, 'right side', and 'left side' are used herein in a non-limiting manner.

For purposes of further understanding exemplary embodiments of the present invention, in the following illustrative description thereof, reference is made to the drawings. Throughout the following description and accompanying drawings, same reference numbers refer to same components, elements, or features. It is to be understood that the invention is not necessarily limited in its application to particular details of construction or/and arrangement of exemplary system or device components, or to any particular sequential ordering of exemplary method steps or procedures, set forth in the following illustrative description. The invention is capable of having other exemplary embodiments, or/and of being practiced or carried out in various alternative ways.

In exemplary embodiments, the herein disclosed invention is in the form of human powered linear drive systems that are applicable to a wide variety of different types of human powered devices, for example, winches, bicycles, tricycles, cranes, vehicles, and human powered devices on water-based (marine type) vehicles or vessels (such as boats, yachts, and ships).

These aspects of the present invention, in a non-limiting manner, are interrelated, in that illustrative description of characteristics and technical features of one aspect also relates to, and is fully applicable for, illustratively describing characteristics and technical features of other aspects of the present invention. For example, illustrative description of characteristics and technical features of the human powered linear drive system, or of a component (e.g., device, assembly) of the drive system, also relates to, and is fully applicable for, illustratively describing characteristics and technical features of one or more aspects about a method of humanly powering a human powered device.

Additionally, for example, in a non-limiting manner, embodiments of the human powered linear drive system, or of a component (e.g., device, assembly) of the drive system, are suitable for implementing embodiments of a method of humanly powering a human powered device.

Reference is now made to FIGS. 2A-2J that schematically illustrate exemplary embodiments of a human powered linear drive system, in this specific example, a bicycle. The bicycle of the invention has two independently-driven drive assemblies, a "first-side" drive assembly "A", and a second side drive assembly "B". As shown in FIGS. 2A-2E, pedals 103A and 103B are pushed down by an operator to drive spiral cones 162A and 162B via gear assembly 120 to drive load 180. Load 180 is here shown to be the rear wheel of a bicycle but as before, load 180 may be any suitable load. It should be noted that the term "independently driven", as used throughout this application, refers only to the driving cycle during which a pushing force is applied to the pedal (or similar). This term does not intend to refer to the return cycle, nor to indicate that the return cycle by the two separate drive assemblies is performed independent from one another.

The figures show a first (or left) side "A" and second (or right) side "B" of the same bicycle to illustrate relative positions of pedals 103 and associated gearboxes. Same parts of linear drive system 100 that are duplicated on each side share the same numbering with an "A" or "B" added to the reference numeral. As shown, the driving mechanisms of the first (or left) side and second (or right) side operate independently from each other (excluding the return mechanism which will be discussed separately herein below—FIGS. 2h and 2I).

Figure 2A:
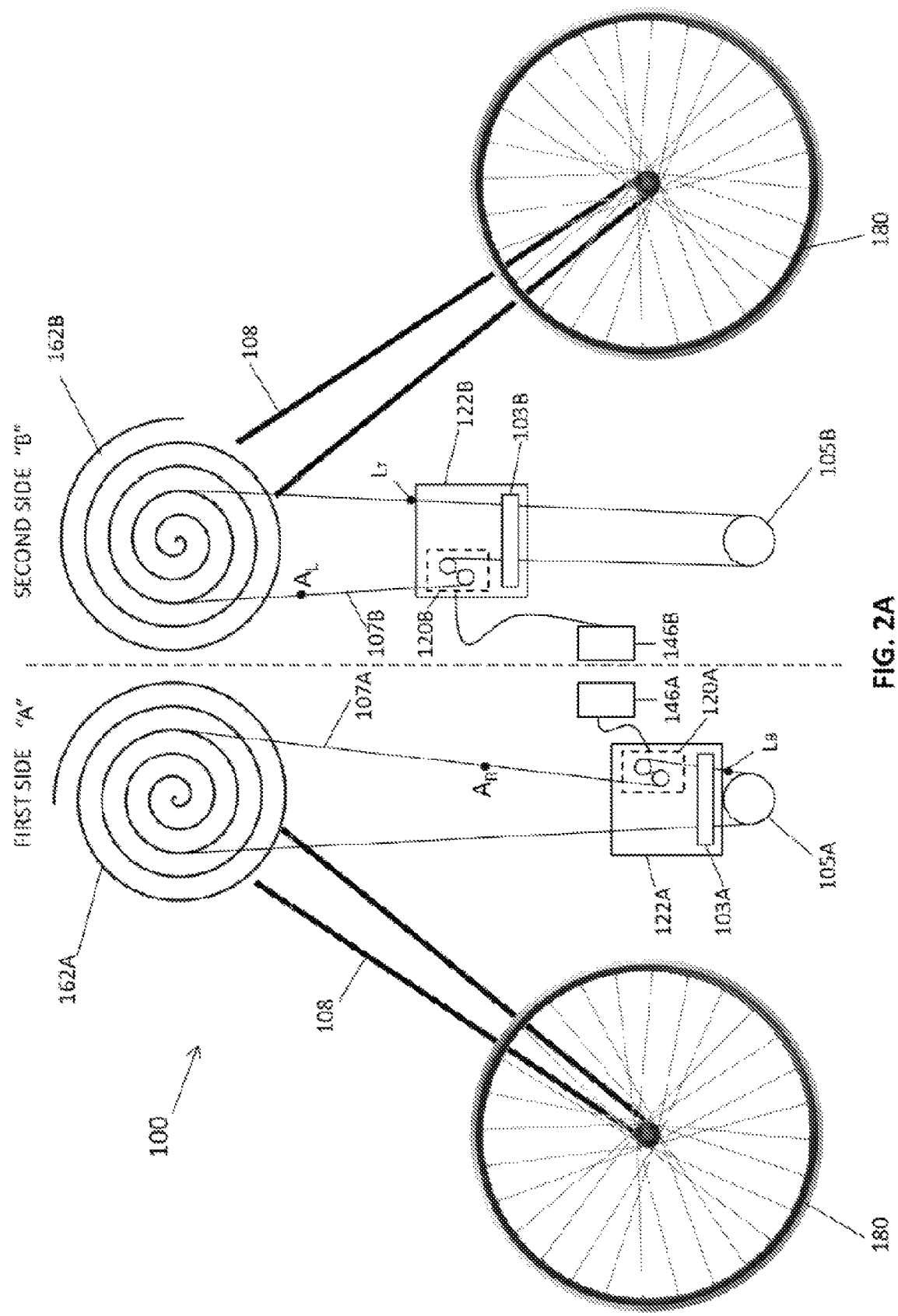

In FIG. 2A, linear drive system 100 is shown in a starting position where pedal 103B is at the top limit $L_T$ of its range of travel, and pedal 103A is at the bottom limit $L_B$ of its range of travel. The range of travel of the pedals 103 is rigidly fixed (see for example arrows 117 in FIG. 3B). Pedals 103 are rigidly attached to a gear assembly enclosure 122, which in turn houses gear assembly 120. Therefore, gear assembly enclosure 122 and pedal 103 move together within the pedal range 117 (namely between points $L_T$ and $L_B$), while the movement of the gear assembly enclosure is performed within drive assembly enclosure 101 (see FIG. 3B). Drive assembly enclosure 101 also houses the spiral cone assembly 160 (see FIG. 3C) which includes the two cones 162.

In exemplary embodiments, each of the two cables 107 is wound through gear assembly 120 around drive roller wheel 105 and attached on both ends inside spiral cone 162. More specifically, and as best shown in FIG. 2F, a first end of each cable 107 is attached at an outer position 173 of cone 162, and the other end of cable 162 is attached at an inner position 174 of a same cone 162. In some embodiments, cable 107 is implemented as a chain and it should therefore be appreciated that either a cable or chain can be used, and the term cable as used herein covers both alternatives. As shown in FIG. 2H, within gear assembly 120 cable 107 is wound around cable flip wheel 142 to flip its direction and then is wound around cable pulley wheel 138. Cable pulley wheel 138 is adapted to be locked when no gear change takes place, such that cable 107 is locked at a fixed cable position into gear assembly 120, whereby movement of gear assembly 120 results in movement of cable 107 and vice versa. Alternatively, when a chain 107 is used, the links of chain 107 are locked onto teeth (such as in the embodiment described below of FIG. 4H) provided on cable pulley wheel 138 and cable flip wheel 142.

Figure 2B:
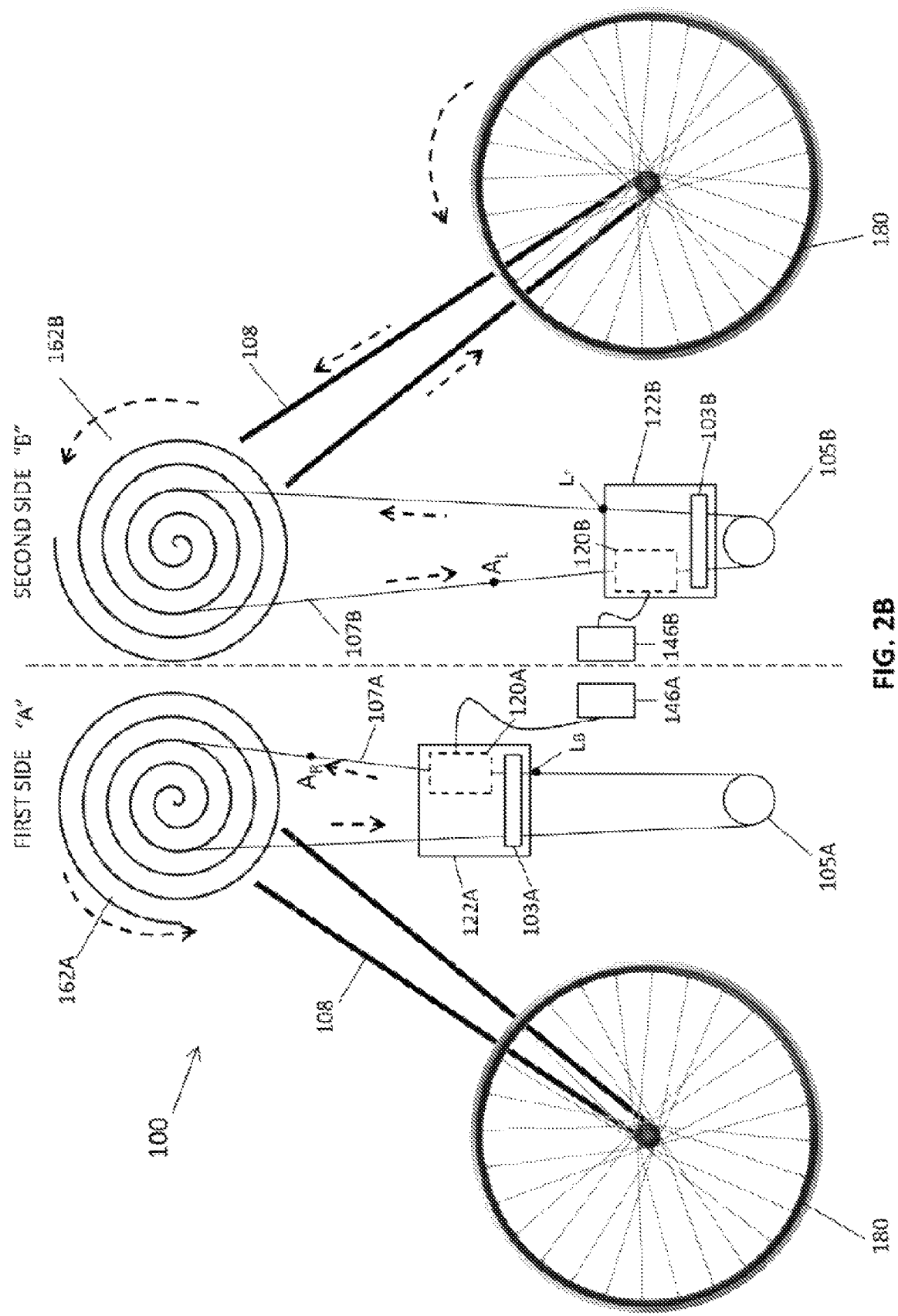
Figure 2C:
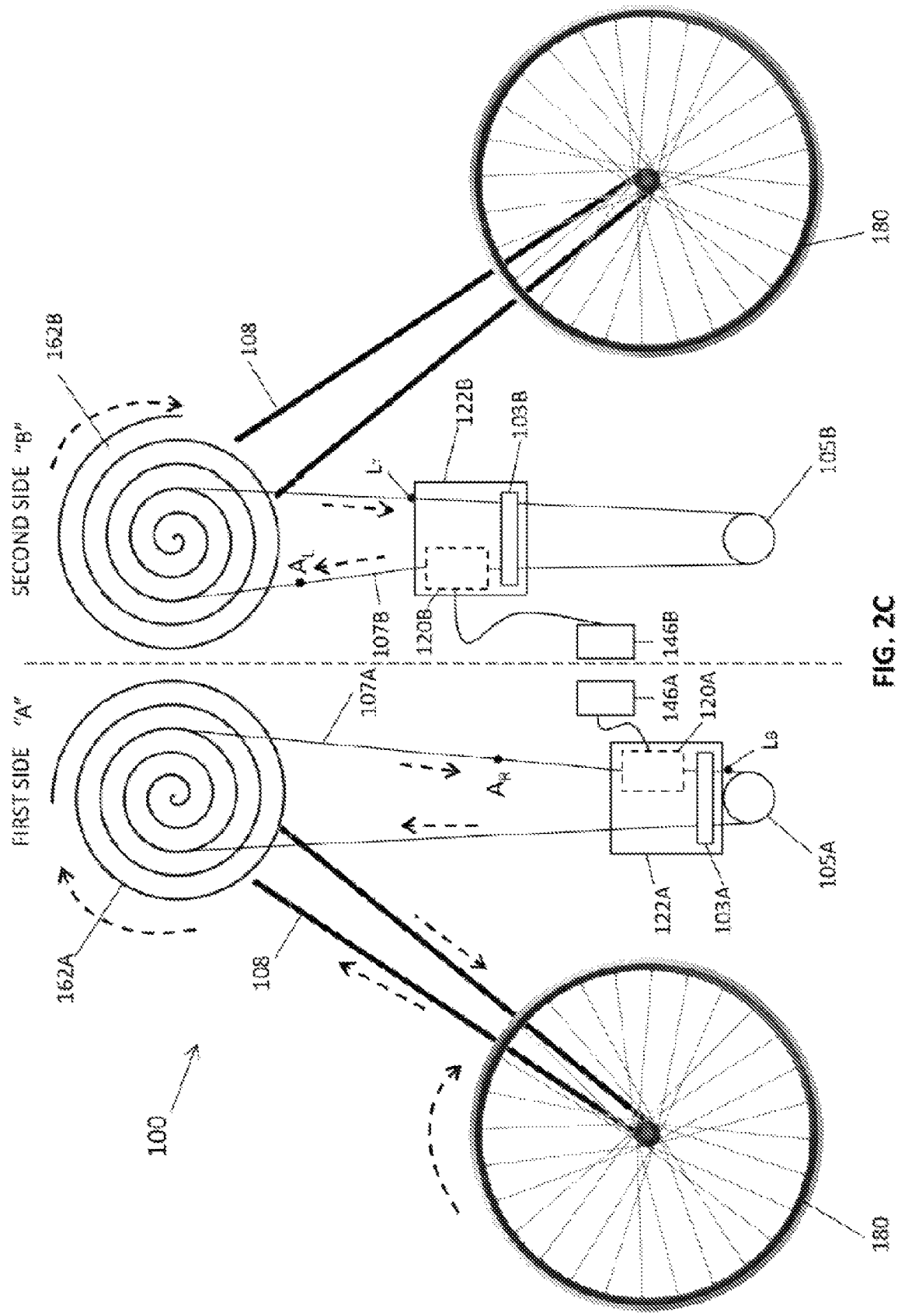
Figure 2D:
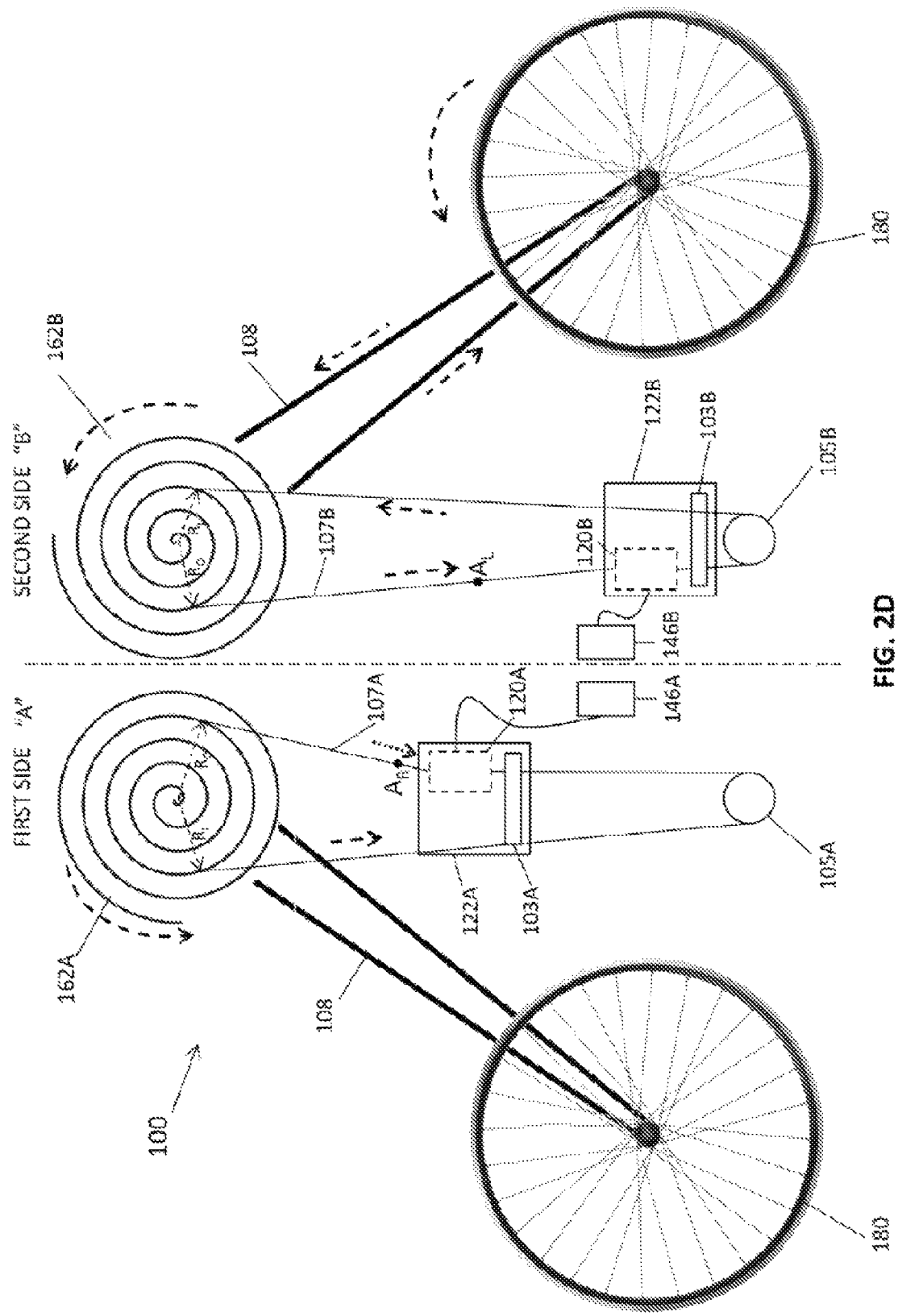
Figure 2E:
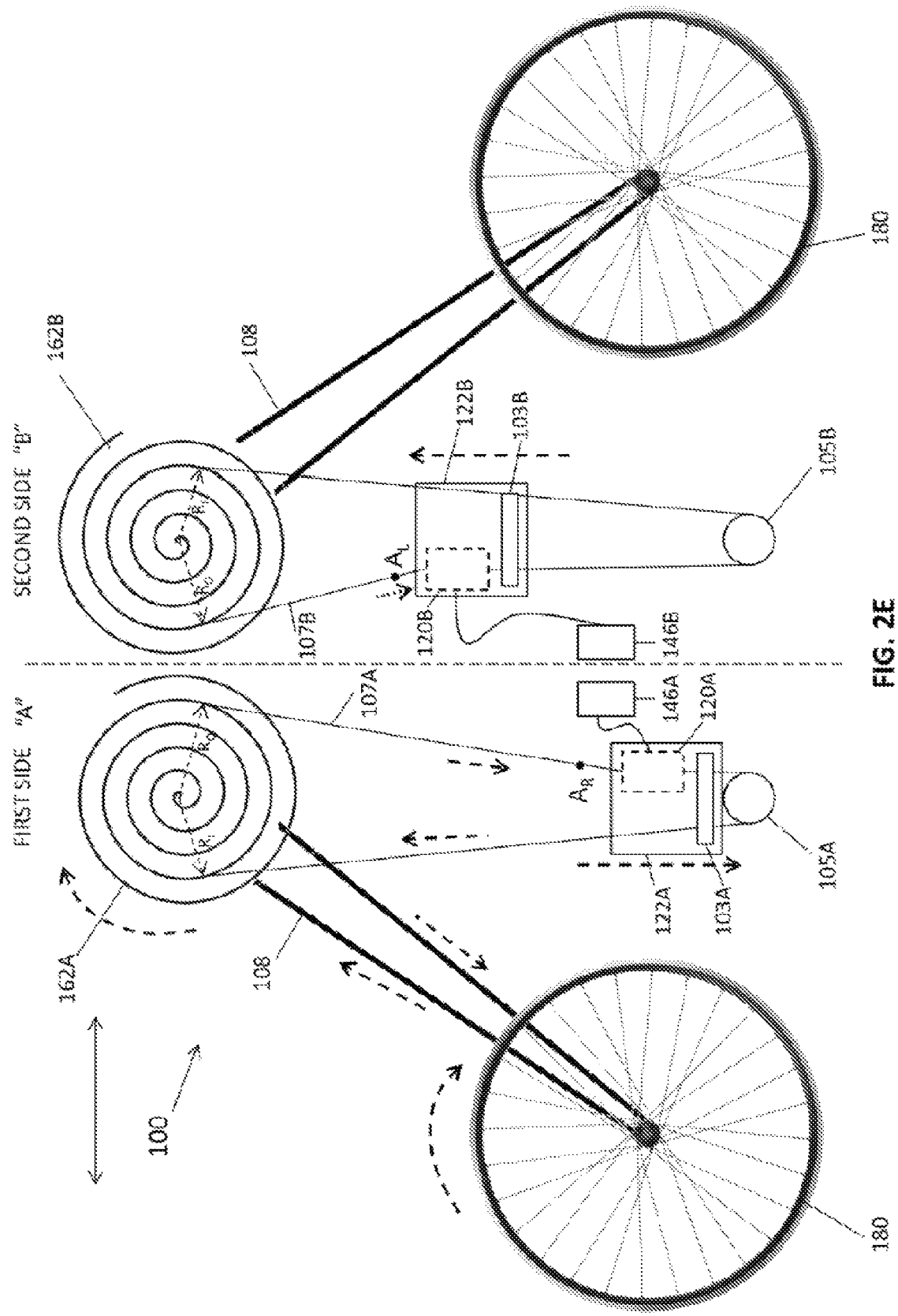
Figure 2G:
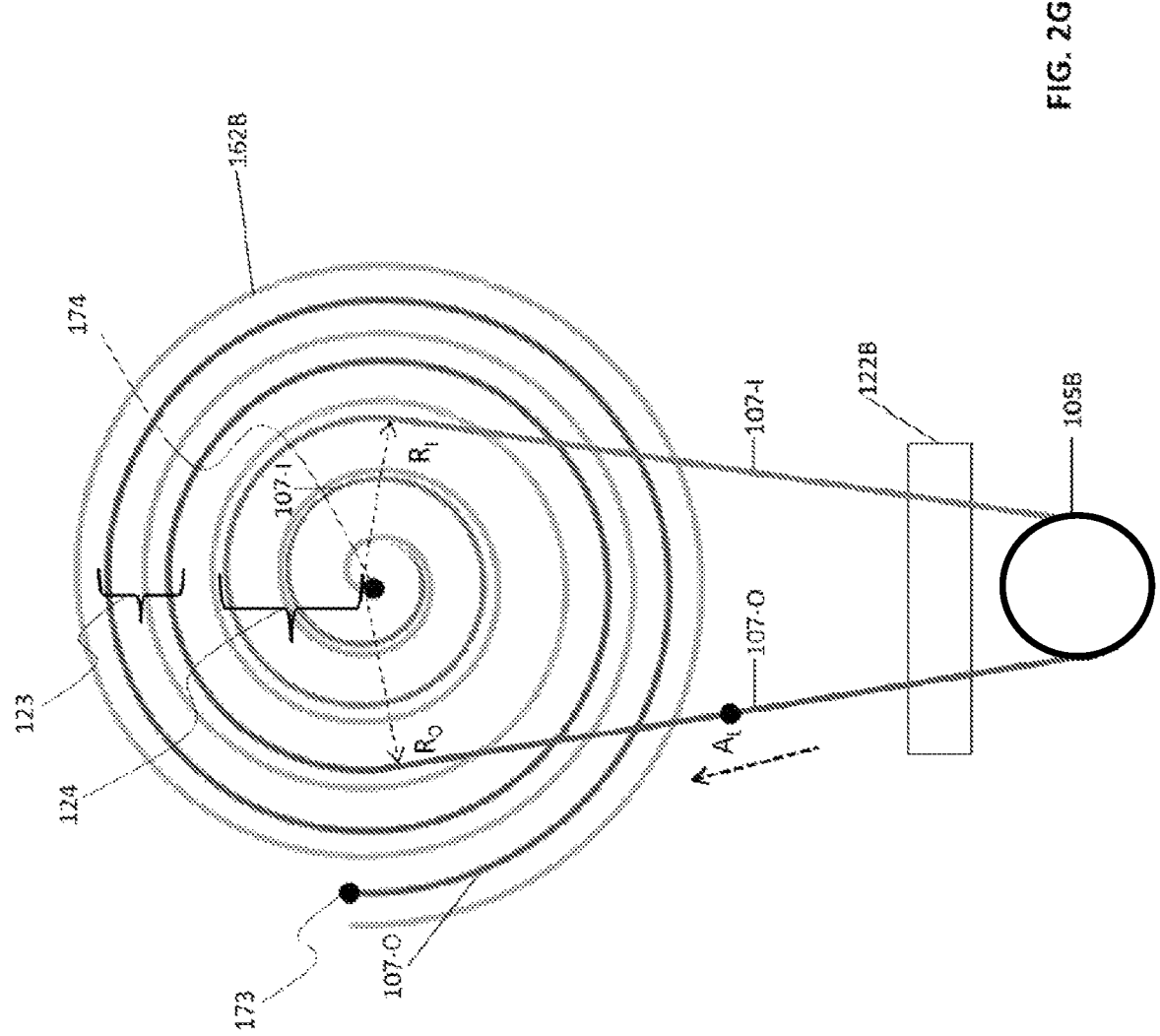

As shown in FIGS. 2F and 2G, the two ends of each cable 107 are affixed at two inner and outer points, 173 and 174, respectively of a same cone 162. Each cone 162 contains two separate winding groups, an outer winding group 123, and an inner winding group 124. More specifically, a first end of cable 107 coming from gear assembly 120 is first wound around cone 162 at an outer location along the cone's thread to form the outer winding group 123, and then attached at outer point 173. The second end of cable 107 coming from the gear assembly 120 is first wound around the same cone 162 at an inner location along the cone's thread to form the inner winding group 124, and then attached at inner point 174. A very short thread gap 126 separates between the entry point $E_N$ of the cable into the inner winding group 124 and between the entry point $E_W$ into the outer winding group 123. As will be discussed further below, while the respective locations of the entry points $E_N$ and $E_W$ along the thread dynamically change during the drive and return cycles, and even more during various gear changes, the thread gap 126 is always kept small, being a portion of a single thread. Each inner cable section 107-I is wound inwards around spiral cone 162 and is fixedly attached at inner point 174 to spiral cone 162. Outer cable section 107-O is wound outwards around the same spiral cone 162 and is fixedly attached at its outer end 173 to spiral cone 162. Cable 107 turns around a fixed drive roller 105 which is mounted at the bottom end of drive assembly enclosure 101 (see FIG. 3B). In FIGS. 2A-2G, and in other figures herein, outer cable 107-O is shown as engaging gear assembly 120, and inner cable 107-I is shown as passing by or through gear assembly 120 without engaging gear assembly 120. It should be appreciated that this convention is purely for illustration, and in practice, inner cable 107-I may engage gear assembly 120 when outer cable 107-O passes through gear assembly 120. Exemplary embodiments using chains, such as shown in FIG. 4G, do not require the winding of inner and outer cables around spiral cones 162 (as in FIGS. 2F and 2G), as spokes over the outer surface of the spiral cone 462 hold the chain in place.

During a regular operation, and without affecting a gear change, the pedal, and in fact the entire gear assembly enclosure 122 is affixed to cable 107. Therefore, and as shown in FIG. 2F, during a drive cycle, the downward movement of pedal 103 causes the pulling of a specific cable section from the outer winding group 123 of spiral cone 162, causing the cone 162 to turn counter clockwise (arrow 195), and the return of another cable section into the inner winding group 124 (due to same counter clockwise rotation of the spiral cone). During the return cycle, an opposite process in performed, where cable is pulled from the inner winding group 124, and returned to the outer winding group 123 (however, in this case the cone operates in a non-load, namely in a free wheel manner of rotation). In FIGS. 2A-2G reference points $A_R$ and $A_L$ are shown respectively on cables 107A and 107B to illustrate movement and relative positions of cables 107 during pedal movement and during gear changes. FIGS. 2A-2G are provided for illustration of the principle of operation of the reciprocal (linear) motion drive (and mechanism) described herein and it should be appreciated that the illustrated rotations of spiral cones 162 and related movements of gear enclosures 122 and reference points $A_R$ and $A_L$ may or may not represent exact scale of movement of an actual constructed version of linear drive system 100.

As shown in FIG. 2B, pedal 103B is pushed downward such as by a rider of a bicycle. Gear assembly enclosure 122B, being attached to pedal 103B, is thus also pushed downwards, and gear assembly 120B, being attached to gear assembly enclosure 122B, also moves downwards. Cable 107B, being locked on one side into gear assembly 120B, is pulled downward, and in turn pulls on spiral cone 162B, causing rotation of spiral cone 162B. In the exemplary embodiment shown in FIG. 2B, spiral cone 162B rotates in a counterclockwise direction, for illustration only, and linear drive system 100 may cause rotation or movement in any desired direction. Rotation of spiral cone 162B results in rotation of load chain 108, and thus rotation of load 180, here shown as the wheel of a bicycle. As shown, reference points $A_R$ and $A_L$ remain at the same distance from gear assemblies 120A and 120B, respectively, as no gear change has taken place. FIG. 2C similarly shows a situation when pedal 103A is pushed downwards, while pedal 103B is pulled up.

Figure 2I:
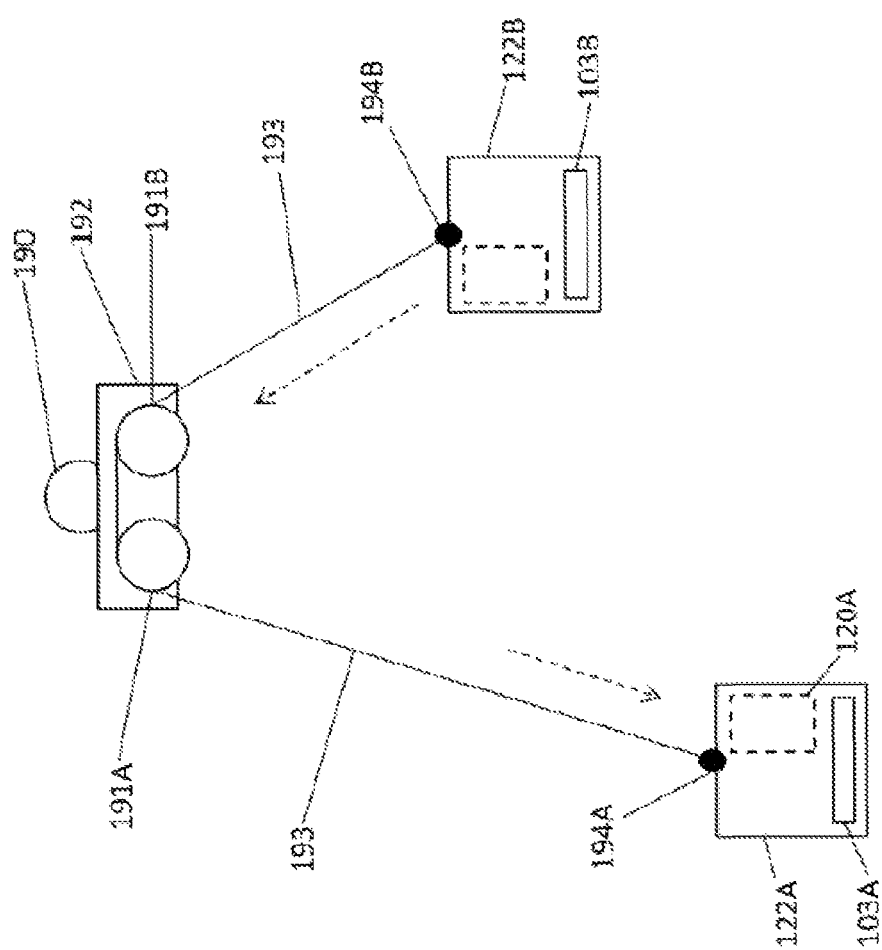
Figure 2J:
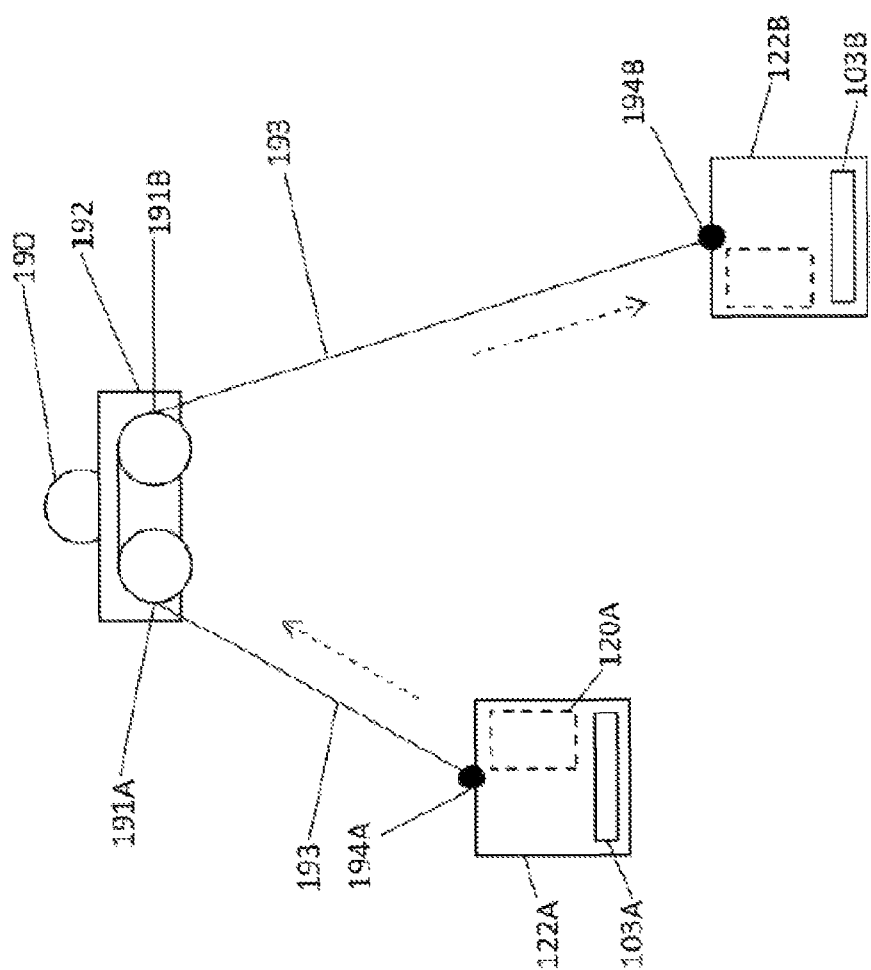

FIGS. 2I and 2J illustrate an embodiment of a reciprocal (linear) motion pulley mechanism for pulling up a pedal 103 on a first side (return cycle), when a pedal 103 on a second side is pushed down (active cycle), and vice versa. Gear assembly enclosures 122 are attached to reciprocal motion cable 193 using cable attachments 194. Cable 193 is looped over reciprocal pulley wheels 191. Pulley wheels 191 are mounted on reciprocal motion mount 192 which in turn is mounted onto load frame 190. In the illustrated embodiment, load frame 190 is a bicycle frame. As shown, the reciprocal cable 193, as well as the pullies 191A and 191B are entirely independent from the spiral cones 162. As above, the active cycle may similarly be for a user to pull a pedal or handle 103 (rather than pushing) and in this case the return cycle will be the push cycle and the mechanism of FIGS. 2I and 2J will be adapted accordingly.

In use (FIG. 2I), when pedal 103A is pushed down (for simplicity, only the bar of the pedal is shown), gear assembly enclosure 122A is pulled down, pulling on reciprocal motion cable 193. Cable 193 thus pulls gear assembly enclosure 122B upwards along with pedal 103B. Conversely, when pedal 103B is pushed down (FIG. 2J), gear assembly enclosure 122B is pulled down, pulling on reciprocal motion cable 193. Cable 193 thus pulls gear assembly enclosure 122A upwards along with pedal 103B.

When pedal 103B and gear assembly enclosure 122B are pushed downwards, gear assembly enclosure 122A and pedal 103A move upwards and therefore gear assembly 120A also moves upwards. Cable 107A moves with gear assembly 120A and causes spiral cone 162A to rotate. For example, FIG. 2B, shows that when pedal 103A moves upwards during its return cycle, spiral cone 162A rotates in a counterclockwise direction, however in a free-wheel manner that does not apply any force to the load 180. More specifically, although spiral cone 162A rotates, there is no movement caused in load chain 108 due to the use of a one-way ratchet mechanism in spiral cone assembly 160 (see FIG. 3K), as will be described further below. Thus, in the embodiment of FIGS. 2A-2H, only a downward motion of pedals 103 causes movement of load 180.

As shown in FIG. 2C, pedal 103A is pushed downward such as by a rider of a bicycle. Gear assembly enclosure 122A being attached to pedal 103A is thus also pushed downwards and gear assembly 120A, being attached to gear assembly enclosure 122A also moves downwards. Cable 107A being locked on one side into gear assembly 120A is pulled downward and in turn pulls on spiral cone 162A causing rotation of spiral cone 162A. In the illustration of FIG. 2C, spiral cone 162A rotates in a clockwise direction but it should be appreciated that this is for illustration only and system 100 may cause rotation or movement in any desired direction. The rotation of spiral cone 162A results in the rotation of load chain 108 and thus rotation of load 180, here shown as the wheel of a bicycle.

When pedal 103A and gear assembly enclosure 122A are pushed downwards, gear assembly enclosure 122B and pedal 103B move upwards (as described above with reference to FIGS. 2I and 2J). Cable 107B moves with gear assembly 120B and causes spiral cone 162B to rotate. Spiral cone 162B is here shown as rotating in a clockwise direction but it should be appreciated that this is for illustration only and system 100 may cause rotation or movement in any desired direction. Although spiral cone 162B rotates, there is no movement caused in load chain 108 due to the use in spiral cone assembly 160 (see FIG. 3K) of a one-way ratchet mechanism as will be described further below. Thus, in the embodiment of FIGS. 2A-2H only downward motion of pedals 103 causes movement of load 180. As before, points $A_R$ and $A_L$ remain at the same distance from gear assemblies 120A and 120B respectively as no gear change has taken place.

FIGS. 2D-2G illustrate how the gear assembly 120 is used to alter the ratio of movement of pedals 103 to movement of load 180. When required by the user of system 100 such as but not limited to a rider of a bicycle, gear selectors 146 (also shown in FIG. 3A) are used to change the gear ratio provided by gear assemblies 120. In some embodiments, a selector 146 is provided for each side of linear drive system 100, to enable different gearing per side. In some embodiments, selectors 146 are mounted on the handlebars of a bicycle as with gear selectors known in the art.

FIGS. 2D-2E illustrate changing to a higher gear such that less pedal 103 movement is required for movement of load 180, for example but not limited to when riding a bicycle down an incline. FIGS. 2F and 2G show the movement of cable 107B but it should be appreciated that movement of cable 107A is the same but reversed. In FIG. 2D, pedal 103B is shown at its bottom range of movement, while an arbitrary point $A_L$ is marked at the left side of cable 107B. FIG. 2E shows the situation when the pedal 103B arrives the top of its range of movement, following its return (upwards direction) cycle, while a change of gear is performed during this return cycle. It can clearly be seen that in FIG. 2E the distance between point $A_L$ and the gear assembly 122B is significantly shorter than in FIG. 2D. That means that a cable section was "taken" from the outer winding group 123 (see FIG. 2F) of the spiral cone 162B and was given to the inner winding group 124. Therefore, in the next drive cycle of pedal 103B the cable 107B will be pulled from a cone thread having a larger radius compared to the case of FIG. 2D (which shows the position of point $A_L$ relative to assembly 122B before the gear change. Therefore, in the situation of FIG. 2E a larger torque will be applied to the cone 162B compared to the case of FIG. 2D. As noted, according to preferred embodiments of the invention, a gear change is performed during the return cycle, when there is a very low tension on the cable 107, on the respective spiral cone 162, and on the gear mechanism 120 compared to the tension that these components sustain during the drive cycle. More specifically, any gear change occurs when the respective pedal 103 is pulled upwards in its return cycle, while the opposite pedal is in its drive (active) cycle.

As shown, the gear assembly 120 operates by either "taking" a cable portion from the outer winding group 123 and "giving" this portion to the inner winding group 124 (therefore causing future operation on a wider-radius of the cone's thread), or vice versa, namely, "taking" a cable portion from the inner winding group 124 and "giving" this portion to the outer winding group 123 (therefore causing future operation on a narrower-radius of the cone's thread). The radius from the center of spiral cone 162 to the entry point of cable 107-O into spiral cone 162 is herein labelled $R_O$ and the radius from the center of spiral cone 162 to the entry point of cable 107-I into spiral cone 162 is herein labelled $R_I$. The combination of $R_O$ and $R_I$ ($R_O + R_I$) is herein referred to as "D". An increased distance "D" results in a higher gear ratio. Movement of pedals 103 thus results in greater rotations of spiral cones 162 and thus greater rotations of load 180. A similar gear change may be performed in the first side "A" during its return cycle, independent and even different from the change of the second side "D". The mechanism used by gear assembly 120 to shift cable 107 is further described below with reference to FIGS. 3D-3H.

FIG. 2G illustrates a change to a lower gear such that greater pedal 103 movement is required for movement of load 180, for example but not limited to when riding a bicycle up an incline. Gear assembly 120 moves cable 107 such that a cable portion is "taken" from the inner winding group 124, and "given" to the outer winding group 123. The shift of a cable portion from the inner cable 107-I to the outer cable 107-O (and therefore to the outer winding group 123) results in a decreased distance "D" between where outer cable 107-O and inner cable 107-I engage spiral cone 162. The of decreased distance "D" results in a lower gear ratio. Movement of pedals 103 thus results in smaller rotations of spiral cones 162 and thus smaller rotations of load 180. Changes to a lower gear also takes place on the return cycle as for the changes to a higher gear described above.

Figure 3A:
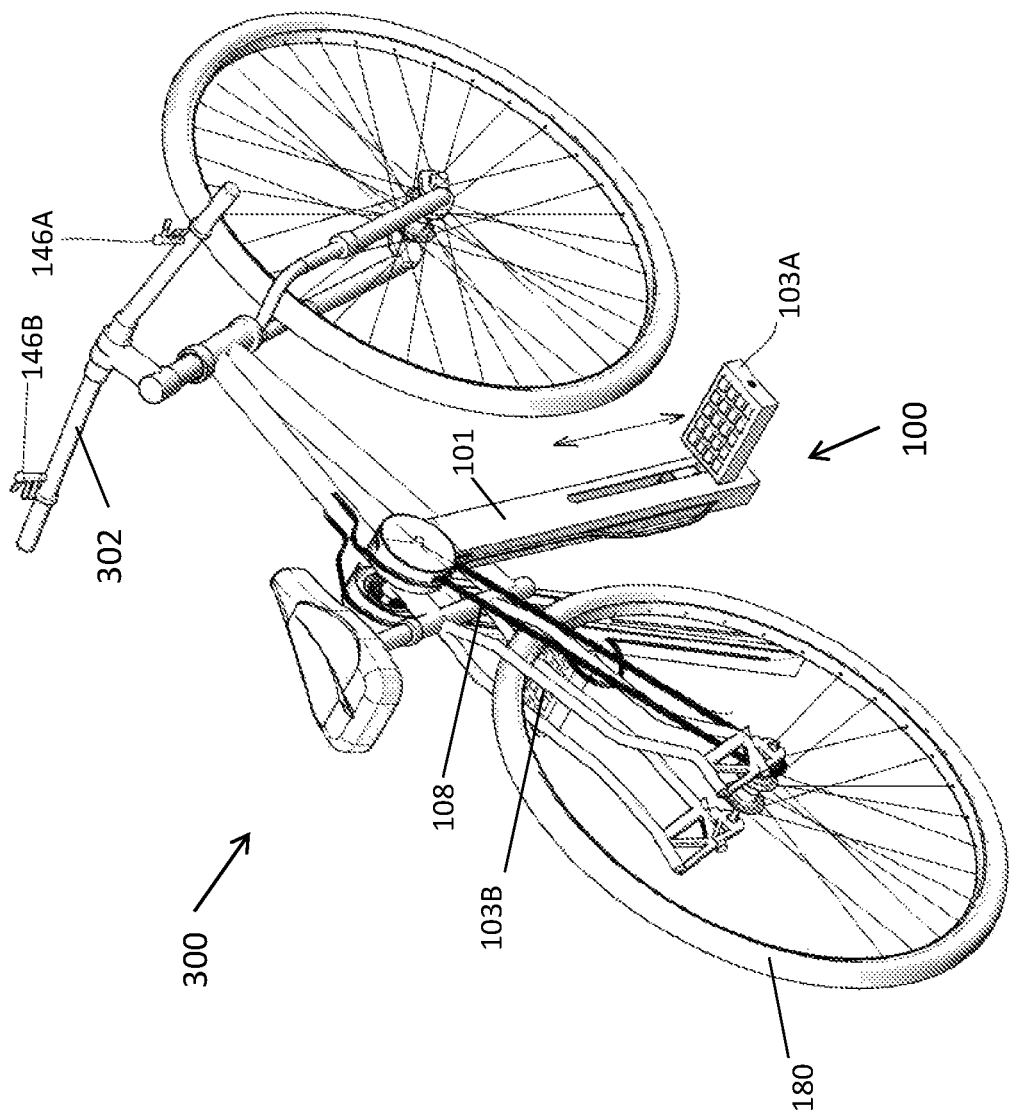
FIGS. 3A-3V schematically illustrate exemplary embodiments of the invention.
Figure 3B:
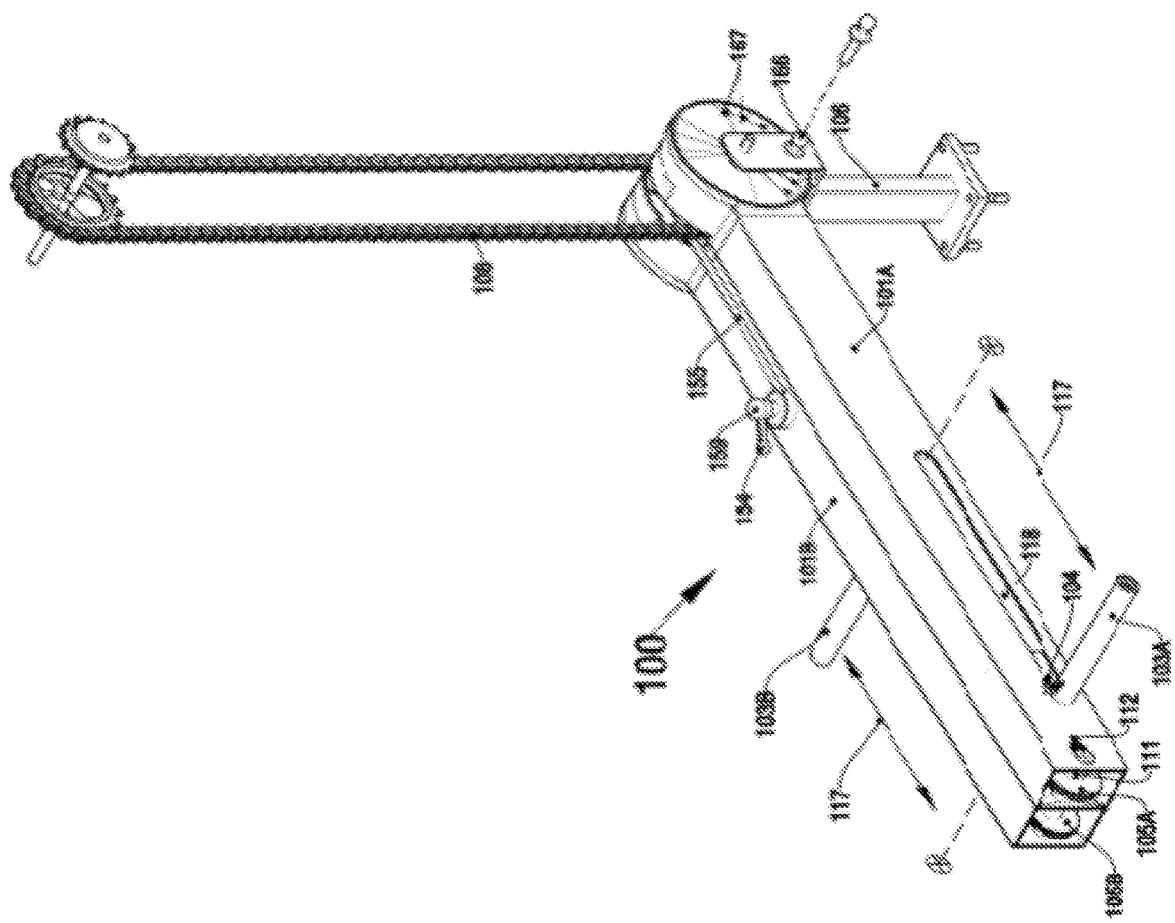
Figure 3C:
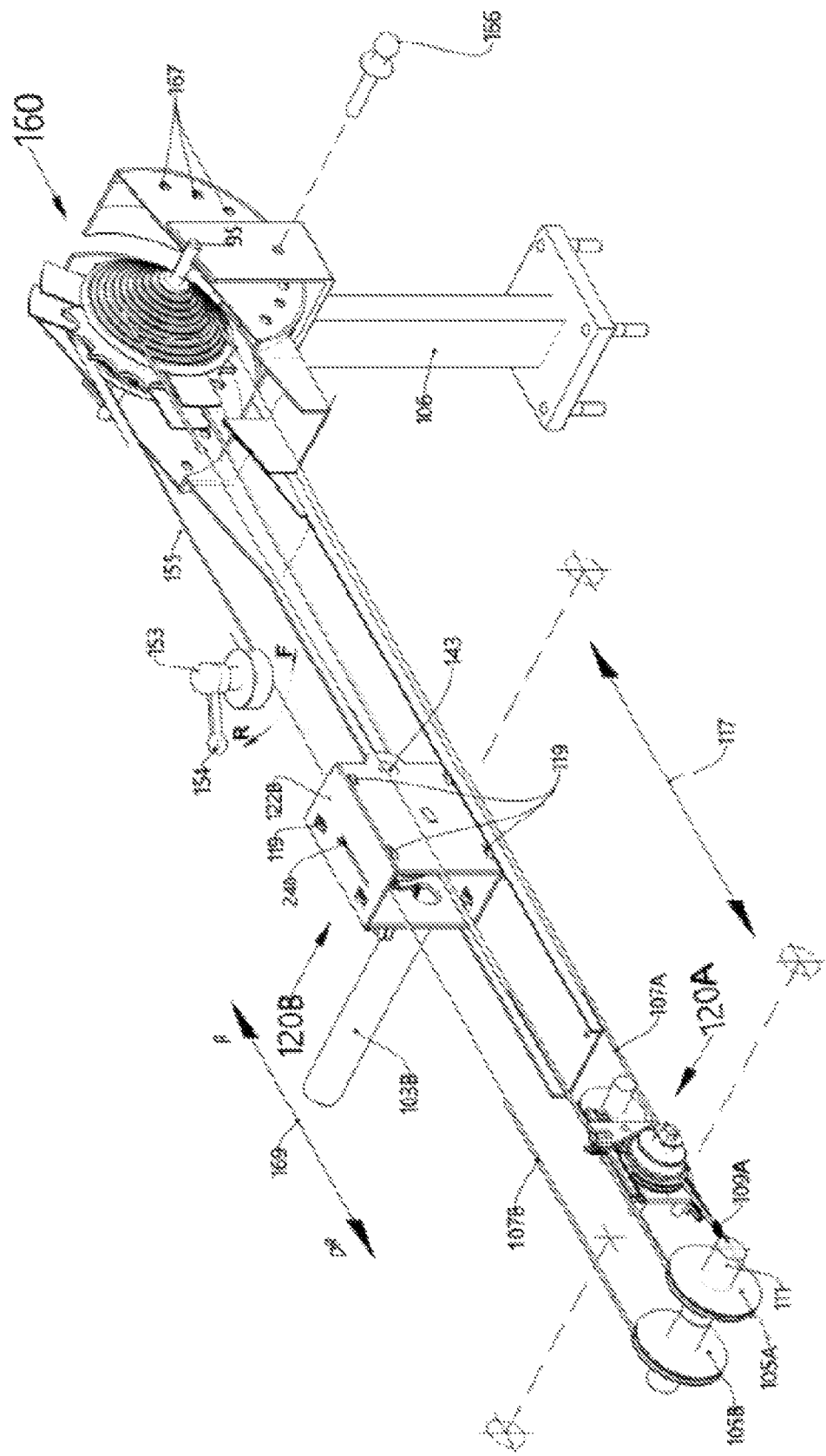
Figure 3D:
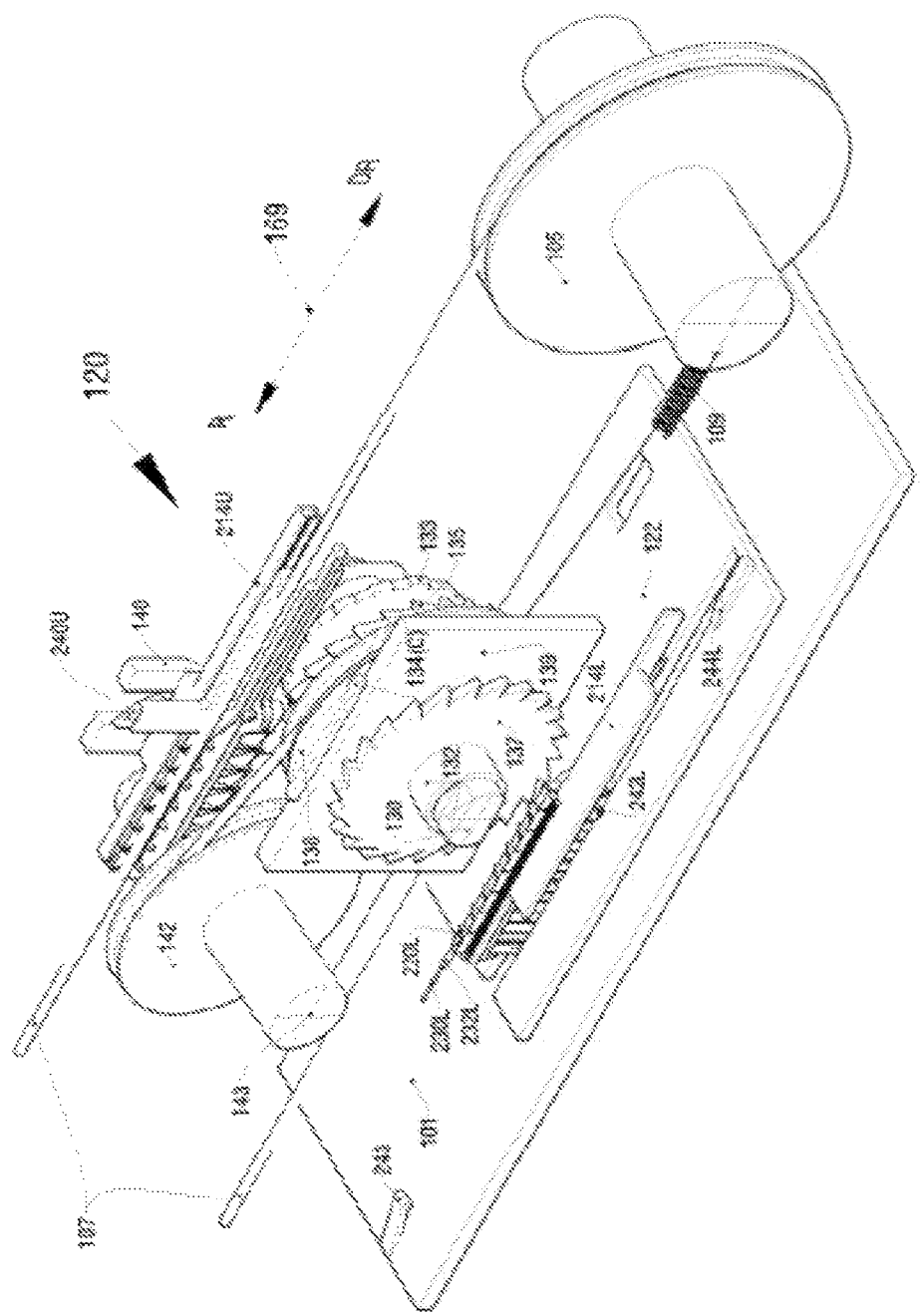
Figure 3E:
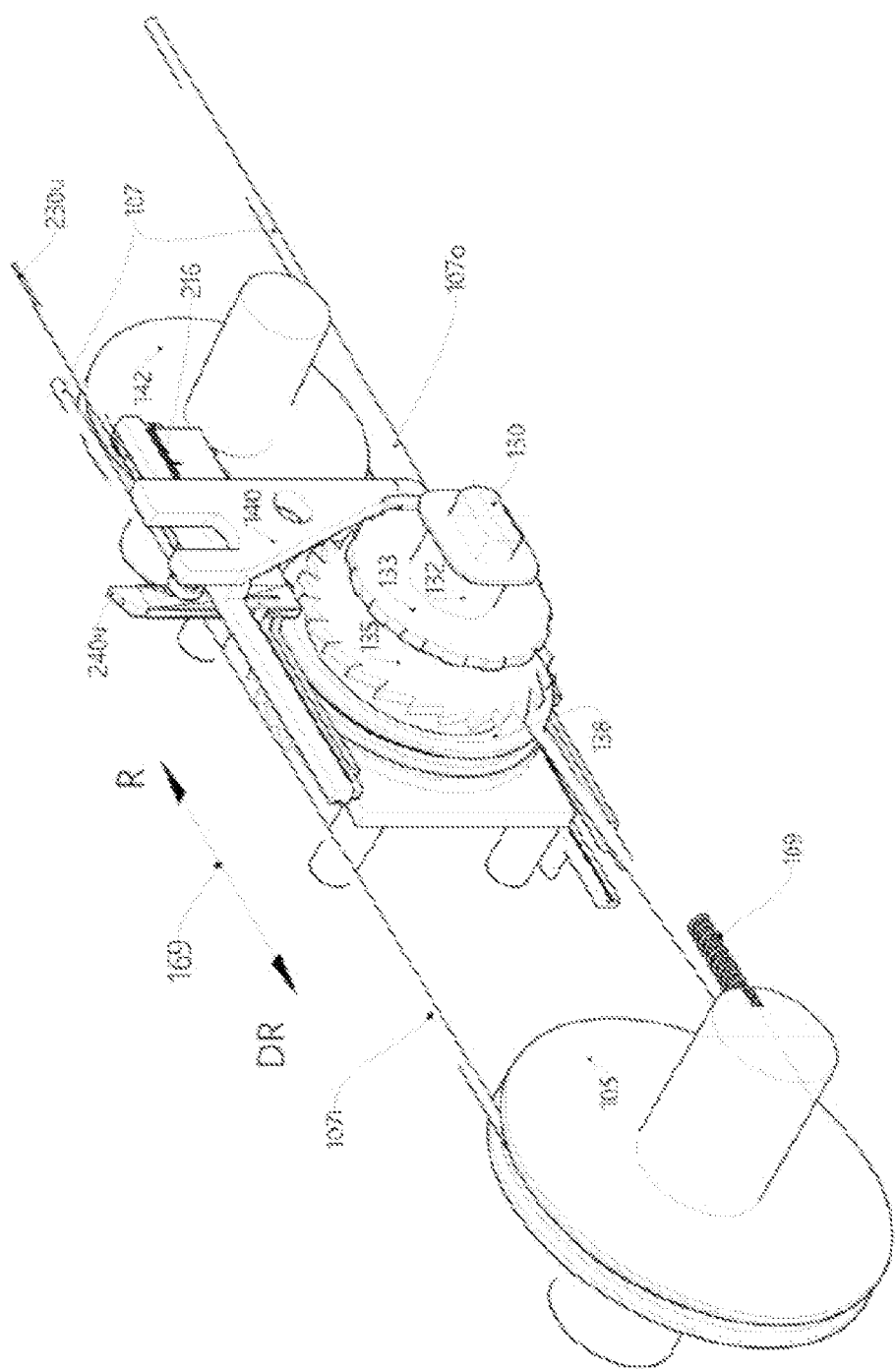
Figure 3F:
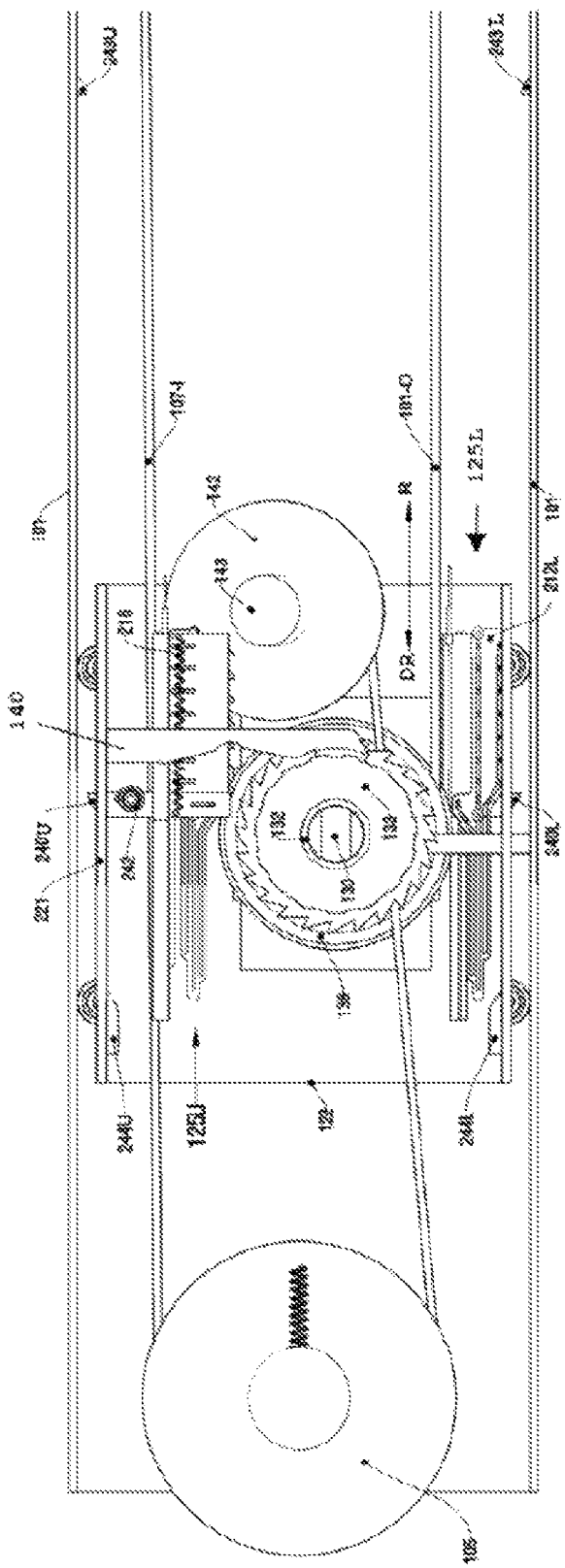
Figure 3G:
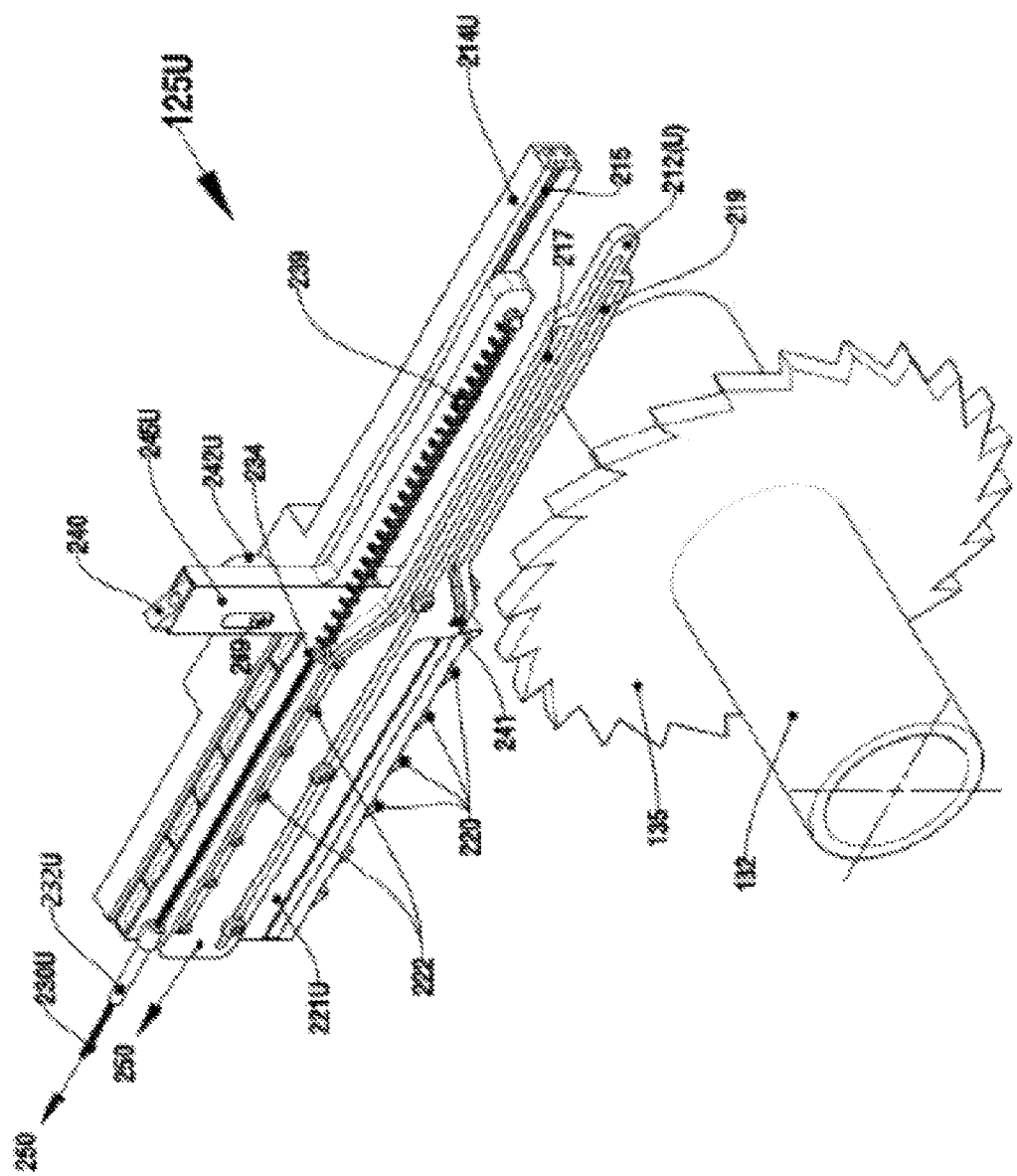
Figure 3H:
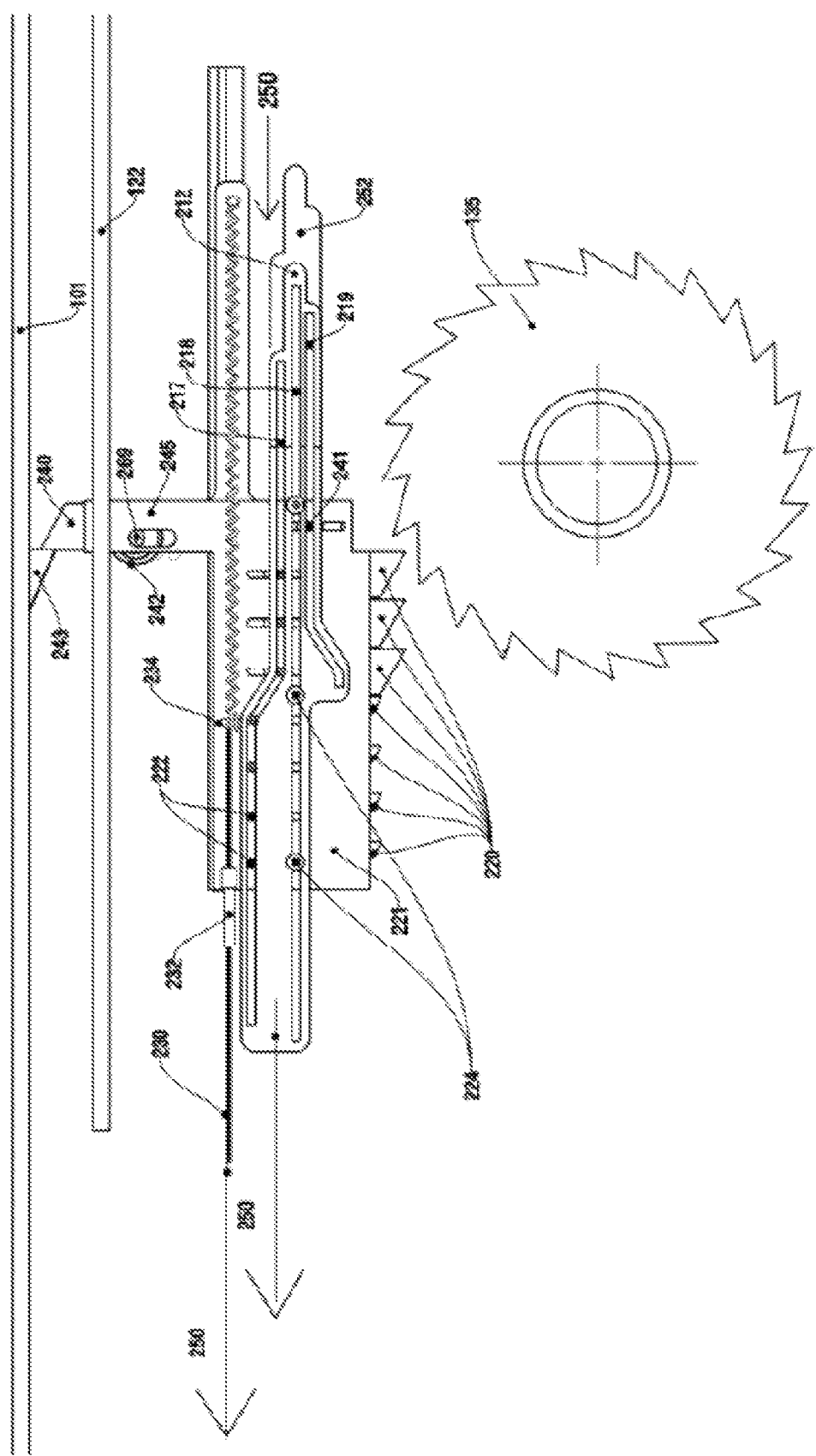
Figure 3K:
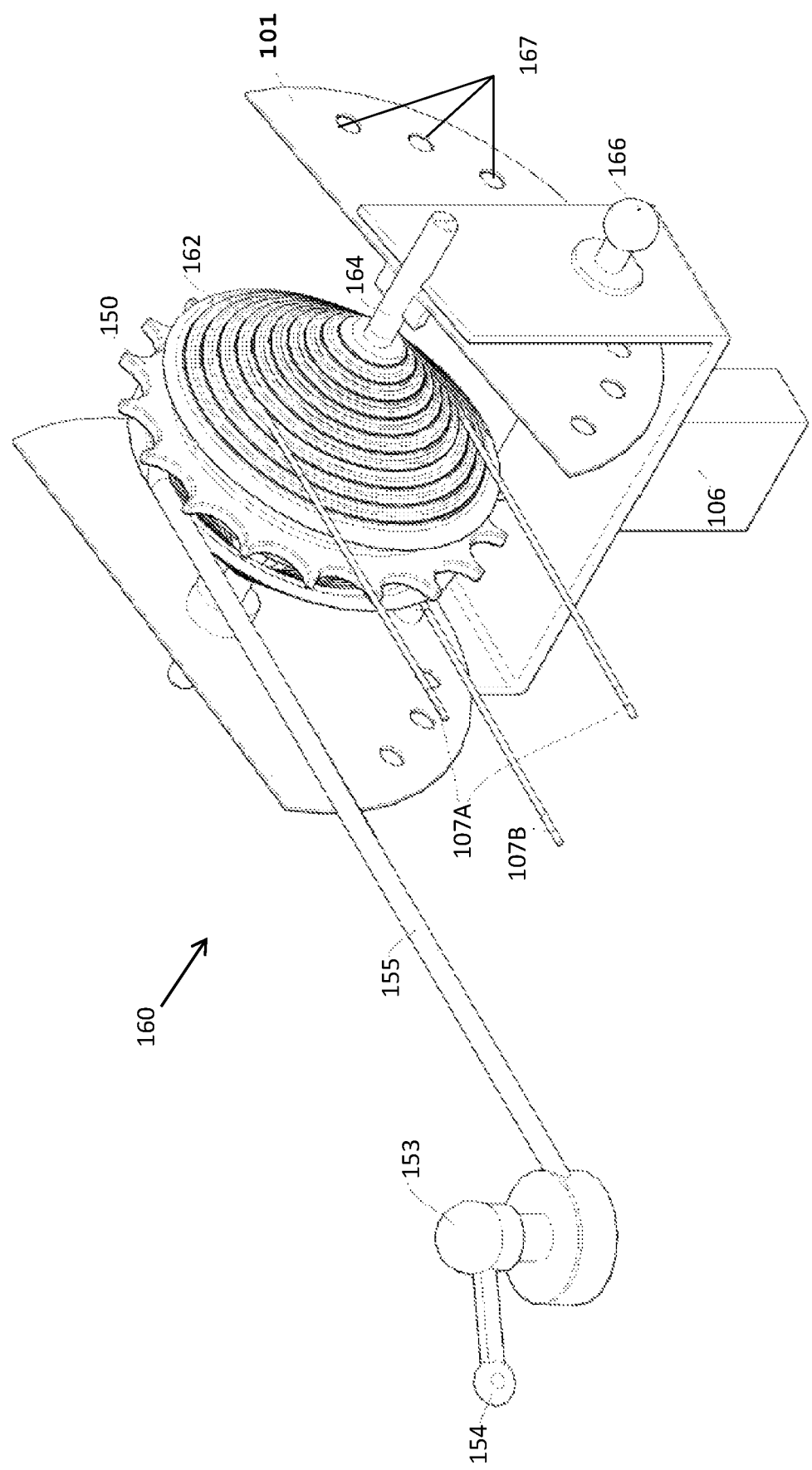
Figure 3L:
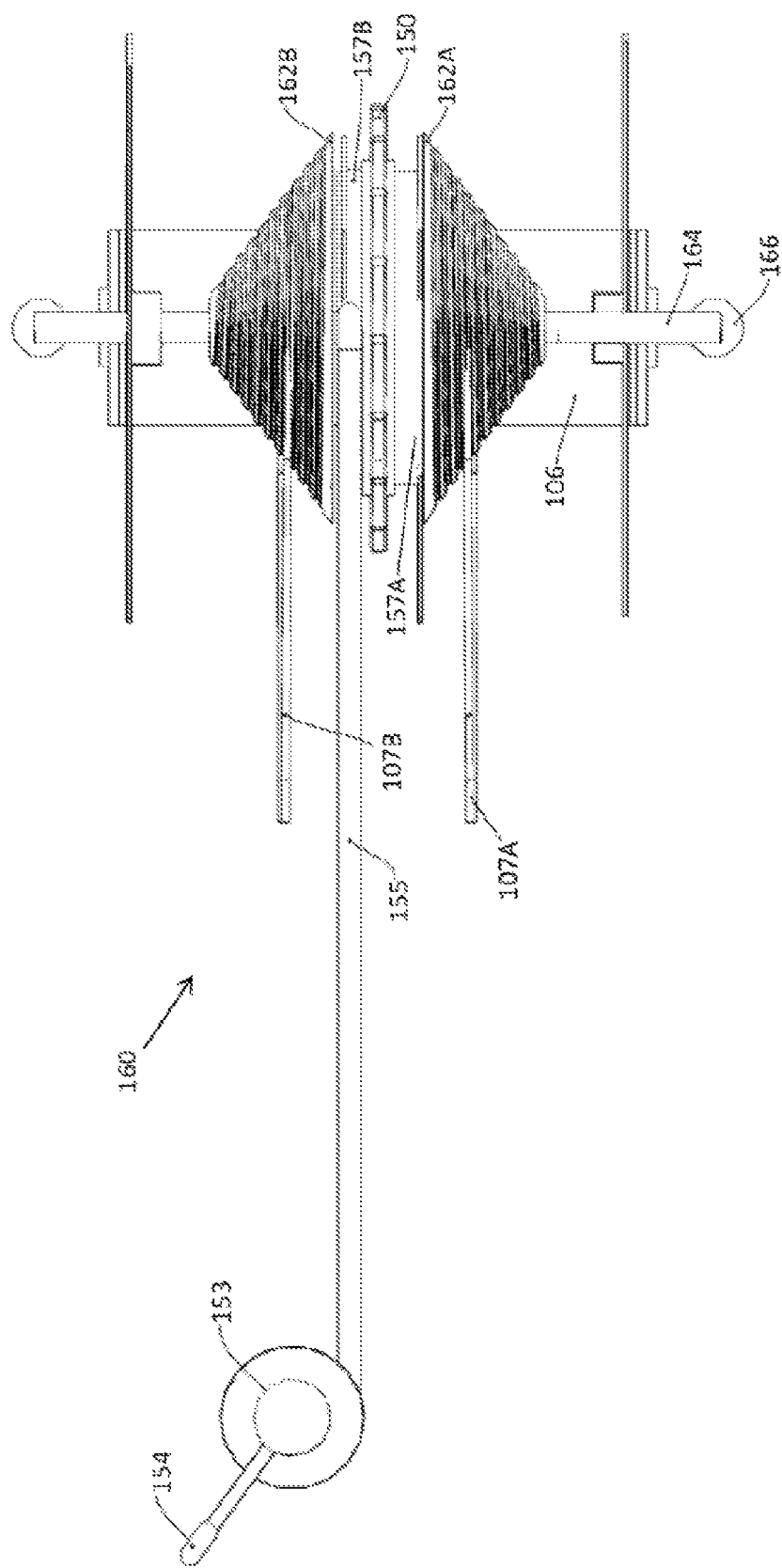
Figure 3M:
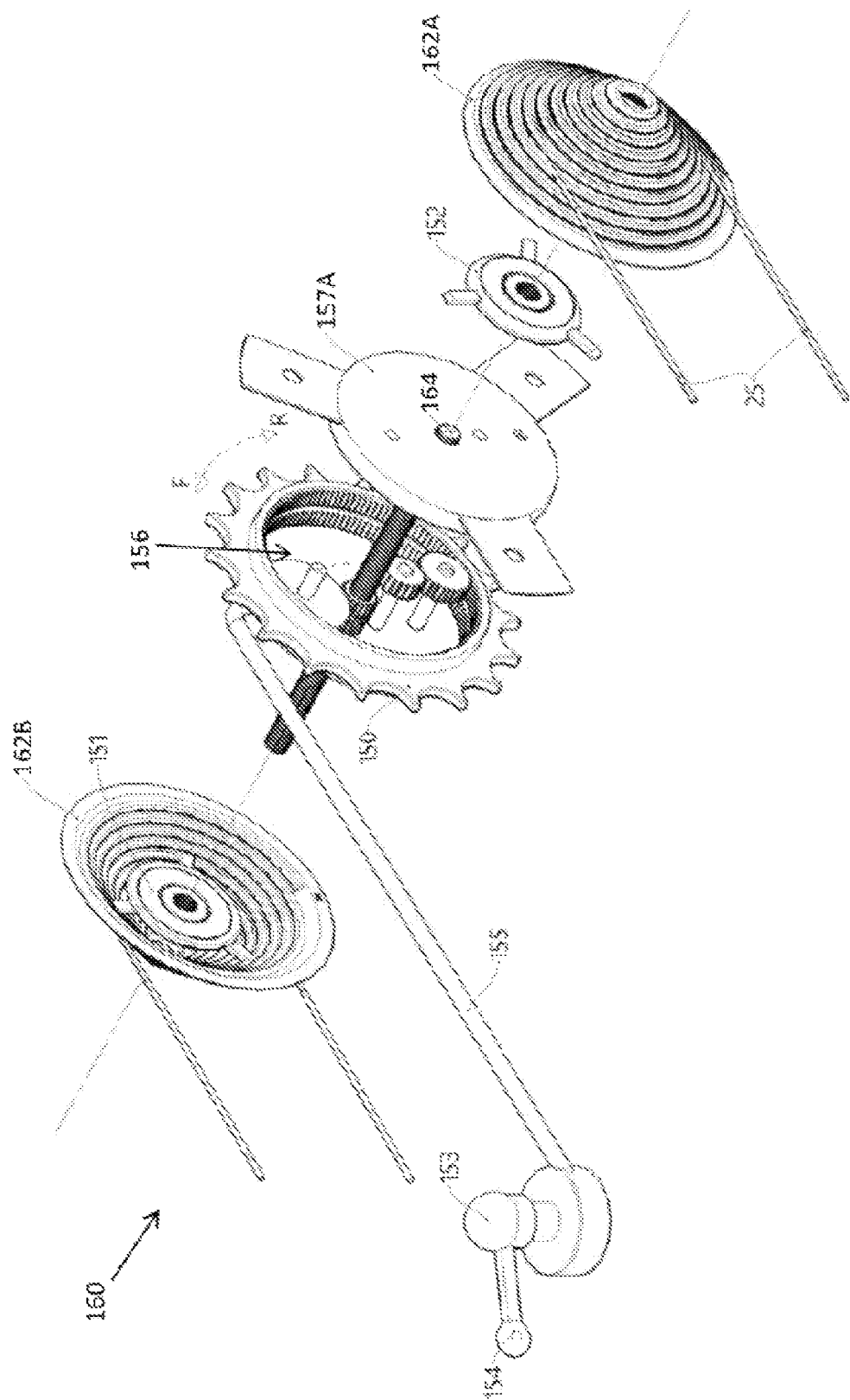
Figure 3N:
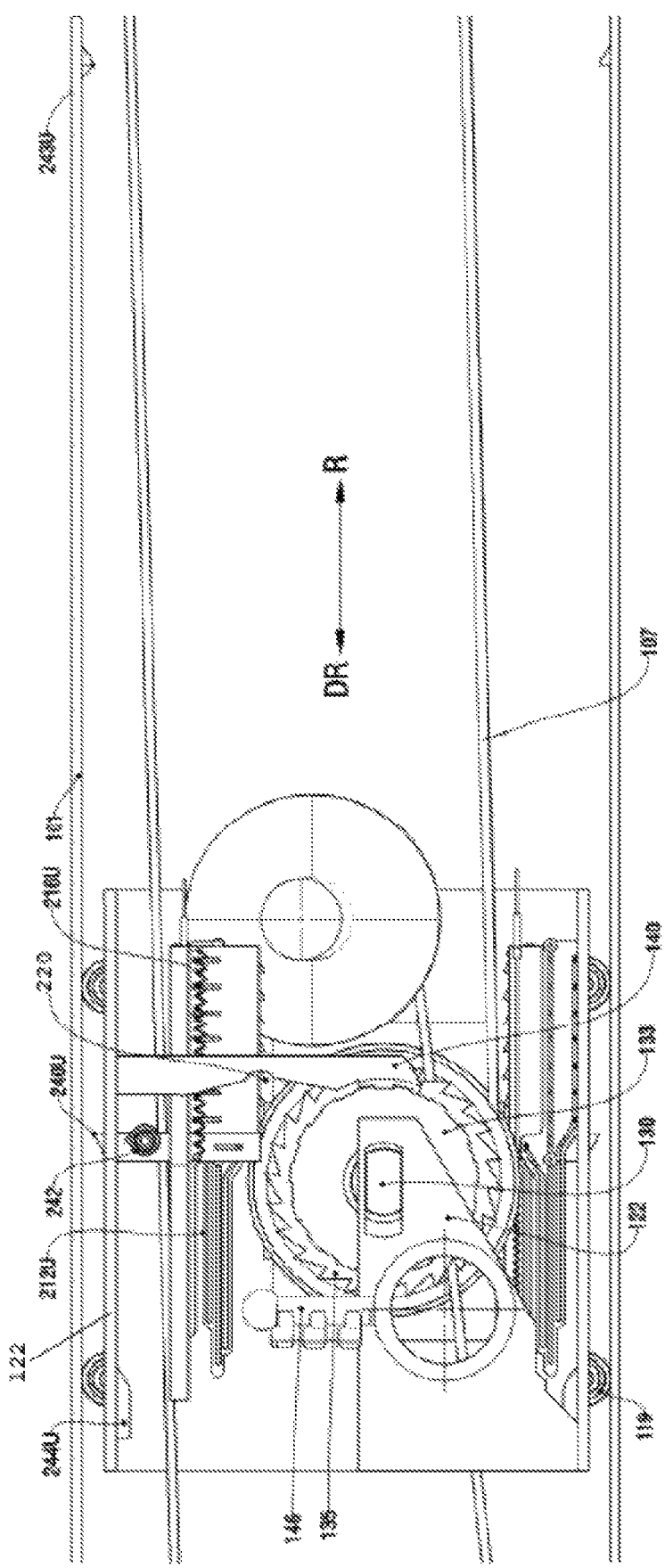
Figure 30:
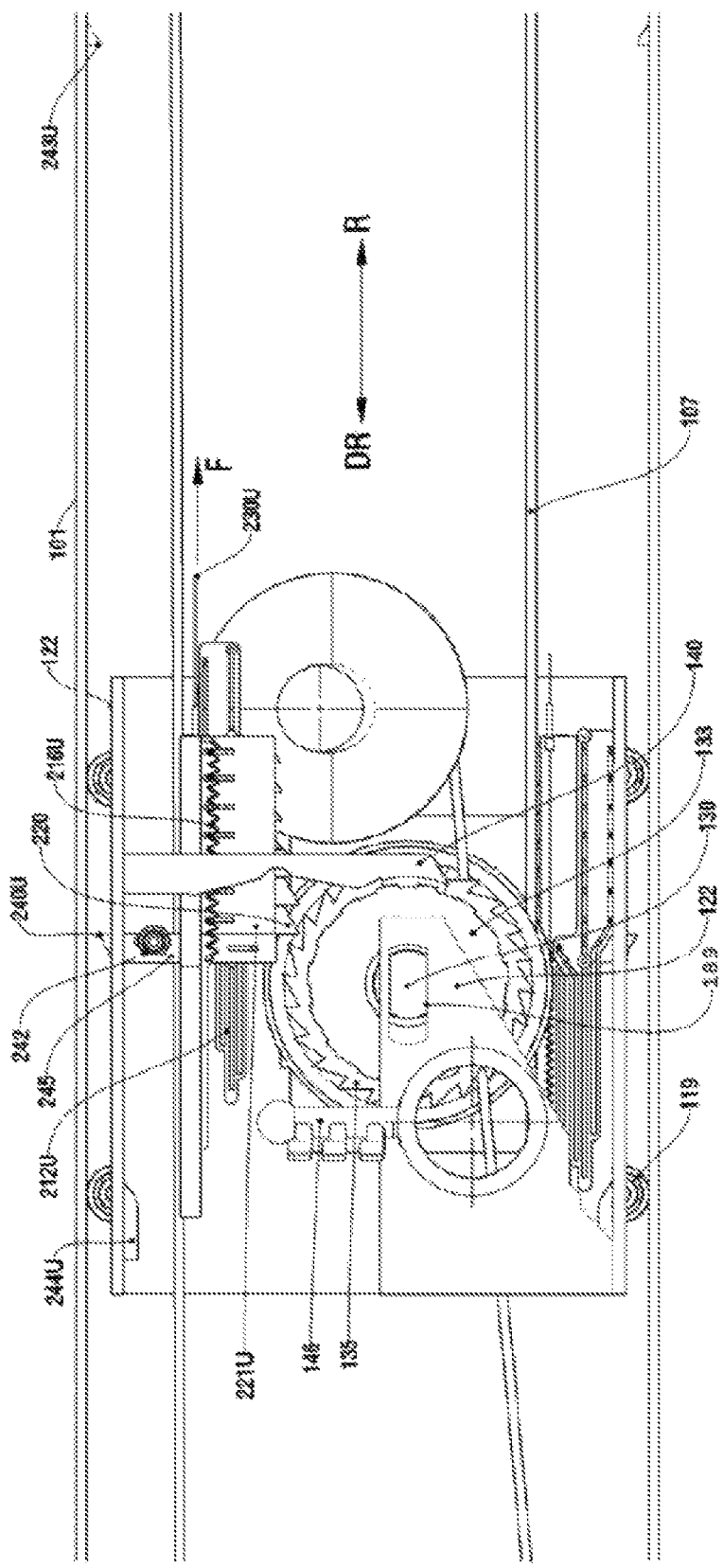
Figure 3P:
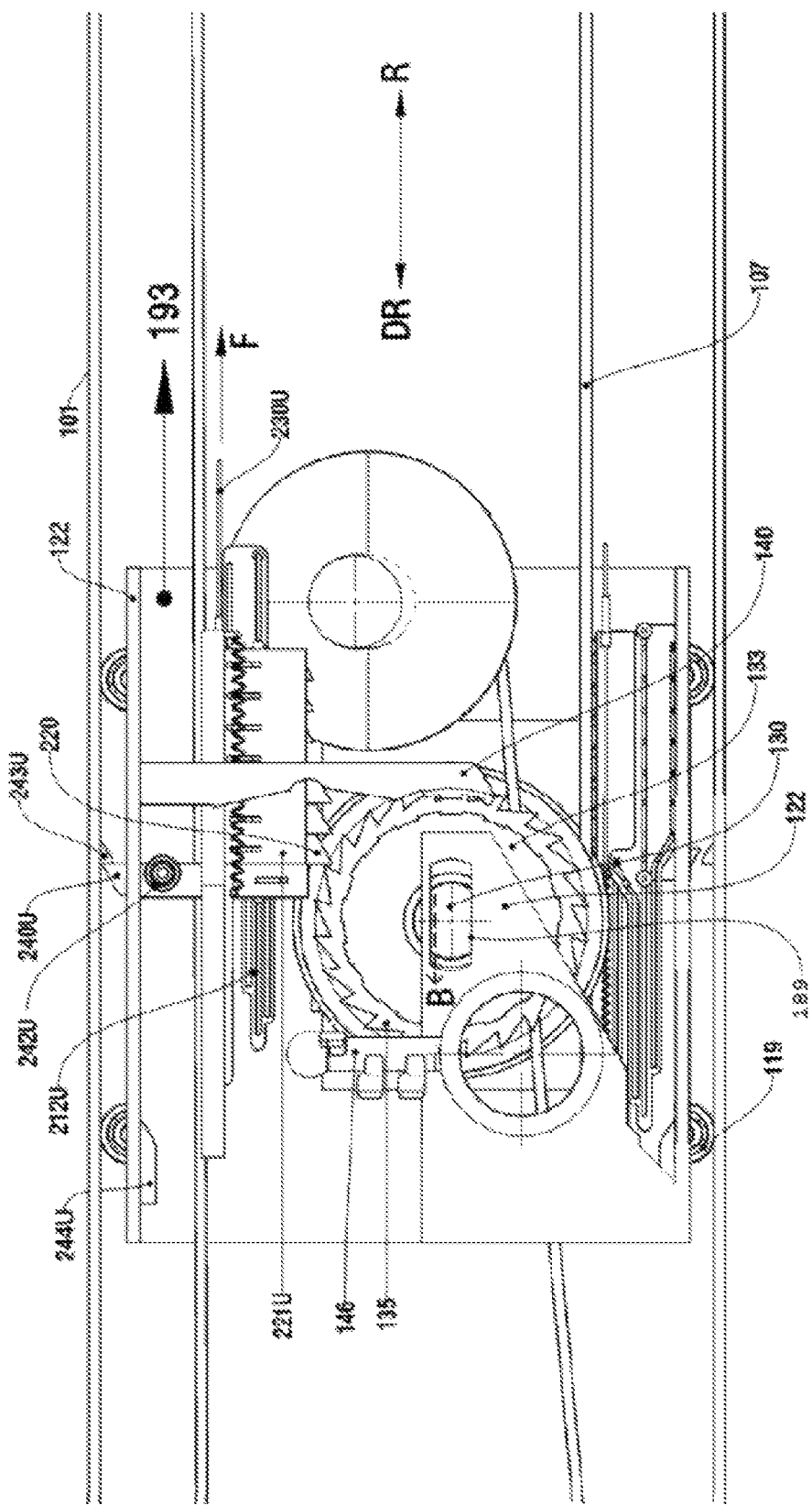
Figure 3Q:
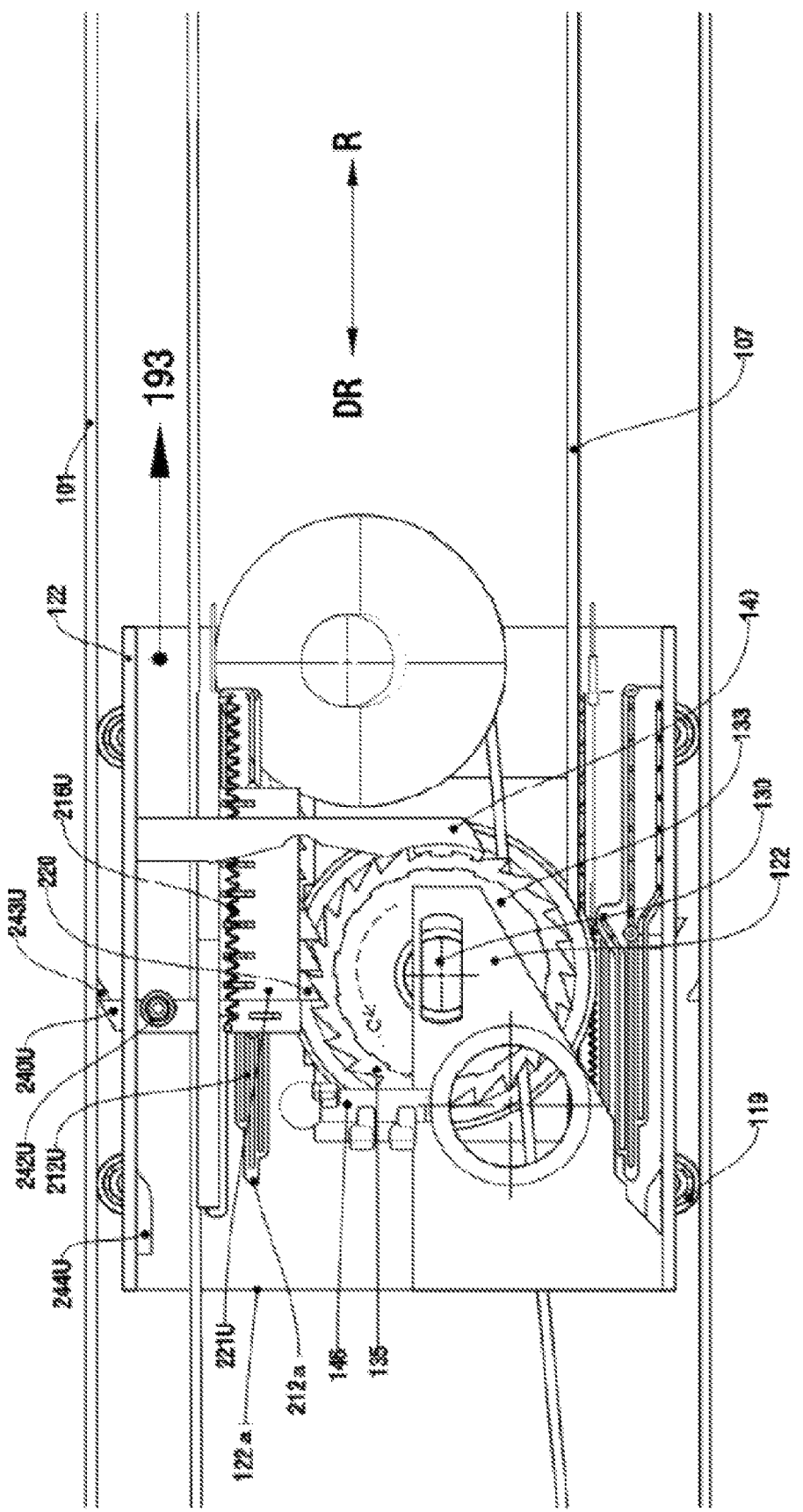
Figure 3R:
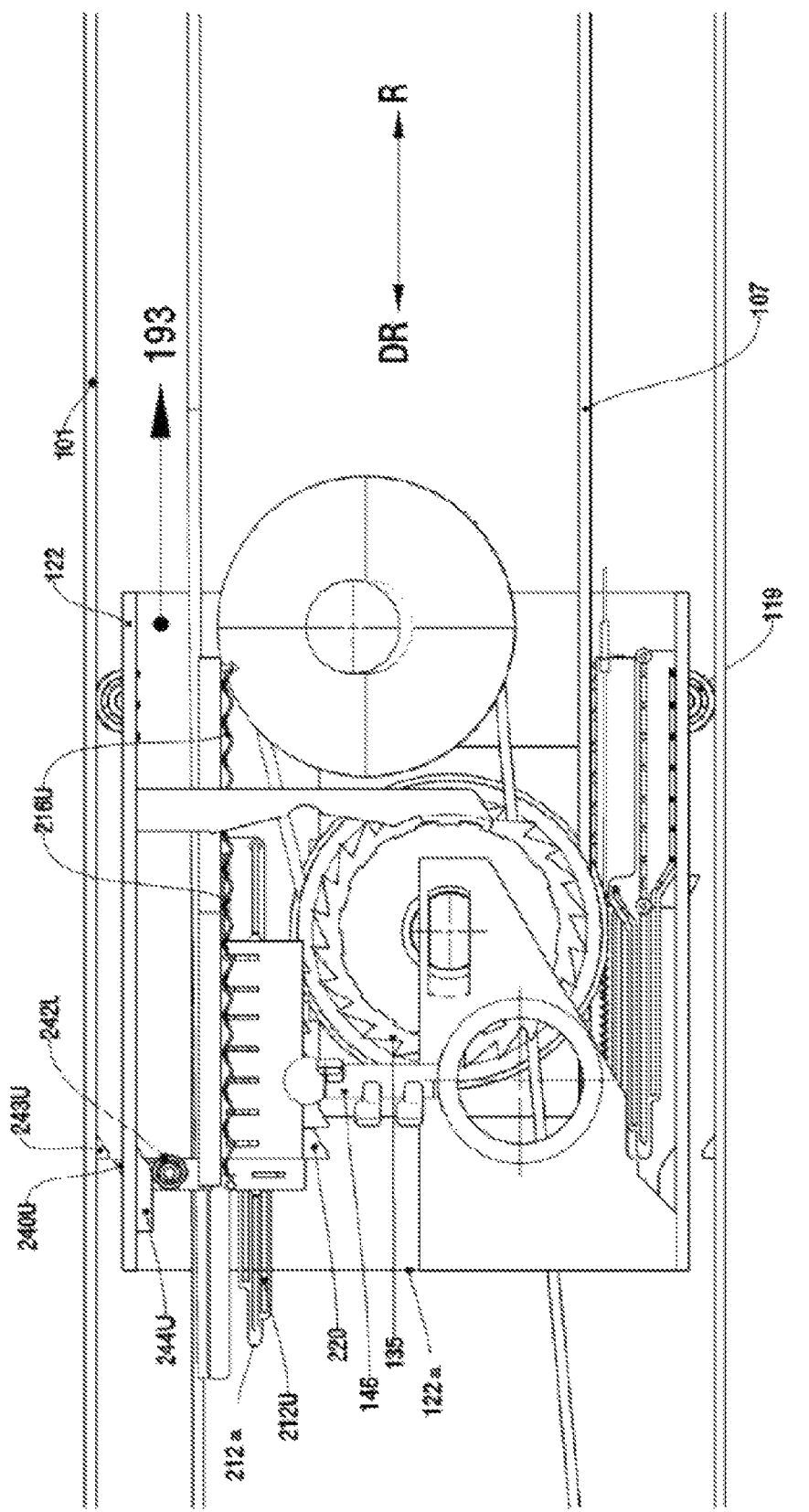
Figure 35:
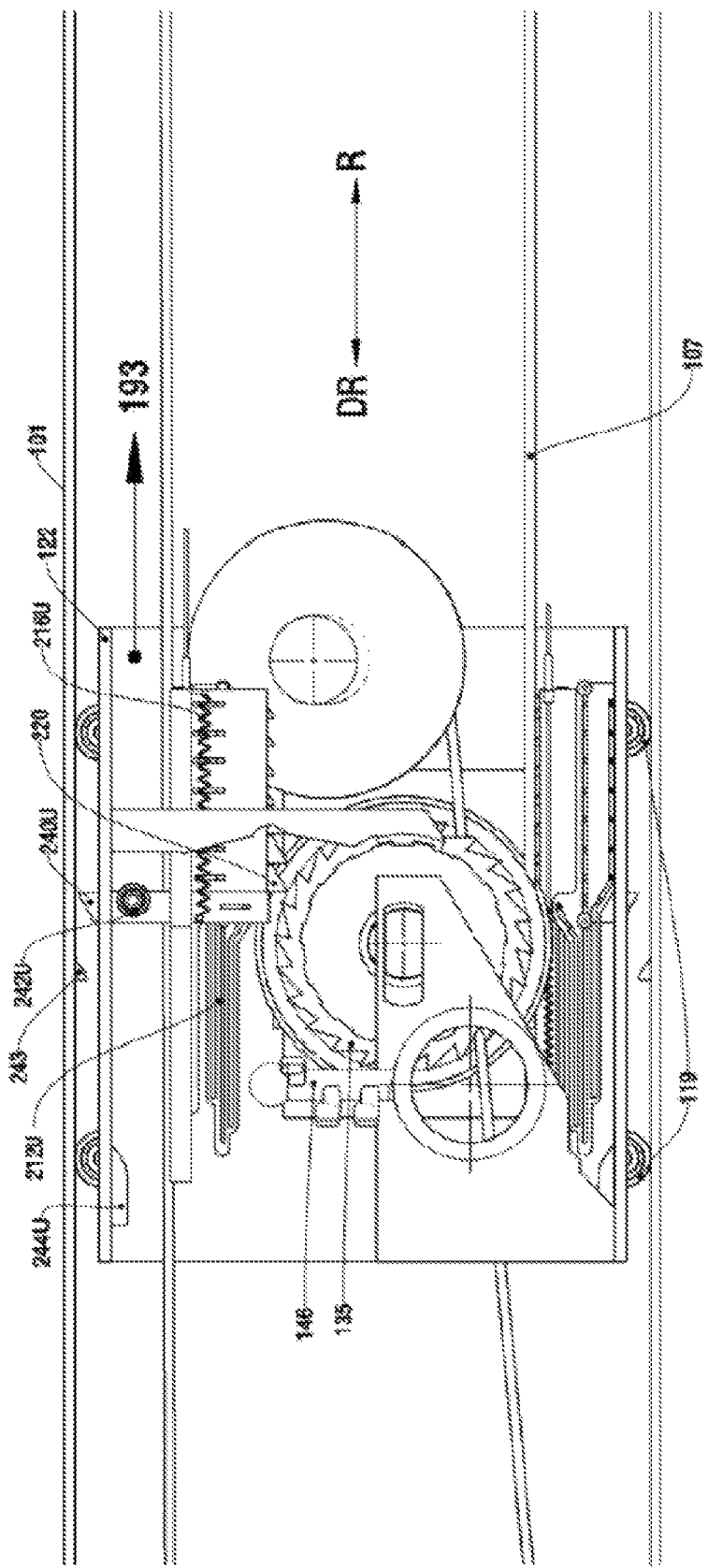
Figure 3T:
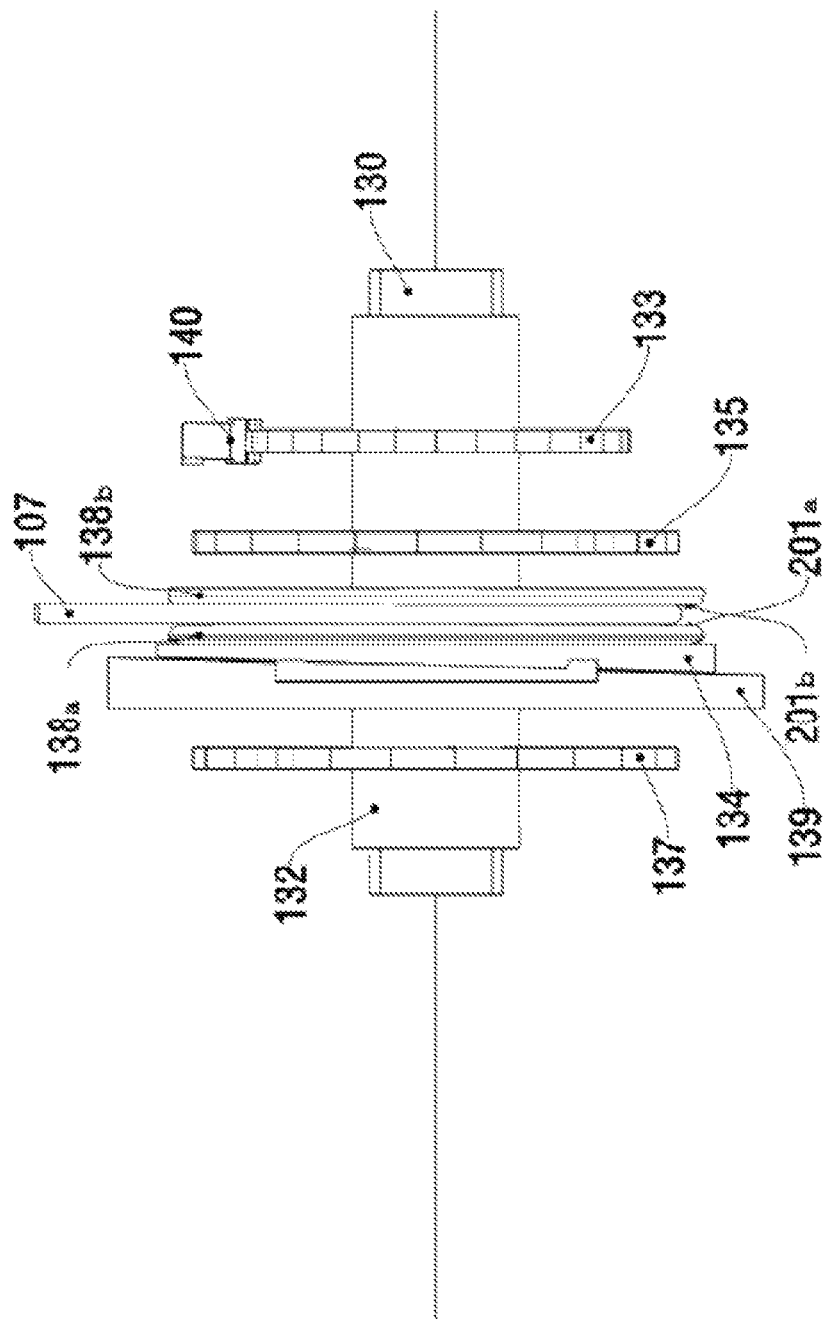

Reference is now made to FIGS. 3A-3T that schematically illustrate exemplary embodiments of operation of an exemplary human powered linear drive system (of an exemplary human powered device being a bicycle). FIG. 3A shows a bicycle 300 adapted to use the linear drive system 100 of the present disclosure. In use, pedals 103 are pushed alternately vertically downwards to drive load 180 which in this embodiment is the rear wheel of the bicycle 300. Linear drive system functions as described above with reference to FIGS. 2A-2J. In some embodiments, gear selectors 146A and 146B are positioned on the handlebars 302 of bicycle 300. In some embodiments, drive assembly enclosures 101 are not parallel with one another such as shown in FIG. 3A. The relative angle of drive assembly enclosures 101A and 101B is adjusted by removing locking pin 166 (FIG. 3B), swiveling the drive enclosure 101, and then replacing locking pin 166 into the chosen locking slot 167.

Linear drive system 100 is mounted onto bicycle 300 or another platform by attachment plate 106 (FIG. 3B). Spiral cone mounts 157 (FIG. 3M) mount spiral cone assembly 160 onto the inside of drive assembly enclosure 101. FIG. 3K (described further below) shows only one of spiral cone mounts 157A in order to simplify FIG. 3M. FIG. 3B shows drive assembly enclosures 101 positioned parallel to one another. Pedal bars 103 are fixedly attached to gear assembly enclosures 122 (FIG. 3C) which are positioned inside drive assembly enclosures 101 so as to move when pushed by pedals 103. Pedal slots 118 (FIG. 3B) formed in the sides of drive assembly enclosures 101 guide the movement of pedal 103 within the scope of movement as indicated by arrows 117. Pedal locking pins 104 lock the bar of the pedal onto gear assembly enclosures 122.

Reference is made to FIG. 3C which shows a semi-cutaway drawing of system 100. Gear assembly 120B is shown within gear assembly enclosure 122B positioned upon the bottom inner surface of drive assembly enclosure 101B. For a sake of brevity, gear assembly 120A is shown without gear assembly enclosure 122A and without drive assembly enclosure 101A. Gear assembly enclosure 122 is mounted and moves within drive assembly enclosure 101. Gear assembly enclosure 122 includes a plurality of roller wheels 119 mounted on the outer surface of gear assembly enclosure 122 to reduce friction of movement while the gear assembly enclosure 122 moves back and forth along drive assembly enclosure 101B.

Drive cable 107 is attached at its ends to spiral cone 162 as shown in FIGS. 2F and 2G. Cable 107 extends from a first winding group of spiral cone 162 and passes over gear assembly 120 before winding around drive roller 105. Cable 107 then passes through gear assembly 120 (see FIG. 2H) for shifting of position (and changing gear), when necessary, as described with reference to FIGS. 2A-2G, and then extends back to the other winding of the same spiral cone 162. During normal operation, at times when no gear change takes place, cable pulley wheel 138 is adapted to lock into cable 107, and in fact to lock into gear assembly 120 such that movement of the gear assembly 120, such as by pushing on pedal 103, results in pulling of a first side of cable 107 and unwinding cable from one of the winding groups of spiral cone 162, rotation of the spiral cone, and winding on the other winding group of the spiral cone 162.

Drive rollers 105 are mounted on drive roller axle 111 which is mounted in drive assembly enclosures 101 through drive roller mounting slot 112 (FIG. 3B). It should be appreciated that changes to $R_I$ and $R_O$ due to gear changes result in changes to the amount of cable 107 that runs through gear assembly 120 potentially resulting in slack on cable 107. More specifically, there may be a slight difference between the length of the cable portion which is "taken" from one of the winding groups, and between the respective portion which is "given" to the other winding group of a same spiral cone. As shown in FIG. 3B, drive roller mounting slot 112 is oblong in shape enabling slight movement of drive roller axle 111 to absorb slack of cable 107 caused by gear changes. Throttle spring 109 (FIG. 3C) tensions drive cable 107 for removing slack by pulling on drive roller axle 111 to which it is attached. Throttle spring 109 is mounted on one end to drive assembly enclosure 101 and on an opposite end to drive roller axle 111.

The gear assembly 120 of the invention operates in four operational states, as follows:

a. Normal State: The normal state is the state of operation during which the gear operates most of the time. During the normal state cable 107 is locked to the gear assembly 120, while there is no rotation of the gear pullies 138 and 142, nor shift of cable along these pullies. The normal state in fact spans both the times when the gear assembly slides back and forth along the drive assembly enclosure 101, or when the apparatus is stationary.

b. Gear set-up state: The gear set-up state may take place substantially any time during the normal operation of the apparatus. The gear setting is initiated by the user, who adjusts a gear selector 146, to define a level of gear change request.

c. Gear changing state: The gear changing state preferably takes place anytime during the return cycle when the driving cable 107 is relatively loose (i.e., without tension). A mechanism is provided at a specific location along the route of the gear assembly in order to initiate the gear change. Typically, the process of the gear change lasts up to 1 second. During the gear changing state the location of the gear assembly 120 along cable 107 changes, either towards the outer winding group 123, or towards the inner winding group 124. As will be elaborated hereinafter, the gear change state involves rotation of pully 138 either clockwise or counterclockwise to advance cable 107 either forward or backward, during the gear change. Typically, the setting of a gear change remains as long as the user does not initiate a reset, so a gear change cycle may repeat for a same setting several consecutive return cycles.

d. Reset: When the user finds that a satisfactory gear rate has been reached, he may reset the setting of the gear assembly, such that no further gear changes will occur (until the user will initiate a next gear set-up state. The reset is performed within a fraction of a second. The reset state is the operational state which follows a global mode of the forward/backward cable shift mechanism 161 (see next paragraph).

It should be noted, and will be elaborated hereinafter, that each of the upper and lower set-up mechanisms 227 includes at least the gear change cable 230, gear cable conduit 232, guide plate 212, push teeth 220, push teeth pins 222, local reset pin 241, and local reset tooth 240.

Figure 3U:
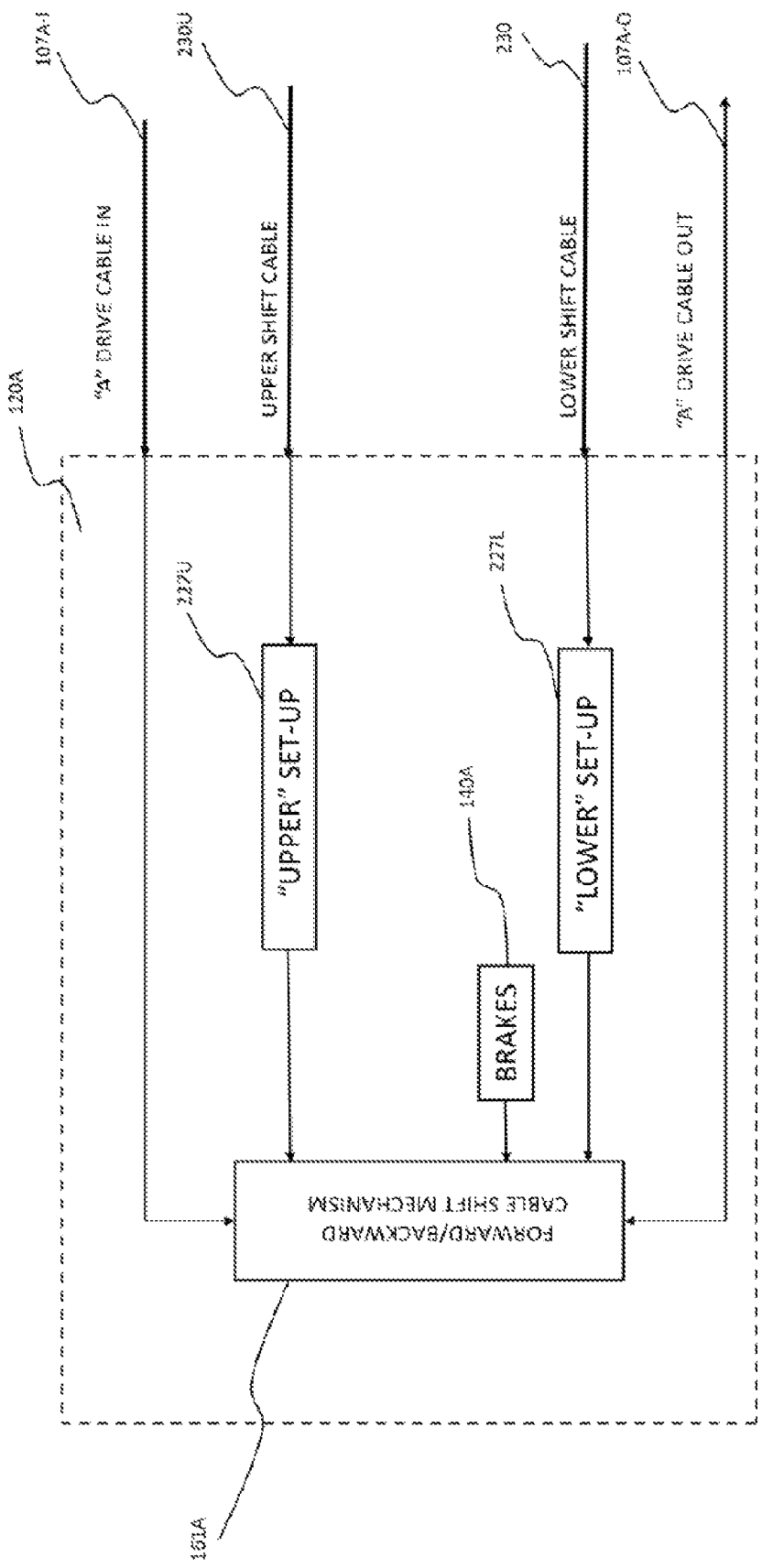

FIG. 3U illustrates in a block diagram form the structure of the gear assembly 120 (only the "A" side of the gear mechanism is shown, the "B" side is identical). "A" drive cable in (107-I), coming from the inner winding group 124 passes through a forward/backward cable shift mechanism 161, and leaves the gear assembly 120A at "A" drive cable out (107A-O). In addition, a cable shift rate (i.e., amount of gear change), either forward or backward, is defined by the user at selector 146A, and conveyed to the gear assembly selectively by either the upper shift cable 230U or by the lower shift cable 230L, respectively. The forward/backward cable shift mechanism 161 operates in one of four modes: (a) "lock mode": during the normal state of the gear assembly (as discussed above), a brakes mechanism 140A locks cable 107 to the gear assembly 120 (FIG. 3D); (b) "shift mode": during a gear changing state, the brake mechanism 140A releases the lock, allowing the forward/backward cable shift mechanism 161 to shift cable 107 passing through it, therefore to change the relative position of the gear assembly 120 along cable 107; the shift is performed by mechanism 161 either forward (to a rate as conveyed by the "upper" set-up mechanism 227U), or backward (to a rate as conveyed by the "lower" set-up mechanism 227L), and then the forward/backward cable shift mechanism 161 returns to a "lock mode" at the shifted position. As noted, the shift rate definition is made by use of selector 146A, and the selection is performed during the normal state of operation of the gear assembly 120A; and (c) "global reset mode": During the global reset mode, the "lower" set-up mechanism 227L or the "upper" set-up mechanism 227U, whichever is relevant, returns to its initial state of zero-shift, so no gear change will be performed in a future return cycle (unless another future change is defined by the user at selector 146A) Preferably, as long as no reset is performed by the user (i.e., release of the tension in either the upper shift cable U230 or the lower shift cable 230L), the "lower" or "upper" set-up mechanism 227 remains in its previous gear-change definition, therefore, in that case a gear change state is initiated each consecutive return cycle of drive cable 107, continuing to advance the cable at a rate, as defined. Only upon a global reset, the previously defined "lower" or "upper" set-up mechanism 227 resets, thereby terminating any further shift (backward or forward) of cable 107; and (d) "local reset mode": As noted, when a specific set-up is defined, a definition is made with respect to the intensity of gear change during each return cycle. Therefore, after each gear change which is performed during a single return cycle, a local reset is performed to return the mechanism (still with a same set-up definition) to its previous status, such that it will be ready to perform the next gear change (with a same set-up) during the next return cycle.

Reference is now made to FIGS. 3D-3H showing the structure of gear assembly 120. Gear assembly 120 is mounted inside gear assembly enclosure 122, which in turn alternately moves back and forth to the drive direction D and the return direction R, as indicated by arrows 169 (FIG. 3D). As described above, two gear assemblies are provided as part of system 100, one for each pedal 103. Each gear assembly 120 includes two primary wheels and a dual gear changing mechanism as described further below. The two primary wheels are cable flip wheel 142 and cable pulley wheel 138. Cable flip wheel 142 is mounted on flip wheel axle 143 which is attached to gear assembly enclosure 122. Cable flip wheel 142 is grooved around its perimeter to accommodate cable 107 wound around it. Cable pulley wheel 138 is fixedly mounted on gear axle cylinder 132. Gear axle cylinder 132 fits over and freely rotates around main gear axle 130. Cable pulley wheel 138 is also grooved around its perimeter to accommodate cable 107 wound around it.

Gear assembly 120 is adapted to rotate pulley wheel 138 in either direction so as to shift the cable 107-O on the pully either towards the outer winding 123 or away from it, therefore to either increase the amount of windings of cable 107 within the outer winding group, or to decrease it, thereby to change the gear ratio.

As also shown in FIG. 3D, three additional wheels are fixedly mounted onto gear axle cylinder 132: lower shift gear wheel 137, upper shift gear wheel 135 and brake wheel 133. Lower shift gear wheel 137 and upper shift gear wheel 135 interact respectively with the dual gear changing mechanism 125L and 125U to rotate lower shift gear wheel 137 and upper shift gear wheel 135 to thereby rotate pulley wheel 138 in either direction (depending on whether upper 125U or lower 125L gear changing mechanisms are used), to thereby either shift cable 107 from the outer winding group 123 to the inner winding group 124, or vice versa, i.e., from the inner winding group 124 to the outer winding group 123.

With a particular reference to FIGS. 3D, 3T, and 3V, static sloping surface 139 is positioned between lower shift gear wheel 137 and sliding sloping surface 134. The sliding sloping surface in fact slides slightly together with axle 130 such that surface 134*a* moves relative to surface 139*a* (towards its narrower profile) in order to transfer from a lock mode to a shift mode. Static sloping surface 139 is sloped on the side adjacent to sliding sloping surface 134 which has a slope at a complementary angle. Upper and lower protrusions 134*c* and 134*d* maintain the relative position between the two surfaces, and ensure a proper sliding. Static sloping surface 139 is rigidly mounted to gear assembly enclosure 122. The pully wheel 138 is divided ("cut") into two separate portions 138*a* and 138*b*, while the "cutting" direction is perpendicular to axle 130. Moreover, the half portion 138*b* of pully wheel 138 which is remote from the static sloping surface 139 is fixedly attached to gear axle cylinder 132, while the opposite portion 138*a* of pully 138 (namely, the portion which is closer to static sloping surface 139) is loose on gear axle cylinder 132. During the lock mode of the cable shift mechanism 161, the sliding sloping surface 134, facing at a wider profile of surface 139, presses against the "loose" portion 138*a* of pulley wheel 138 (as shown in FIG. 3T), to keep cable 107 firmly held in pulley wheel 138, namely the cable is firmly pressed in between the two internal surfaces 201*a* and 201*b* of pully portions 138*a* and 138*b*, respectively. In such a manner, the lock assures that the cable 107 will not slide over the surface of the groove of wheel 138, particularly when a relatively large force is applied on it during a drive cycle. During a shift from a lock mode to a shift mode of the cable shift mechanism 161, main gear axle 130 moves in direction F (FIG. 3T) within elongated slot 189 (shown in FIG. 3V), and sliding sloping surface 134 also moves in direction F (as it is installed loose about axle 130), thus reducing (note entirely) the pressure which surface 134 applies on pulley wheel portion 138*a* such that pully 138 becomes free to rotate (if and when a force is applied on it via axle 130). Moreover, cable 107 is free to follow the shift of pully 138 during a gear change. Optionally, any other mechanism can be used for locking or unlocking cable 107 in gear assembly 120 and the use of sloping surfaces 134 and 139 should not be considered limiting. The wheels (135, 137, 138) mounted on gear axle cylinder 132 are prevented from rotating when gear brake 140 engages with brake wheel 133 (such as shown in FIGS. 3E, 3F, and 3N-3P).

With a particular reference to FIG. 3G, each of the two (upper and lower) gear changing mechanisms 125 within each gear assembly 120 includes a guide plate 212 attached to a guide rail 214, multiple push teeth 220 for engaging with gear wheels 135 and 137, respectively, and a local reset mechanism which includes a local reset tooth 240 and local reset bearing 242. Guide rail 214 includes a single channel 215, while guide plate 212 includes three channels, as will be further elaborated below. Each gear changing mechanism 125 is manipulated by its own gear selector 146 (which is positioned, for example, on the handlebars of the bicycle) that selectively activates one of gear change cables 230 (either a cable of the upper gear changing mechanism 125U mechanism to higher the gear, or a cable of the lower gear changing mechanism 125L to lower the gear). Each gear change cable 230 is threaded through gear cable conduit 232 and attached to gear cable mount 234 at a protrusion from guide plate 212. Cable conduit 232 is rigidly attached to push teeth enclosure 221. Spring 239 is connected between gear cable mount 234 (at guide plate 212) and protrusion 247 at push teeth enclosure 221. Guide rail 214 (FIG. 3G) is rigidly attached to gear enclosure 122 (best shown in FIG. 3C), such that there is no relative movement between the guide rail and enclosure 122. As will be further discussed below, push teeth enclosure 221, together with the guide plate 212 which is attached to it, is moveable (in a first direction during a shift mode, and in a direction opposite to the first direction during local reset mode) as guided by channel (groove) 215 of the guide rail 214. Guide plate 212 is further movable with respect to push teeth enclosure 221 (specifically during the gear set-up state), in a manner which will be further described below.

As best shown in FIG. 3H, guide plate 212 includes three channels: push teeth channel 217, guide plate channel 218, and local reset pin channel 219. Guide reset spring 216 (best shown in FIG. 3I) is attached on one end to guide rail 214 and on its other end to push teeth enclosure 221 (which, as said, is movable relative to guide rail 214 during the shift mode and during the local reset mode, respectively). The movement of push teeth enclosure 221 relative to guide rail 214 therefore changes the tension on guide reset spring 216.

Multiple push teeth 220 (FIG. 3J) are positioned inside push teeth enclosure 221 and, depending on the relative position between push teeth enclosure 221 and guide plate 212, they can be shifted to stick out of push teeth enclosure 221 as shown in FIG. 3H. Push teeth pins 222 protrude from push teeth enclosure 221 and engage push teeth channel 217. In the illustrated embodiment, seven push teeth 220 are shown but it should be appreciated that more or less push teeth may be used depending on the range of gear change options to be provided to a user.

Local reset enclosure 245, which is rigidly attached to push teeth enclosure 221 (or a part thereof), holds local reset tooth 240 which protrudes from the local reset enclosure 245. Local reset bearing 242 is slidably mounted on local reset enclosure 245. Local reset pin 241 is also mounted on local reset enclosure 245 and engages reset pin channel 219. Enclosure channel pins 224 hold push teeth enclosure 221 and local reset enclosure 245 level while moving, by engaging enclosure channel 218.

The structure of each of the teeth 220 and 340 is shown in FIG. 3J. Each tooth 220 and 340 consists of a base portion 270, which is held in in its place by either pin 269 (in the case of tooth 240) or pin 222 (in the case of tooth 220). The tooth is non-symmetric along its longitudinal axis y. The tooth has a ramp surface 271, and a vertical surface 272, in order to provide a different reaction to a horizontal force (the term "horizontal" refers specifically relative to the view of FIG. 3J) which is applied onto said two surfaces. More specifically, a horizontal force on the vertical surface 272 of the tooth does not change its position, while a horizontal force on the ramp surface 271 will cause upward retraction of the tooth.

The amount of a desired gear change (i.e., the intensity of the shift of the location of the gear assembly 120 along cable 107) which is performed during each gear changing state is defined during the gear set-up state. Any time when the user wishes to change gear either up or down in one of the left or right units ("A" or "B"), he uses a respective selector unit 146 "A" (for example, at the left of the handlebars) or gear selector unit 146 "B" (for example, at the right of the handlebars) to define the direction and the intensity of the change. Each of the two gear selectors 146 includes three adjusting levers, an up-gear lever, a low-gear lever, and a reset lever. The up-gear lever and the low-gear lever are each configured to pull either the upper shift cable 230U or the lower shift cable 230L (see FIGS. 3G and 3U). The amount of cable pulling, which is performed during a gear set-up state, defines the intensity of shift which will be performed on the cable drive 107 during each of the following gear change states. The reset lever releases the tension on the respective shift cable, thereby to cause a global reset, as defined above.

Reference is now made to FIGS. 3G and 3H. During the set-up state, when an upper or lower shift cable 230 is pulled against the tension of spring 239, guide plate 212 is also pulled (in the direction of arrow 250) since gear change cable 230 is attached to gear cable mount 234. FIG. 3G shows the status of the gear change mechanism 125 following a global reset, when all of the teeth are at their withdrawn state, i.e., they are all located up within the push teeth enclosure 221. FIG. 3H, shows a case when a user has elected to make a relatively average gear change of three teeth 220 by pulling of cable 230. Starting from the case of FIG. 3G, as guide channel plate 212 moves in direction 250, three push teeth pins 222 are guided down by push teeth channel 217, forcing three respective teeth 220 to descend and protrude from push teeth enclosure 221 (as shown in FIG. 3H). Additionally, local reset pin 241 is guided up by local reset pin channel 217, forcing local reset tooth 240 to protrude out of local reset enclosure 245. Spring 239 is also tensioned (see FIG. 3I) as plate 212 is pulled relative to push teeth enclosure 221. This completes the set-up state by fixing a relative position between the guide state and the teeth enclosure 221, and the assembly is now ready for a gear shift which will occur during a next return cycle (the intensity of the shift has been defined by the number of teeth 220 that protrude from push teeth enclosure 221).

During the gear shift mode, the position of the gear assembly 120 along cable 107 is modified Two separate types protrusions are used to initiate and terminate, respectively, the gear shift mode. More specifically, each of the upper and lower gear change mechanisms 125 is provided with both an initiating protrusion 243 at the internal surface of the stationary drive enclosure 101, and a terminating protrusion ramp 244 at the internal surface of the moving gear assembly enclosure 122 (see, for example, FIGS. 3N-3S). As will be discussed further below, the local reset tooth 240 of the gear change mechanism 125 engages with the initiating protrusion 243 to begin the shift mode, and local reset bearing 242 of the gear change mechanism 125 engages with the terminating ramp 244 to terminate the shift mode.

As noted above, in order to change the gear ratio, the location of the gear assembly 120 along cable 107 is shifted, and this shift changes the ratio between the windings in the outer winding group 123 and the windings in the inner winding group 124. The shifting of the location of the gear assembly 120 along cable 107 is performed during the return cycle, when cable 107 is relatively loose. The shift is performed by first transferring the gear assembly from its lock mode to its shift mode. Then, during the shift mode, the shift of location is carried out by rotating either the upper shift gear wheel 135 or the lower shift gear wheel 137, each of which in turn rotates cable pulley wheel 138 respectively, either forward or backwards.

Gear change mechanism 125 force the rotation of upper shift gear wheel 135 or lower shift gear wheel 137 by causing engagement of push teeth 220 with the teeth on upper shift gear wheel 135 or lower shift gear wheel 137, as defined during the set-up state.

As noted, the gear assembly enclosure 122, with all the components included therein moves back and forth along a route as defined by drive assembly enclosure 101, during the drive (denoted DR) and return (denoted R) cycles, respectively. As noted, if a gear shift request has been defined during a set-up state, a local reset tooth 240 protrudes out of the local reset enclosure 245, and in fact it also protrudes out of the gear assembly enclosure 122 (see, for example, FIGS. 3C and 3F). In fact, in order to carry out a gear shift, only one of the two local reset teeth 240, namely either the upper or the lower, protrudes, as respectively defined. If none of the gear teeth 240 protrudes, no gear shift will be performed.

During a return cycle, gear assembly enclosure moves in direction R (see FIGS. 3F and 3N). If, for example, the set-up state has defined a protrusion of three push teeth 220, the first three push teeth 220 protrude out of push teeth enclosure 221. In addition, one of the two local reset tooth 240 (either 240U or 240L) protrudes out of both the local reset enclosure 245, and the gear assembly enclosure 122 (see FIG. 3C and FIG. 3O).

FIG. 3N shows the gear assembly just before the set-up. It can be seen that the guide plate 212U is at its extreme location to the left relative to push teeth enclosure 221, none of push teeth 220 protrudes from teeth enclosure 221, nor the reset tooth protrudes from the reset enclosure 245. FIG. 3O shows the gear mechanism just after the set-up. It can be seen that the guide plate 212U is somewhat pulled to the right relative to the state of FIG. 3N (by cable 230U—not shown), therefore three teeth 220 protrude from teeth enclosure 221, and the local reset tooth 240 protrudes from the reset enclosure 245 and out of the gear assembly enclosure 122 (through an opening in the enclosure). At this stage the forward/backward cable shift mechanism 161 is still in the lock mode, where the brake 140 engages the brake wheel 133, and the sliding sloping surface 134 also presses portion 138a of pully 138 to lock cable 107 (FIG. 3V). The set-up may occur either during a movement of the gear assembly to the DR direction or to the R direction. As long as the set-up occurs during a movement to the DR direction, nothing happens, until reversing the direction towards the R direction.

As shown in FIG. 3P, the gear assembly enclosure 122 is pulled to the R direction by reciprocal motion cable 193 along drive assembly enclosure 101 until local reset tooth 240 intercepts with the initiating protrusion 243 on drive assembly enclosure 101. This interception transfers the gear changing mechanism 125 from the gear set-up state to the gear changing state. It can be seen the frontal protruding tooth 220 just begins to engage the teeth of the upper shift gear 135. Up to this stage the push teeth enclosure 221 remains at a same stationary location relative to the gear assembly enclosure 122 (i.e., same as in FIG. 3O). Until the time when the frontal protruding push teeth 220 engages with upper shift gear wheel 135, upper shift gear wheel is prevented from rotating by gear brake 140. Upon engagement, first of push teeth 220 pushes on upper shift gear wheel 135 forcing main gear axle 130, gear axle cylinder 132 and the wheels (135, 137, 138, 133) mounted on gear axle cylinder 132 to move in a direction "B", pushing the brake wheel 133 away from gear brake 140. Moreover, the movement to of axle 130 to direction B releases the pressure which surface 134 applies on pulley wheel portion 138a such that pully 138 becomes free to rotate (see that the position of axle 130 has been displaced to direction relative to its previous location in FIG. 3O). Cable 107 is now free to follow the rotation of pulley 138 during a gear change. Gear axle cylinder 132 is now also free to rotate.

As shown in FIG. 3Q, gear assembly enclosure 122 continues to be pulled along drive assembly enclosure 101 by reciprocal motion cable 193 to direction R. The three push teeth 220 that protrude outside of push teeth enclosure 221 now engage with upper shift gear wheel 135. As can also be seen, the front 212*a* of the guide plate 212 is closer to the edge 122*a* of the gear assembly enclosure 122 relative to its previous location in FIG. 3P. Teeth 220 now force upper shift gear wheel 135 to rotate in a direction "C", resulting in rotation of cable pulley wheel 138 and a shift of cable 107, and advancement of the location of the gear assembly 12*o* along cable 107, as desired.

As shown in FIG. 3R, upon continuation of the relative displacement of guide plate 212, push teeth enclosure 221, and the local reset enclosure 245 relative to gear assembly enclosure 122, teeth 220 have now completed their engagement with the shift wheel 135 and therefore, the rotation of the wheel terminates. Guide reset spring 216 extends at this stage to its full length, and the front 212*a* of the guide plate 212 is out of the edge 122*a* of the gear assembly enclosure 122. At this stage, the rate of rotation that shift wheel 135 has made is proportional to the number of protruding teeth 220, as was defined during the set-up. Teeth 220 continue to remain protruding. When the reset bearing 242 engages the termination ramp 244 (as shown), the ramp pushes down the bearing, and therefore the reset tooth 240 against its own spring 223 (see FIG. 3J), thereby releasing the reset 240 tooth from its engagement with the initiating protrusion 243. This release results in a transfer of the gear assembly to a local reset mode. As shown in FIG. 3S, the spring 216 has reset the gear assembly 120 by returning the push teeth enclosure 221, the guide plate 212, and the local reset enclosure 245 to their original location within the gear assembly enclosure 122 (same relative location as in FIG. 3O). The relative position between the guide plate 212 and the push teeth enclosure 221 still remain unchanged, namely, as previously defined in the set-up mode. It should be noted that during this local reset, the ramp surface 271 (see FIG. 3J) of each protruding teeth 220 engages with the teeth of the shift gear wheel 135 in a "reverse" direction, where the force which is applied on each protruding tooth causes a temporary withdrawal of the protruding tooth return to of it to its previously protruding state. Therefore, this local reset does not involve any rotation of the shift gear wheel 135.

As a result of the change of location of the gear assembly along cable 107, a gear change has been performed. The gear change intensity has been defined in the set-up mode. Following the gear change and the local reset, those protruding teeth 220 remain in their protruding state. Therefore, a gear change of a same intensity, as defined (either up or down), will follow each return cycle, until a global reset by the user by reset by means of gear selector 146. The global reset is performed when the user feels that a sufficient cable 107 has passed from one winding group of spiral cone 162 to the other winding group (outer to inner or vice versa).

It should therefore be appreciated that the transmission mechanism as disclosed herein is semi-automatic, requiring a user only an up-gear or down-gear selection and choice of the level of change (effected by the number of push teeth 220 selected) using gear selectors 146. Once the user has made the choice, the gear change continually takes place on every return cycle until global reset allowing the user to feel when the correct gear ratio has been reached. Thus, a user does not have to select a specific gear, only provide the selection of change required and continue pedaling until the effort required seems appropriate. Moreover, the user can define a different gear rate for the two "A" and "B" units.

As shown in FIGS. 3K-3M, spiral cone assembly 160 includes two spiral cones 162A and 162B fixedly attached to, respectively, a counterclockwise ratchet 152 and a clockwise ratchet 151, where ratchets 151 and 152 are mounted on cone axle 164. Counterclockwise ratchet 152 enables clockwise motion but eliminates counterclockwise motion by providing a free wheel structure. Clockwise ratchet 151 enables counterclockwise motion but eliminates clockwise motion by providing a free wheel structure. In some embodiments, spiral cones 162 have between 9 and 15 spiral layers.

As described above with reference to FIGS. 2A-2G, spiral cones 162 alternately drive primary load wheel 150 (FIG. 3L) which is attached to load chain 108 to drive load chain 108 which in turn drives load 180. The direction of rotation of load 180 can be altered by means of rotation switch 153 by moving rotation switch handle 154. Rotation switch 153 moves rotation switch cable 155 that alters the engagement of rotation switch gears 156 with primary load wheel 150 to thereby cause primary load wheel 150 to be driven in a clockwise or counterclockwise direction as required to therefore change the direction of rotation of load 180.

Figure 4A:
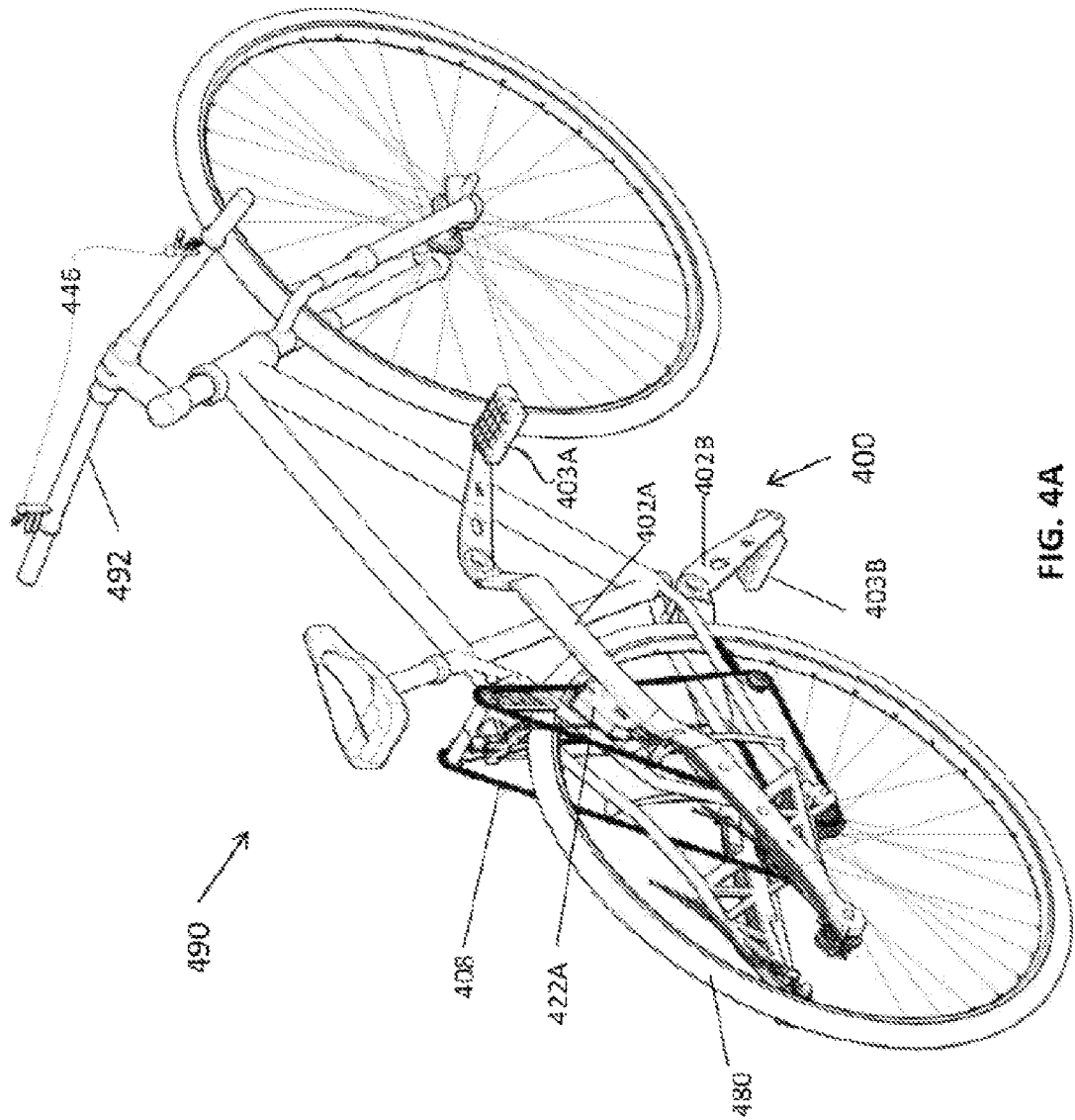
FIGS. 4A-4N schematically illustrate exemplary embodiments of operation of an exemplary human powered linear drive system (of an exemplary human powered device being a bicycle), according to some embodiments of the invention.

Reference is now made to FIGS. 4A-4N that schematically illustrate exemplary embodiments of the operation of an exemplary human powered linear drive system (of an exemplary human powered device being a bicycle). FIGS. 4A and 4B show alternative embodiments of bicycles humanly powered by linear drive system 400. Bicycle 490 (of FIG. 4A) uses a chain drive alternative and bicycle 494 (FIG. 4B) uses a cable drive alternative. The reference number 407 is used herein to refer to both a drive cable and drive chain and the term cable 407 should be understood to also describe chain 407 and cable 407. Throughout this application the terms "cable" and "chain" may be used interchangeably, with some required modifications. In some embodiments, gear selectors 446 are positioned on the handlebars 492 of bicycles 490 and 494.

In use, pedals 403A and 403D are pushed alternately vertically downwards to move chain 407 (FIG. 4C) to rotate spiral cones 462 to drive load 180 which in this embodiment is the rear wheel of bicycles 490 and 494. Pedals 403 are mounted on pedal bars 402. Pedal bars 402 are fixedly attached to gear assembly enclosures 422. Pedal bars 402 pivot around rear pedal pivot 470.

Figure 4C:
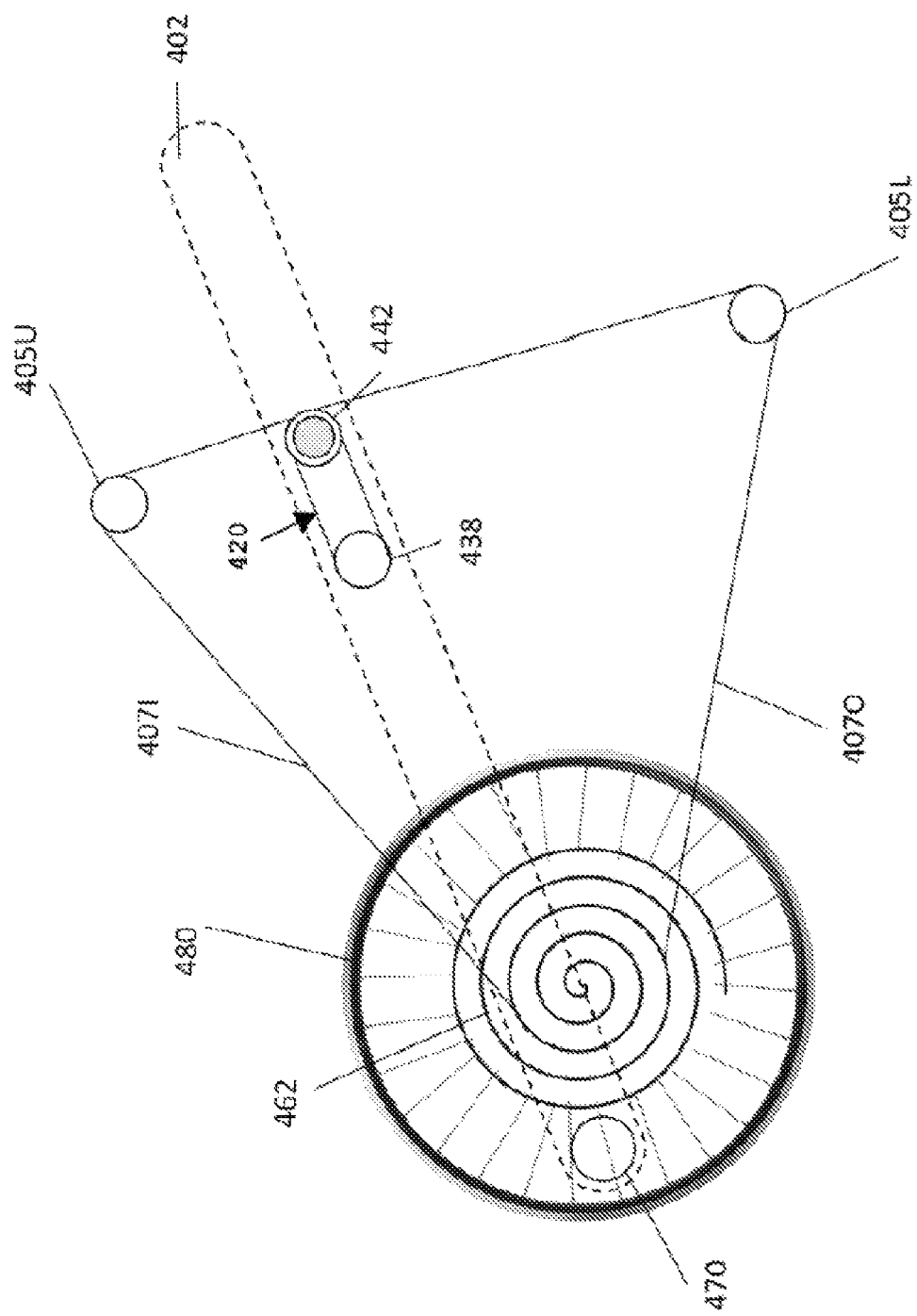
Figure 4D:
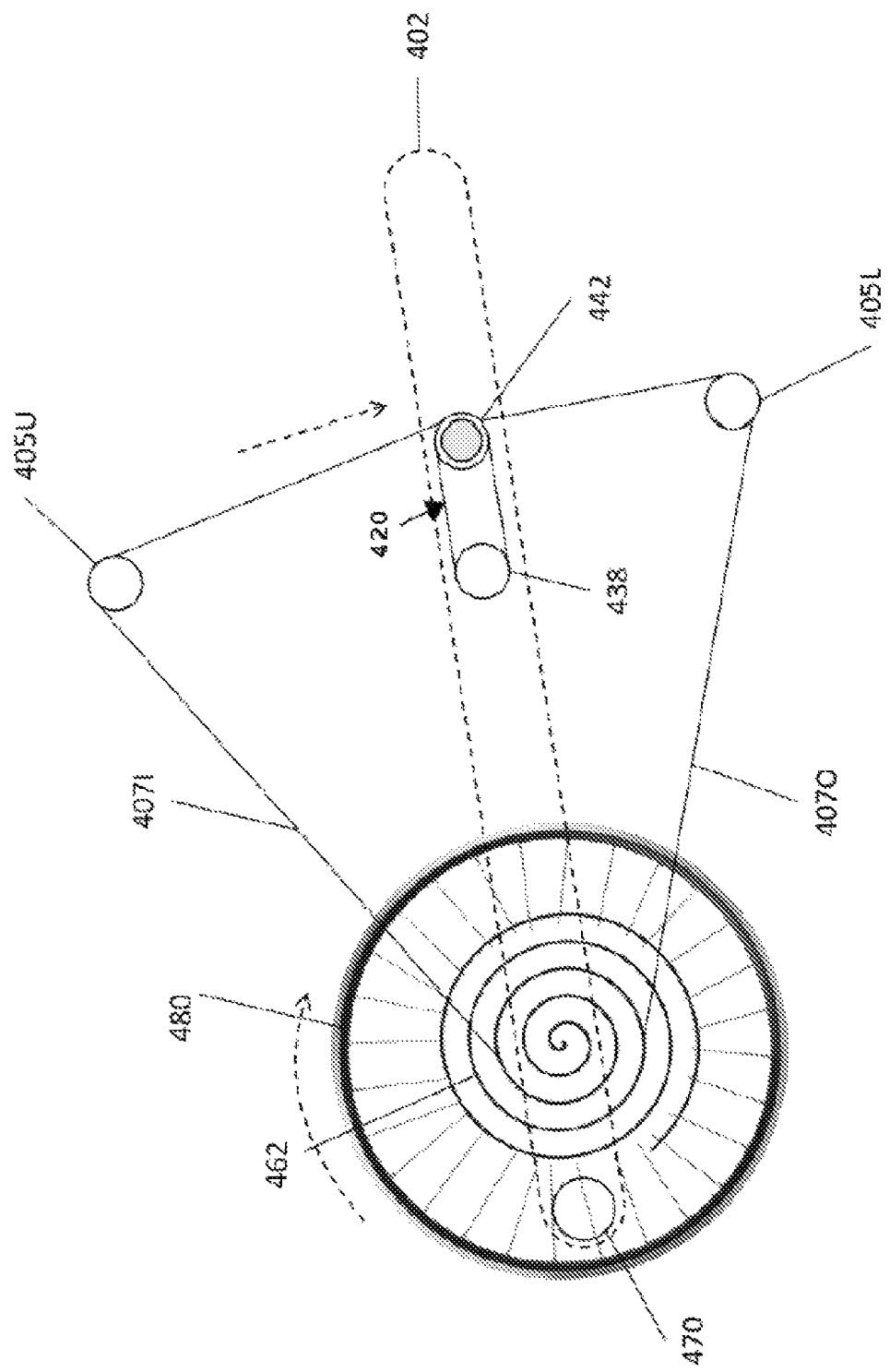
Figure 4E:
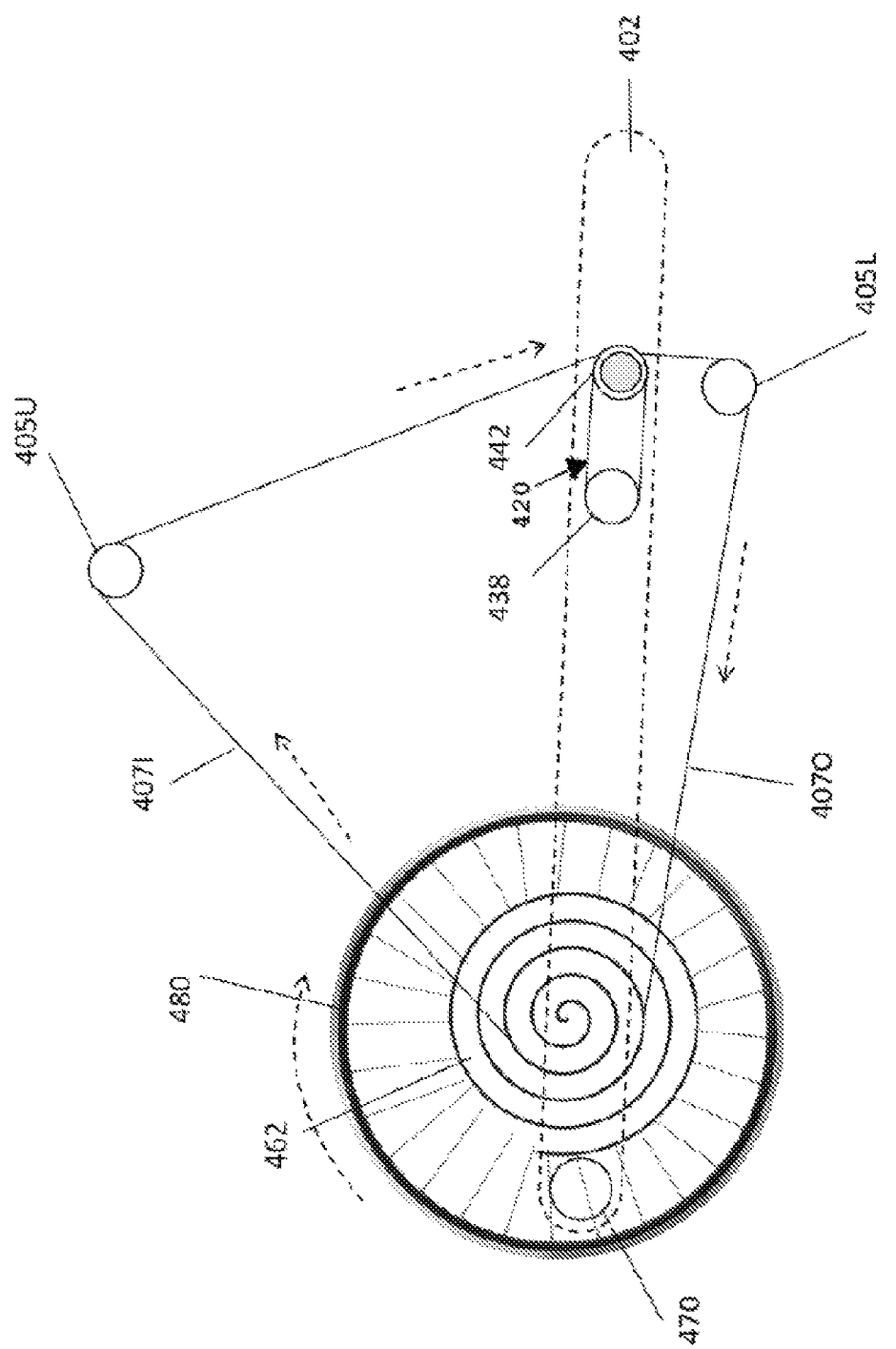
Figure 4G:
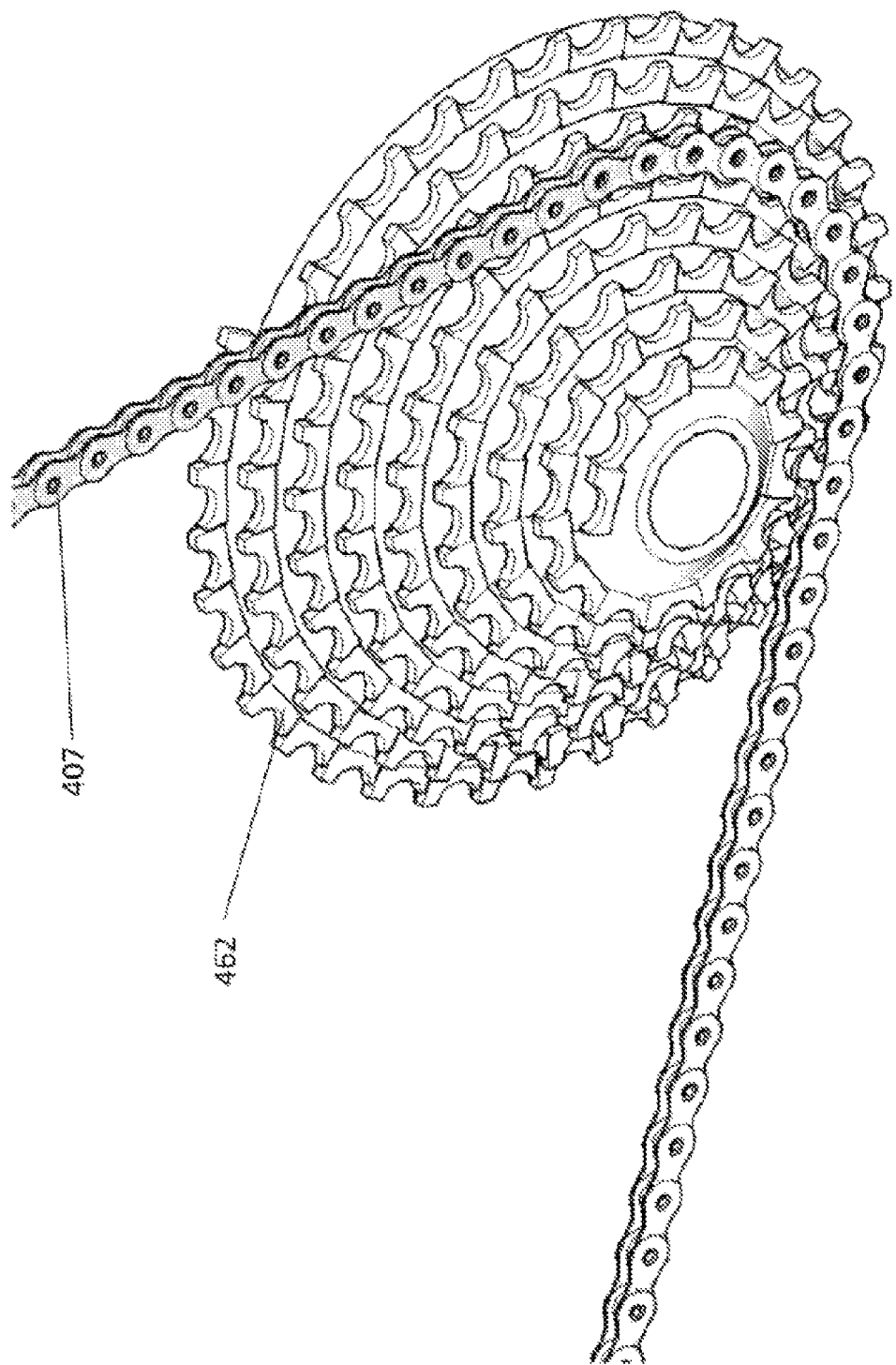
Figure 4H:
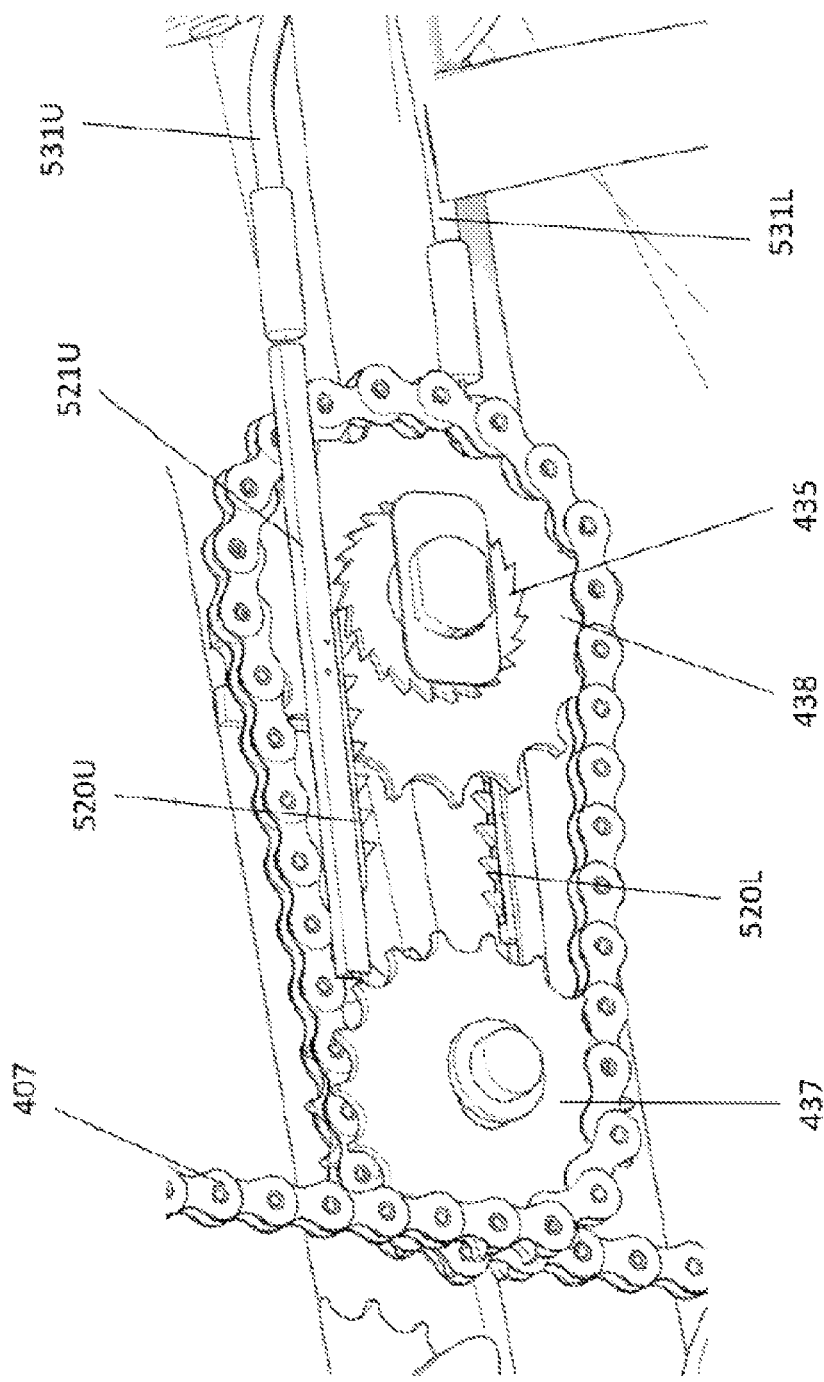
Figure 41:
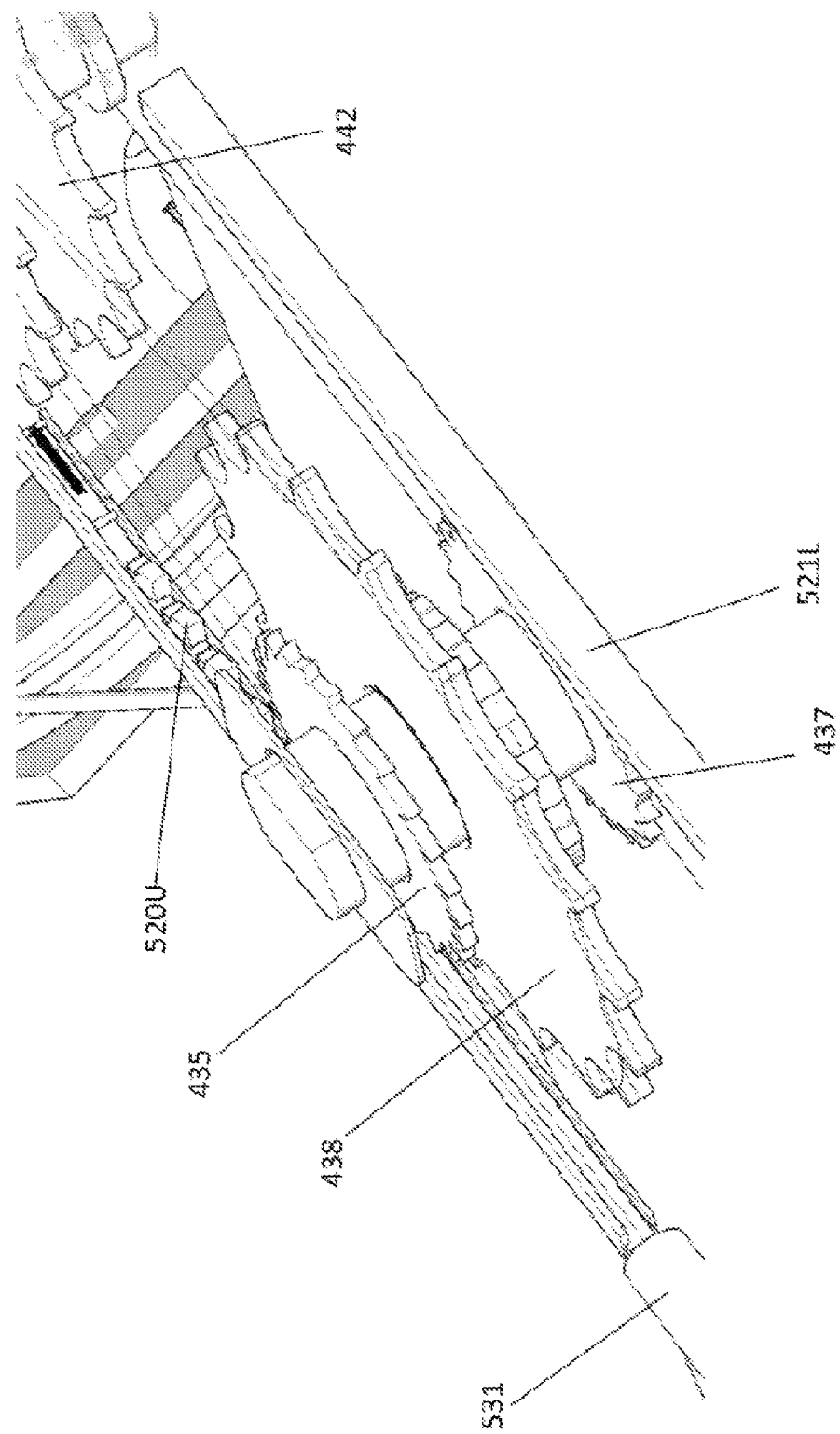
Figure 4J:
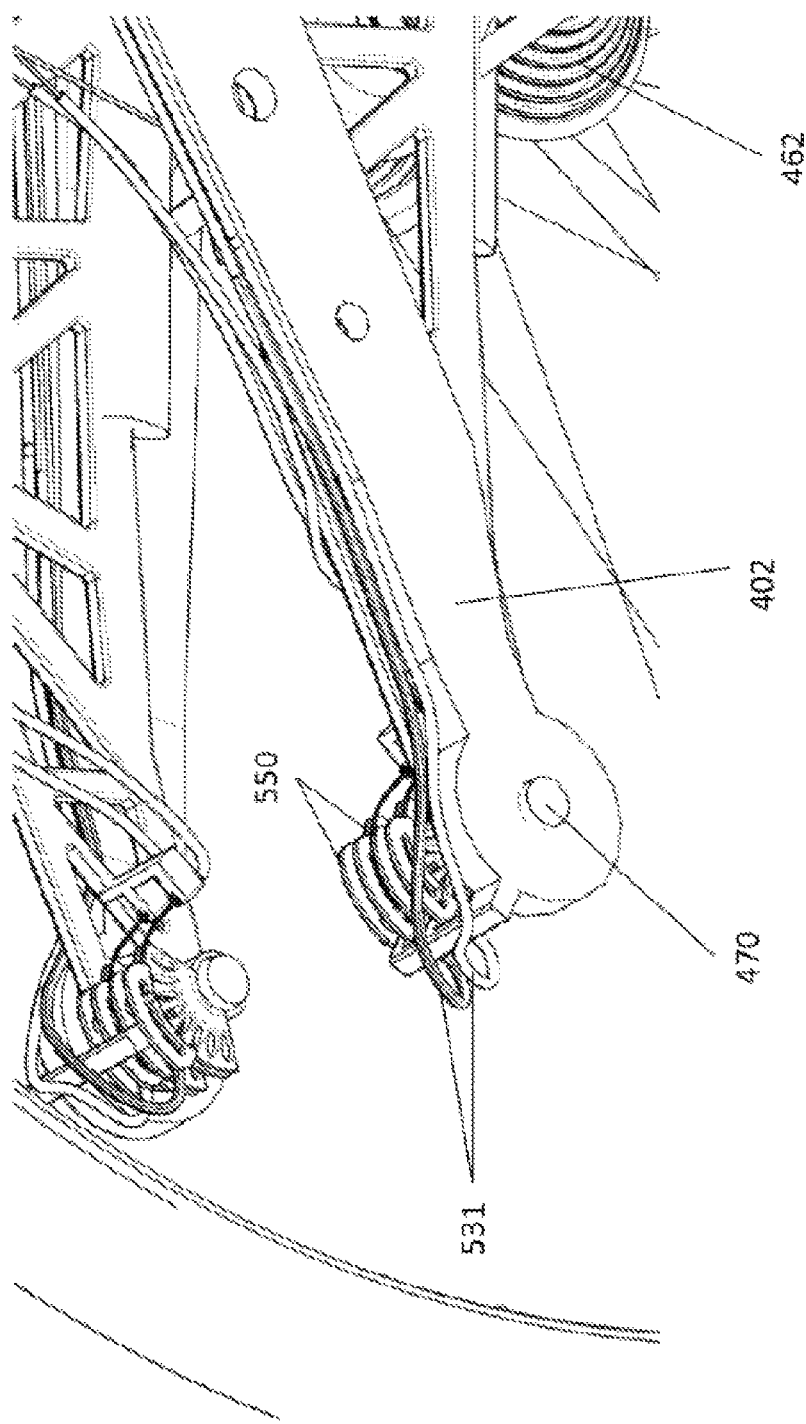
Figure 4K:
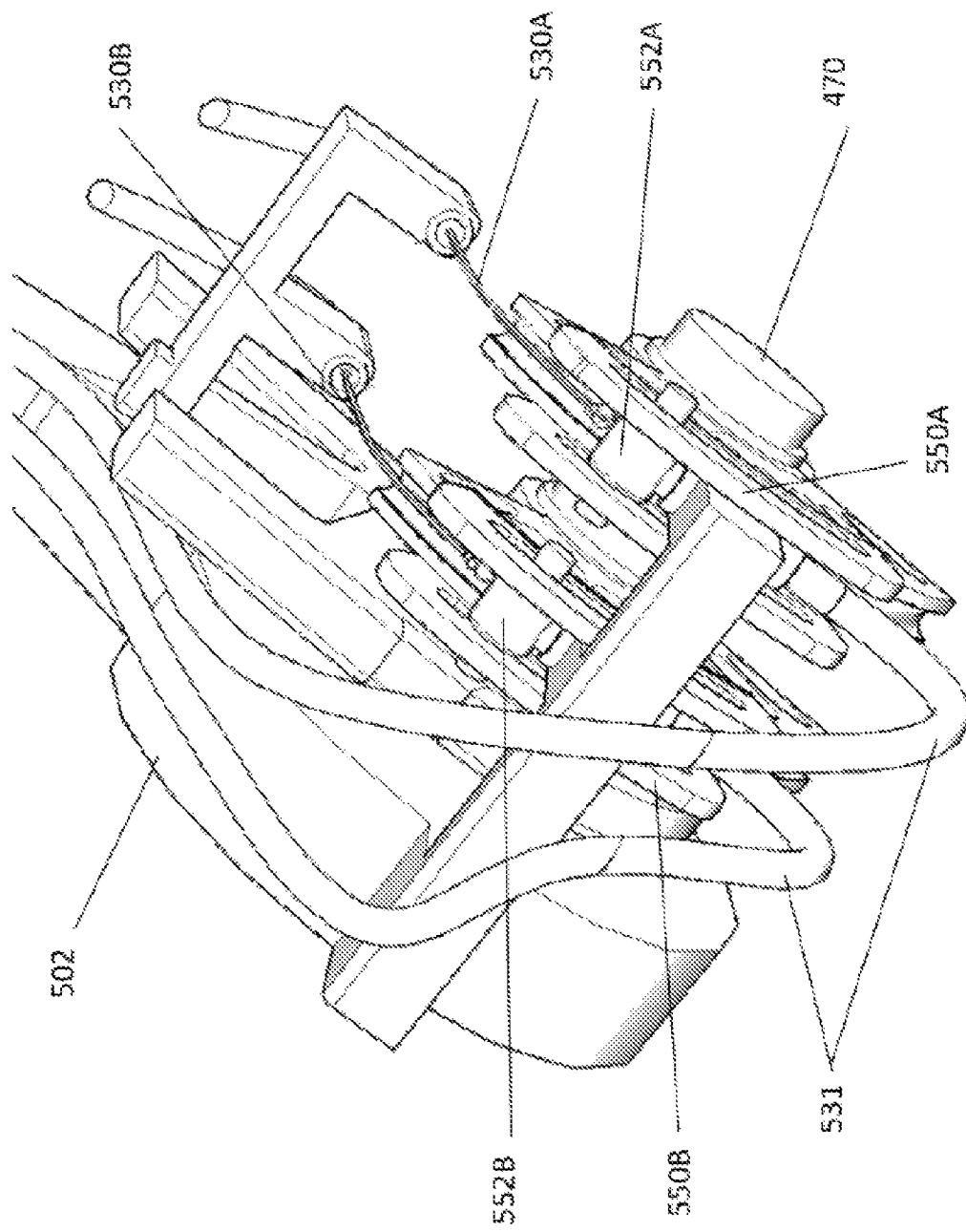

Linear drive system 400 functions as shown in FIGS. 4C-4E. FIGS. 4C-4E show only one side of the drive mechanism of system 400 and it should be appreciated that a second side functions in a symmetrical manner. In FIG. 4C, pedal bar 402 is shown in a starting position. Cable 407 is attached to spiral cone 462 in the same way that cable 107 is attached to spiral cone 162 (see FIGS. 2F-2G). Alternatively, chain 407 is wound through gear assembly 420 and spiral cone 462 as shown in FIGS. 4F-4G. As shown in FIGS. 4C and 4D, chain 407 is routed from spiral cone 462 over upper drive roller 405U, through gear assembly 420, around lower drive roller 405L, and then back to spiral cone 462. Within gear assembly 420, chain 407 is routed around cable flip wheel 442 and then over cable pulley wheel 438. As before, the gear mechanism is adapted to shift the position of chain 407 around spiral cone 462 to thereby alter the drive ratio (herein referred to as a "gear change").

As shown in FIGS. 4D and 4E, pedal bar 402 is pushed downward such as by a rider of a bicycle pushing on pedal 403. Gear assembly enclosure 422 being attached to pedal bar 402 is thus also pushed downwards and gear assembly 420, being included within gear assembly enclosure 422 (FIG. 4N) also moves downwards. Chain 407 being locked into gear assembly 420 is pulled downward and in turn pulls on spiral cone 462 causing rotation of spiral cone 462. In the illustration of FIGS. 4D and 4E, spiral cone 462 rotates in a clockwise direction but it should be appreciated that this is for illustration only and system 400 may cause rotation or movement in any desired direction. The rotation of spiral cone 462 results in the direct rotation of load 480 here shown as the wheel of a bicycle that is mounted on the same axle 464 as spiral cone 462.

The mechanism for gear change is described with reference to FIGS. 4H-4L. As shown the gear mechanism rotates upper shift gear wheel 435 or lower shift gear wheel 437 to thereby rotate pulley wheel 438 and shift the position of chain 107 on pulley wheel 438 and thus also on spiral cone 462. Other means of shifting chain 107 are contemplated and the description herein should not be considered limiting. A gear selector 446 is provided for each side of bicycles 490 or 494 each connected to two gear change cables 530 (one cable for changing up and one for changing down). Optionally a single selector 446 changes gears for both sides of bicycles 490 or 494.

Figure 4L:
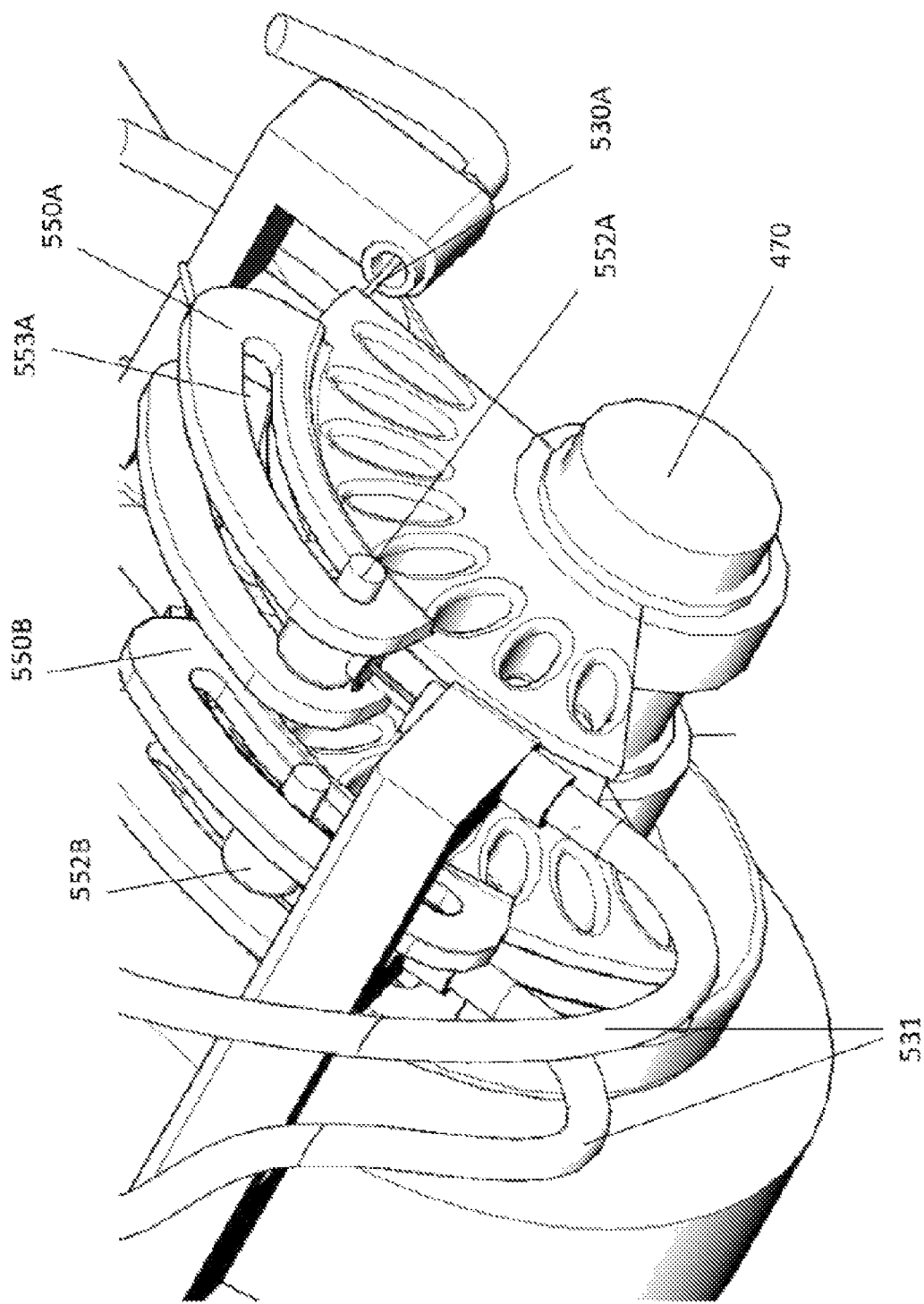

Gear change cables 530 are connected to gear swivels 550 such that pulling on gear change cable 530 results in movement of gear swivel 550 such as shown in FIG. 4L. Gear swivel pin 552 moves backwards and forwards within swivel slot 553 as pedal bar 402 moves up and down. Gear swivel pin is attached to gear change cable extension 531 which in turn is attached to push teeth 520. Push teeth 520 are mounted in push teeth enclosure 521. Upper push teeth 520U rotate upper shift gear wheel 435 and lower push teeth 520L rotate lower shift gear wheel 435 to cause a gear shift up or down.

When gear swivel 550 is pulled forward by gear change cable 530 such as shown in FIG. 4L, gear swivel pin is pulled forward as pedal bar 402 moves up and down. Gear swivel pin thus pulls on gear change cable extension 531 thereby pulling push teeth 420 which push one of upper gear wheel 435 or lower gear wheel 437 to thereby rotate pulley wheel 438 (FIGS. 4H and 4I) and shift the position of chain 407 on spiral cone 462. Use of the gear swivel 550 mechanism enables gear changes powered by the movement of pedal bars 402. The amount of cable extension 531 that is pulled will determine the number of teeth 420 that engage upper gear wheel 435 or lower gear wheel 437 and thereby the level of gear change (incremental or acute depending on the number of teeth 420 engaged). Gear changes will continue on every cycle of pedal bar 402 as long as gear swivel 550 is pulled forward by gear change cable 530, thus until the gear selection is cancelled by the user or by a gear cancel mechanism (not shown). Thus, the mechanism for gear change as described with reference to FIGS. 4H-4L is semi-automatic (a user selects gear change direction and level but gear change happens while pedaling) and continuous (takes place on every pedal cycle).

Figure 4M:
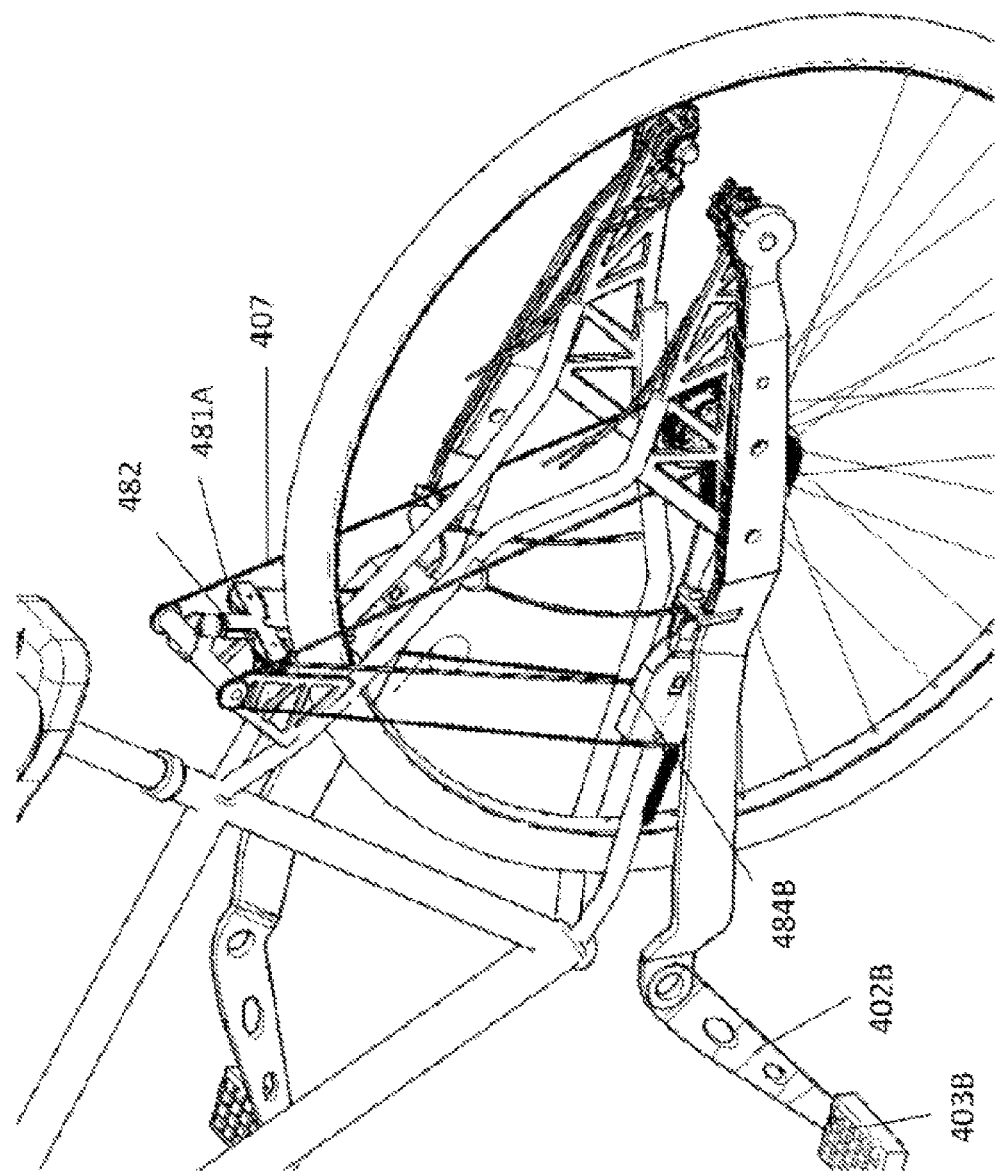

FIGS. 4M and 4N illustrate an embodiment of a reciprocal (linear) motion pulley mechanism for pulling up a pedal 403A on a first side when a pedal 403B on a second side is pushed down and vice versa. FIG. 4N shows only those parts that are part of the mechanism. Gear assembly enclosures 422A and 422B are attached to reciprocal motion cable 483 using cable attachments 484. Cable 483 is looped over reciprocal motion pulley wheels 481. Reciprocal motion pulley wheels 481 are mounted on reciprocal motion mount 482 which in turn is mounted onto load frame 490 (or 494). In the illustrated embodiments load frames 490/494 are bicycle frames.

In use, when pedal 403A is pushed down, gear assembly enclosure 422A is pulled down, pulling on reciprocal motion cable 483. Reciprocal motion cable 483 thus pulls gear assembly enclosure 422B upwards along with pedal 403B. Conversely, when pedal 403B is pushed down, gear assembly enclosure 422B is pulled down, pulling on reciprocal motion cable 483. Reciprocal motion cable 483 thus pulls gear assembly enclosure 422A upwards along with pedal 403B. When pedal 403A is pushed downwards, pedal 403B moves upwards. As with system 100, a ratchet mechanism within spiral cones 462 prevents the rotation of spiral cone 462B from causing rotation of load 480. Thus, in the embodiment of FIGS. 4A-4N only downward motion of pedals 403 causes movement of load 480.

Figure 5:
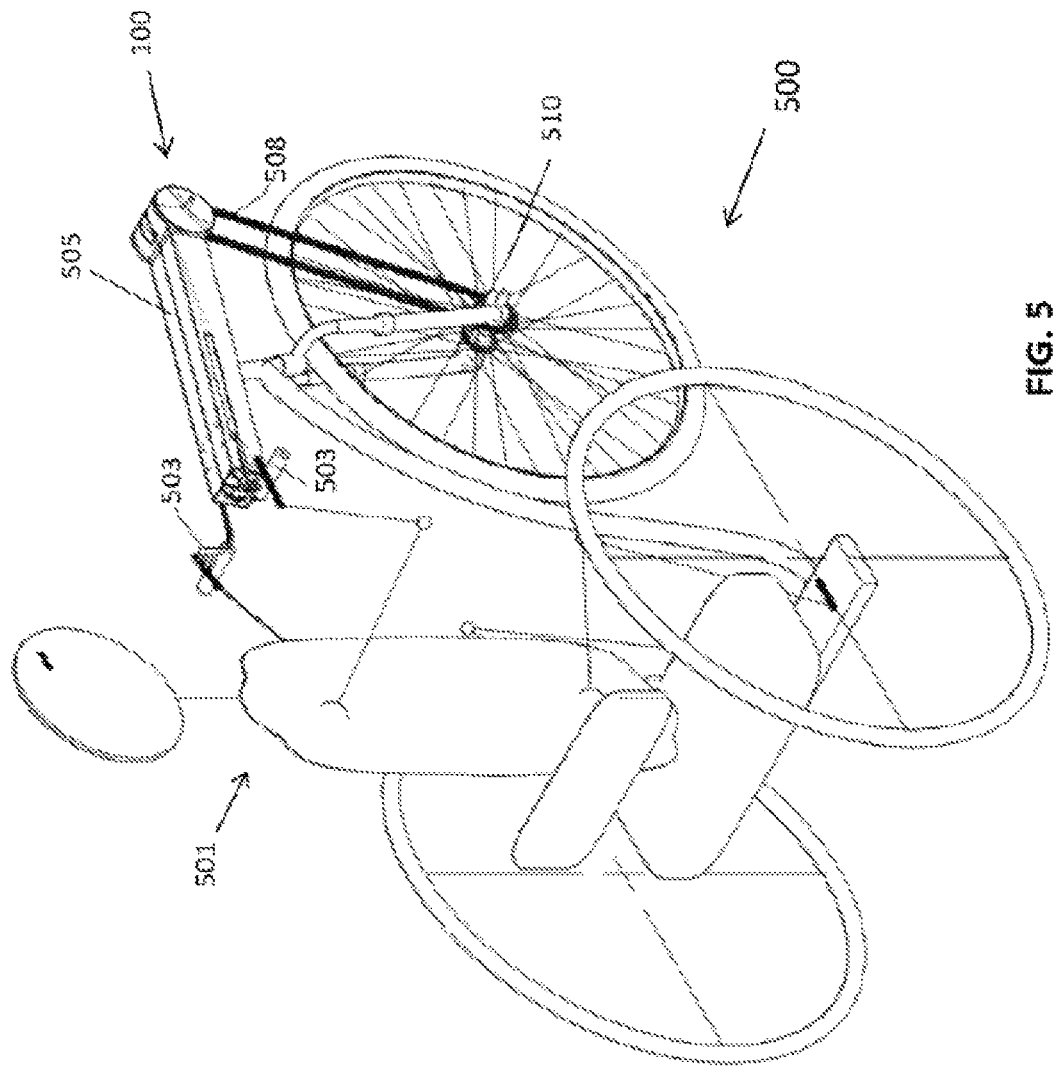
FIG. 5 schematically illustrates an exemplary embodiment of an exemplary human powered vehicle (a tricycle) having an exemplary human powered linear drive system, according to some embodiments of the invention.

Reference is now made to FIG. 5 that schematically illustrates an exemplary embodiment of an exemplary human powered vehicle (a tricycle) having an exemplary human powered linear drive system. As shown therein, tricycle 500 includes, and is humanly powered using, exemplary linear drive system 100 (FIGS. 2A-2E) as described hereinabove, which, in turn, is operated via reciprocal (linear) arm movements of a rider 501 of tricycle 500. Movement of handles 503 (outwardly extending from drive assembly enclosure 505) causes rotation of drive chain 508 that drives tricycle wheel 510. In exemplary embodiments of operating tricycle 500, the (linear) pull cycle is active and the reverse (linear) push cycle is passive.

Figure 6A:
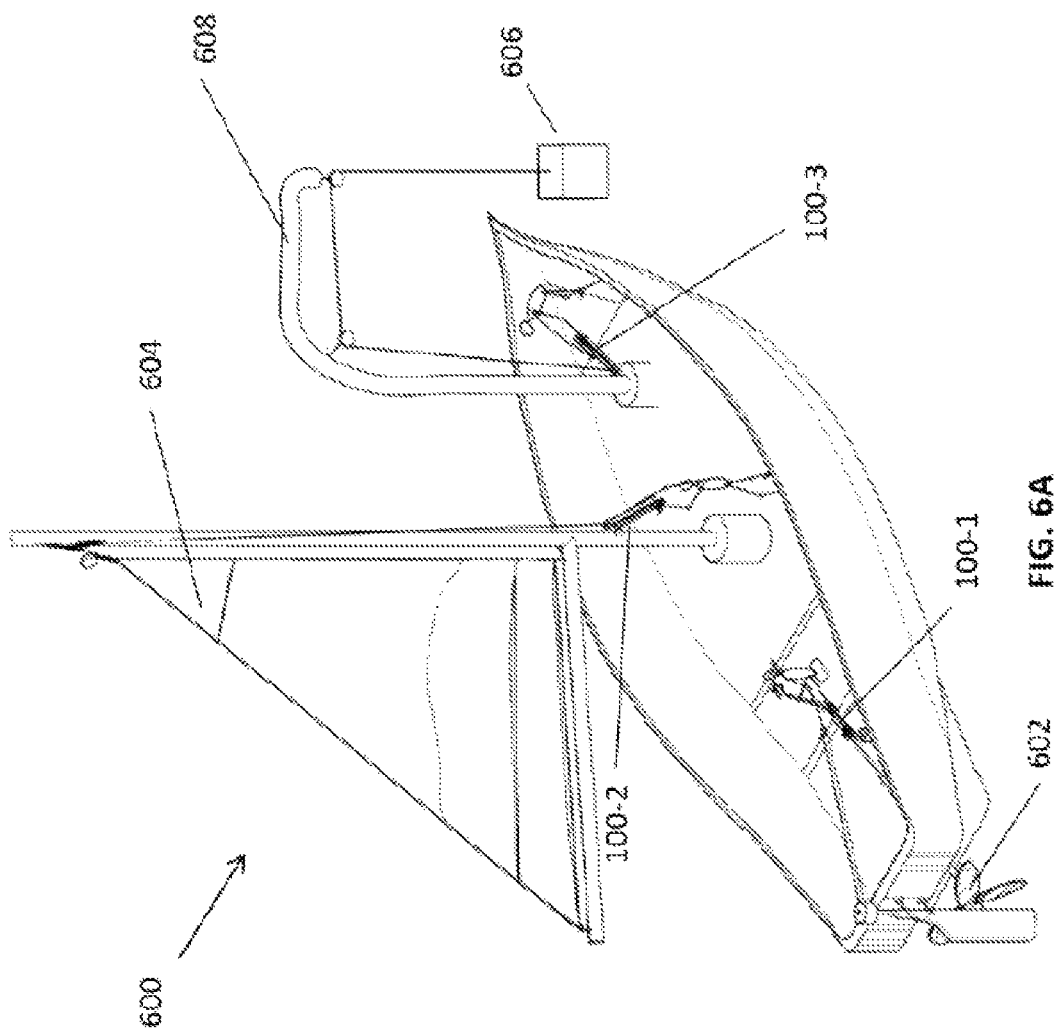
FIGS. 6A-6B schematically illustrate an exemplary embodiment of an exemplary water-based (marine type) vehicle or vessel (a boat) having several exemplary human powered devices employing exemplary human powered linear drive systems, according to some embodiments of the invention.
Figure 6B:
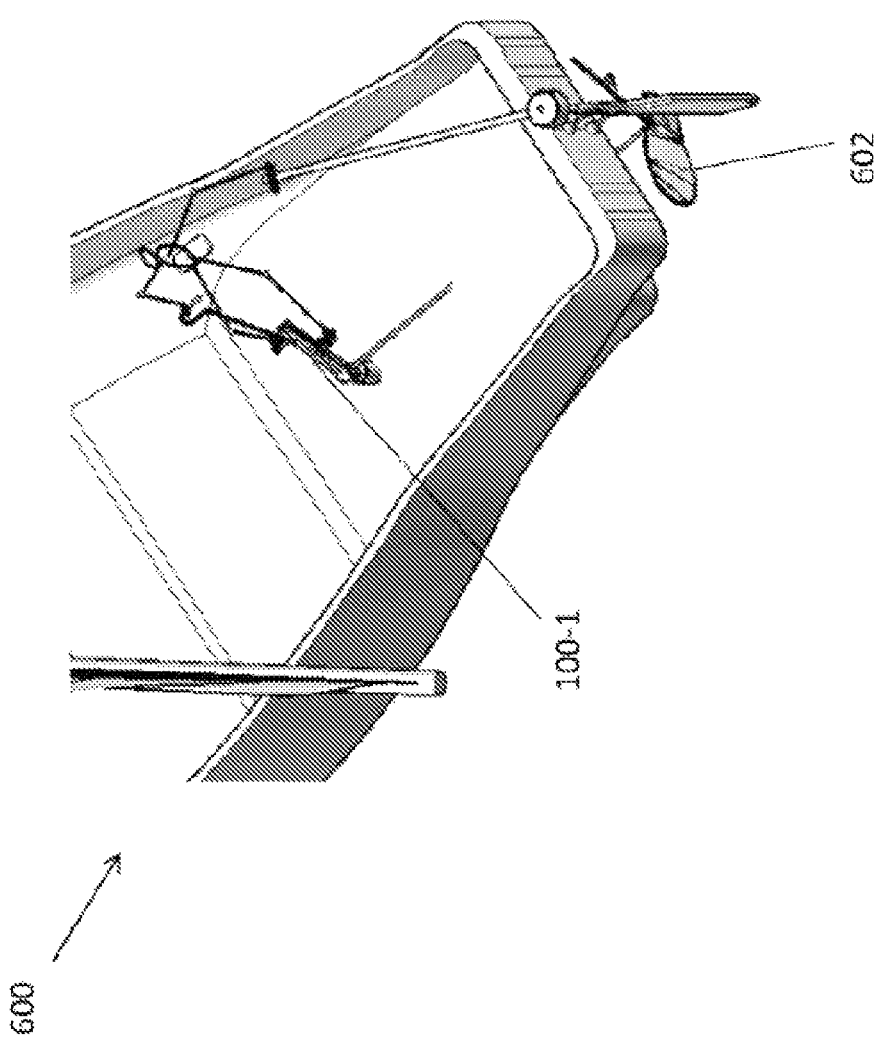

Reference is now made to FIGS. 6A-6B that schematically illustrate an exemplary embodiment of an exemplary water-based (marine type) vehicle or vessel (a boat) having several exemplary human powered devices employing exemplary human powered linear drive systems. As shown therein, yacht or boat 600 includes, and is humanly powered using, several of the exemplary linear drive system 100 (FIGS. 2A-2E) as described hereinabove, via translating reciprocal (linear) movement into power for effecting movements of, and performing work by, various parts of yacht or boat 690. In exemplary embodiments, linear drive system 100-1 is humanly operated and used to rotate propeller 602 for propulsion of yacht or boat 690. In exemplary embodiments, linear drive system 100-2 is humanly operated and used to convert reciprocal (linear) motion into power for raising and lowering of main sail 604. In exemplary embodiments, linear drive system 100-3 is humanly operated and used to convert reciprocal (linear) motion into power for raising and lowering of a load 606 held by crane 608.

Each of the following terms written in singular grammatical form: 'a', 'an', and 'the', as used herein, means 'at least one', or 'one or more'. Use of the phrase 'one or more' herein does not alter this intended meaning of 'a', 'an', or 'the'. Accordingly, the terms 'a', 'an', and 'the', as used herein, may also refer to, and encompass, a plurality of the stated entity or object, unless otherwise specifically defined or stated herein, or, unless the context clearly dictates otherwise. For example, the phrases: 'a unit', 'a device', 'an assembly', 'a mechanism', 'a component', 'an element', and 'a step or procedure', as used herein, may also refer to, and encompass, a plurality of units, a plurality of devices, a plurality of assemblies, a plurality of mechanisms, a plurality of components, a plurality of elements, and, a plurality of steps or procedures, respectively.

Each of the following terms: 'includes', 'including', 'has', 'having', 'comprises', and 'comprising', and, their linguistic/grammatical variants, derivatives, or/and conjugates, as used herein, means 'including, but not limited to', and is to be taken as specifying the stated component(s), feature(s), characteristic(s), parameter(s), integer(s), or step (s), and does not preclude addition of one or more additional component(s), feature(s), characteristic(s), parameter(s), integer(s), step(s), or groups thereof. Each of these terms is considered equivalent in meaning to the phrase 'consisting essentially of'.

The term 'method', as used herein, refers to a single step, procedure, manner, means, or/and technique, or a sequence, set, or group of two or more steps, procedures, manners, means, or/and techniques, for accomplishing or achieving a given task or action. Any such herein disclosed method, in a non-limiting manner, may include one or more steps, procedures, manners, means, or/and techniques, that are known or readily developed from one or more steps, procedures, manners, means, or/and techniques, previously taught about by practitioners in the relevant field(s) and art(s) of the herein disclosed invention. In any such herein disclosed method, in a non-limiting manner, the stated or presented sequential order of one or more steps, procedures, manners, means, or/and techniques, is not limited to that specifically stated or presented sequential order, for accomplishing or achieving a given task or action, unless otherwise specifically defined or stated herein, or, unless the context clearly dictates otherwise. Accordingly, in any such herein disclosed method, in a non-limiting manner, there may exist one or more alternative sequential orders of the same steps, procedures, manners, means, or/and techniques, for accomplishing or achieving a same given task or action, while maintaining same or similar meaning and scope of the herein disclosed invention.

It is appreciated that certain aspects, characteristics, and features, of the present invention, which are, for clarity, illustratively described in the context of separate embodiments, may also be illustratively described in combination in the context of a single embodiment. Conversely, various aspects, characteristics, and features, of the present invention, which are, for brevity, described in the context of a single embodiment, may also be provided separately or in any suitable sub-combination.

Although the present invention has been illustratively described in conjunction with specific exemplary embodiments, and examples thereof, it is evident that many alternatives, modifications, and variations, thereof, will be apparent to those skilled in the art. Accordingly, it is intended that all such alternatives, modifications or/and variations are encompassed by the scope of the appended claims.

All publications, patents, or/and patent applications, cited or referred to in this disclosure are herein incorporated in their entirety by reference into the specification, to the same extent as if each individual publication, patent, or/and patent application, was specifically and individually indicated to be incorporated herein by reference. In addition, citation or identification of any reference in this application shall not be construed or understood as an admission that such reference represents or corresponds to prior art of the present invention.

The invention claimed is:

1. A human powered reciprocal motion drive system, comprising:
    a) two independently driven first and second drive assemblies for interchangeably operating in driving and return strokes, each drive assembly comprising:
    b) only a single spiral cone including a single thread;
    c) a single driving cable, a first end of the driving cable being connected to a first winding group on the spiral cone, and a second end of the same driving cable being connected to a second winding group, both said winding groups being disposed on said single thread of the same spiral cone;
    d) a pedal which is attached to said driving cable; and
    e) a gear assembly which is configured to define a ratio between the number of revolutions in said first winding group and the number of revolutions in said second winding group on the same cone, thereby to define an operative position along said thread of the spiral cone, and a respective torque that the cone applies,
    wherein the system further comprising a reciprocal motion mechanism which is separate from any of the cones in said two drive assemblies, a first end of the reciprocal motion mechanism being in communication with said pedal of the first drive assembly and a second end of said reciprocal motion mechanism being in communication with the pedal of the second drive assembly, said reciprocal motion mechanism, during each driving motion by one of said pedals, causes a return motion of the other of said pedals to bring the pedal to an initial state, thereby to be ready for a next driving motion during a driving stroke of this specific drive assembly; and
    wherein a portion of said driving cable, between the driving cable's two ends, turns around a driving roller.

2. The system of claim 1, wherein a definition change of said ratio by the gear assembly takes place during the return motion and involves an inner or outer shift of the operative position along the respective spiral cone.

3. The system of claim 1, wherein the spiral cone of the first drive assembly and the spiral cone of the second drive assembly each comprises a one-way ratchet such that only rotation in one direction during the respective driving stroke of each spiral cone imparts movement to a load.

4. The system of claim 1, wherein the gear assembly of the first drive assembly and the gear assembly of the second drive assembly, each comprising:
    a) a forward/backward cable shift mechanism, for selectively moving the gear assembly either forward or backward along the driving cable;
    b) a set-up mechanism for selectively defining either a forward motion or a backward motion along said driving cable; and
    c) a brakes mechanism for locking a gear mechanism to the driving cable at a desired location.

5. The system of claim 4, wherein a gear change by either gear assembly is semi-automatic.

6. The system of claim 1, wherein each gear assembly is attached to the pedal of the respective drive assembly, either directly or indirectly.

7. The system of claim 6, wherein a set-up mechanism within the gear assembly is divided into an upper set-up unit and a lower set-up unit, to selectively define a forward or backward displacement of the gear mechanism along the driving cable, respectively, where each set-up mechanism includes a mechanism for defining an extent of the displacement.

8. The system of claim 6, comprising a local reset for effecting a repetition of a gear change based on a defined set-up, and a global reset for zeroing any defined setup.

9. The system of claim 1, wherein the gear assembly of the first drive assembly and the gear assembly of the second drive assembly, each comprising:
    a) a cable flip wheel;
    b) a cable pulley wheel mounted on a gear axle cylinder wherein the driving cable passes around the cable pulley wheel and cable flip wheel in the gear assembly; and
    c) a lower shift gear wheel and an upper shift gear wheel mounted on the gear axle cylinder such that rotation of either one of the lower shift gear wheel or the upper shift gear wheel causes rotation of the gear axle cylinder and of the cable pulley wheel to thereby shift gears by shifting the operative position of the driving cable on the respective spiral cone.

10. The system of claim 9, wherein each of the gear assemblies further comprising:
   a) an upper gear changing mechanism comprising a plurality of push teeth for engaging with and rotating the upper shift gear wheel, wherein the number of the push teeth deployed from the upper gear changing mechanism is selected using a gear selector; and
   b) a lower gear changing mechanism comprising a plurality of push teeth for engaging with and rotating the lower shift gear wheel, wherein the number of the push teeth deployed from the lower gear changing mechanism is selected using the gear selector.

11. The system of claim 10, wherein the number of the plurality of push teeth deployed from the upper gear changing mechanism or the lower gear changing mechanism, respectively, for a gear change is between one push tooth and all of the plurality of push teeth.

12. The system of claim 10, wherein each of the gear assemblies further comprising a reset mechanism for returning the upper gear changing mechanism or lower gear changing mechanism to a starting position following engagement with the upper shift gear wheel or lower shift gear wheel.

13. The system of claim 12, wherein the reset mechanism comprising:
   a) a reset tooth configured to engage a blocking wedge mounted on an inner surface of a drive assembly enclosure to cause a gear change;
   b) a reset spring; and
   c) a bearing ramp mounted on an inner surface of a gear enclosure such that a reset bearing engages the ramp following the gear change to thereby retract the reset tooth such that the reset spring pulls the upper gear changing mechanism or lower gear changing mechanism to a starting position.

14. The system of claim 10, wherein the gear selector is attached to a gear change cable and wherein the gear change cable is attached to a gear swivel, wherein the gear swivel is mounted on an axle also common to a pedal bar such that the gear swivel swivels when the pedal bar moves as part of pedal bar's reciprocal motion, wherein a gear swivel pin moves within the gear swivel such that movement of the gear swivel caused by the gear selector causes movement of the gear swivel pin, wherein the gear swivel pin is attached to a gear change cable extension which in turn is attached to the plurality of push teeth of the upper or lower gear changing mechanism, respectively, such that movement of the gear swivel pin results in engagement of one or more of the plurality of push teeth with the upper shift gear wheel or the lower shift gear wheel, respectively, for rotating the upper shift gear wheel or lower shift gear wheel, respectively, for effecting a gear change.

15. The system of claim 9, wherein each of the driving cables is looped around a respective drive roller tensioned by a respective throttle spring attached to an enclosure of the respective drive assembly, the tensioned drive roller being adapted for absorbing slack from the driving cable when it the drive cable shifts in position around the respective spiral cone.

16. The system of claim 1, wherein each of the gear assemblies is mounted and travels within a respective drive assembly enclosure.

17. The system of claim 1, wherein the reciprocal motion mechanism is a reciprocal motion chain or a reciprocal motion cable, said cable being looped over at least one reciprocal pulley wheel mounted onto a load frame, wherein the reciprocal motion cable is attached at each of the cable's two ends to the respective gear assembly, which is in turn attached to the respective pedal.

18. The system of claim 1, configured for humanly powering a human powered device selected from the group consisting of: winches, bicycles, tricycles, cranes, vehicles, and the human powered devices on water-based, marine, vehicles or vessels.

19. The system of claim 18, wherein the water-based, marine, vehicles or vessels are selected from the group consisting of: boats, yachts, and ships.

20. The system of claim 1, wherein each spiral cone has a single spiral guide, enabling each of said two winding groups to be located substantially anywhere along said single spiral guide.

21. A human powered reciprocal motion drive system, comprising two independently driven first and second drive assemblies for interchangeably operating in driving and return strokes, each drive assembly comprising:
   a) only a single spiral cone including a single thread;
   b) an endless driving cable, said endless cable being looped around said single spiral cone;
   c) a pedal which is attached to said endless driving cable; and
   d) a gear assembly for defining an operative position along the thread of the spiral cone, and a respective torque that the cone applies,
   wherein the system further comprising a reciprocal motion mechanism which is separate from any of said two cones, a first end of the reciprocal motion mechanism being in communication with said pedal of the first drive assembly and a second end of said reciprocal motion mechanism being in communication with the pedal of the second drive assembly, said reciprocal motion mechanism, during each driving motion by one of said pedals, causes a return motion of the other of said pedals to bring the pedal to an initial state, thereby to be ready for a next driving motion during the driving stroke of this specific drive assembly, and
   wherein a portion of said driving cable, turns around a driving roller.

* * * * *